(12) United States Patent
Häfele et al.

(10) Patent No.: US 11,617,635 B2
(45) Date of Patent: Apr. 4, 2023

(54) PARTIAL DENTAL ARCH AND METHOD FOR MANUFACTURING A PARTIAL ARCH

(71) Applicant: Ivoclar Vivadent AG, Schaan (LI)

(72) Inventors: Clemens Andreas Häfele, Weiler (AT); Konrad Hagenbuch, Haag (CH); Harald Kerschbaumer, Klaus (AT); Karl Lanbacher, Laas (IT); Martin Mitterhofer, Latch/Morter (IT); Martin Bertagnolli, Naturns (IT); Andreas Facher, Gundetswil (CH)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 16/094,520

(22) PCT Filed: Apr. 18, 2017

(86) PCT No.: PCT/EP2017/059169
§ 371 (c)(1),
(2) Date: Oct. 18, 2018

(87) PCT Pub. No.: WO2017/182461
PCT Pub. Date: Oct. 26, 2017

(65) Prior Publication Data
US 2019/0133728 A1 May 9, 2019

(30) Foreign Application Priority Data

Apr. 18, 2016 (EP) .................... 16165760

(51) Int. Cl.
*A61C 13/09* (2006.01)
*A61C 13/00* (2006.01)
*A61C 13/08* (2006.01)

(52) U.S. Cl.
CPC .......... *A61C 13/09* (2013.01); *A61C 13/0004* (2013.01); *A61C 13/0022* (2013.01); *A61C 13/082* (2013.01)

(58) Field of Classification Search
CPC . A61C 13/083; A61C 13/0835; A61C 9/0053; A61C 7/002; A61C 7/08;
(Continued)

(56) References Cited

U.S. PATENT DOCUMENTS

| 1,657,673 A | * | 1/1928 | Gysi | ........... A61C 13/097 433/197 |
| 1,822,837 A | * | 9/1931 | Avery | ........... A61C 13/097 433/197 |

(Continued)

FOREIGN PATENT DOCUMENTS

| DE | 10308609 B3 * | 9/2004 | ............. A61C 13/09 |
| DE | 102005042091 A1 | 3/2007 | |

(Continued)

*Primary Examiner* — Edward Moran
*Assistant Examiner* — Matthew P Saunders
(74) *Attorney, Agent, or Firm* — Ann M. Knab; Thad McMurray

(57) ABSTRACT

A partial dental arch is provided with dentin material and with cutting material and a boundary area therebetween. It includes a primary-position tooth region and additional tooth regions which are arranged more distally. A wavy structure of the boundary area is provided whose amplitude—when viewed in the distal direction—decreases in at least one section of the mesial-distal and/or occlusal-gingival extension, in particular with regard to the occlusal-gingival direction.

14 Claims, 65 Drawing Sheets

(58) Field of Classification Search
CPC ....... A61C 13/08; A61C 13/09; A61C 13/081; A61C 13/097; A61K 6/06; A61K 6/083; B33Y 10/00; B33Y 80/00; B29B 2911/1404
USPC ....... 433/167–172, 199.1, 202.1, 212.1, 218; 428/542.8; 29/896.11
See application file for complete search history.

(56) References Cited

U.S. PATENT DOCUMENTS

| | | | | |
|---|---|---|---|---|
| 2,419,248 | A * | 4/1947 | Blanchard | A61C 9/00 433/196 |
| 2,768,440 | A * | 10/1956 | Elliott | A61C 13/1013 433/191 |
| 3,456,347 | A * | 7/1969 | Spinella | A61C 9/00 433/196 |
| 4,337,042 | A * | 6/1982 | von Nostitz | A61C 13/1013 433/171 |
| D374,288 | S * | 10/1996 | Dequeker | D24/181 |
| 5,718,585 | A * | 2/1998 | Dehoff | A61C 13/0004 433/202.1 |
| 6,626,672 | B1 * | 9/2003 | Been | A61C 13/0003 433/223 |
| 8,813,364 | B2 * | 8/2014 | Schechner | A61C 5/77 29/896.11 |
| 9,308,063 | B2 * | 4/2016 | Ferrilli | A61C 13/081 |
| 2002/0175430 | A1 * | 11/2002 | Glidewell | A61C 5/77 264/16 |
| 2003/0162147 | A1 * | 8/2003 | Dequeker | A61C 13/1016 433/167 |
| 2004/0158342 | A1 * | 8/2004 | Wolf | A61C 5/77 700/98 |
| 2004/0197738 | A1 * | 10/2004 | Ban | A61C 13/26 433/202.1 |
| 2006/0263749 | A1 * | 11/2006 | Koide | A61C 13/097 433/197 |
| 2006/0286507 | A1 * | 12/2006 | Dequeker | A61C 13/1013 433/167 |
| 2007/0031789 | A1 * | 2/2007 | Zel | A61K 6/807 433/202.1 |
| 2009/0104584 | A1 | 4/2009 | Ferrilli | |
| 2010/0015570 | A1 * | 1/2010 | Kutzner | A61K 6/818 433/167 |
| 2010/0151419 | A1 * | 6/2010 | Kadobayashi | A61C 13/0003 433/171 |
| 2012/0148988 | A1 * | 6/2012 | Castillo | A61C 5/77 433/222.1 |
| 2012/0171640 | A1 * | 7/2012 | Guy | A61C 13/0022 433/203.1 |
| 2013/0168887 | A1 * | 7/2013 | Korten | A61C 13/0003 264/16 |
| 2015/0037757 | A1 * | 2/2015 | Kwan | A61C 8/0051 433/174 |
| 2015/0313693 | A1 * | 11/2015 | Hagenbuch | A61C 13/1006 433/213 |
| 2016/0220337 | A1 * | 8/2016 | Steger | A61C 13/0022 |
| 2017/0100214 | A1 * | 4/2017 | Wen | A61C 7/002 |
| 2017/0135790 | A1 * | 5/2017 | Boehm | A61C 13/0004 |
| 2017/0252133 | A1 * | 9/2017 | Heffelfinger | A61C 13/0004 |
| 2017/0252134 | A1 * | 9/2017 | Reichert | B28B 11/243 |
| 2017/0312061 | A1 * | 11/2017 | Slavicek | A61C 13/00 |
| 2017/0360536 | A1 * | 12/2017 | Alqarawi | C04B 37/005 |
| 2018/0078348 | A1 * | 3/2018 | Ruppert | A61C 13/206 |
| 2019/0175316 | A1 * | 6/2019 | Amann | A61C 13/0004 |
| 2020/0015947 | A1 * | 1/2020 | Geier | A61C 13/206 |

FOREIGN PATENT DOCUMENTS

| | | | | |
|---|---|---|---|---|
| DE | 102009019447 A1 * | 11/2010 | ......... | A61C 13/0022 |
| JP | 2007236465 A | 9/2007 | | |
| JP | 2010220714 | * 10/2010 | | |
| WO | WO-2016138994 A1 * | 9/2016 | ............... | A61C 5/77 |

* cited by examiner

Fig. 1

| | | | | | | |
|---|---|---|---|---|---|---|
| Phonares Lingual upper | LU3 | | B61 | | | A11 |
| | LU5 | | B62 | | | A12 |
| | LU6 | | B63 | | | A13 |
| Phonares Lingual lower | LL3 | | B71 | | | A14 |
| | LL5 | | B72 | | | A15 |
| | LL6 | | B73 | | | A17 |
| Phonares Typ upper | NU3 | P | B81 | U | | A22 |
| | NU5 | h | B82 | P | | A24b |
| | NU6 | o | B83 | P | | A25 |
| Phonares Typ lower | NL3 | n | S61 | E | S | A26 |
| | NL5 | a | S62 | R | _ | A27 |
| | NL6 | r | S63 | | P | A42 |
| S_PE upper | N3U | e | S71 | | E | A44 |
| | N4U | s | S72 | | | A54 |
| | N5U | | S73 | | | A66 |
| | N6U | | S81 | | | |
| S_PE lower | N3L | | S82 | | | |
| | N4L | | S83 | | | |
| | N5L | | L51 | | | A03 |
| | N6L | | L52 | L | L | A05 |
| | | | L53 | O | O | A06 |
| | | | L54 | W | W | A08 |
| | | | L55 | E | E | A09 |
| | | | | R | R | |

Fig. 31A
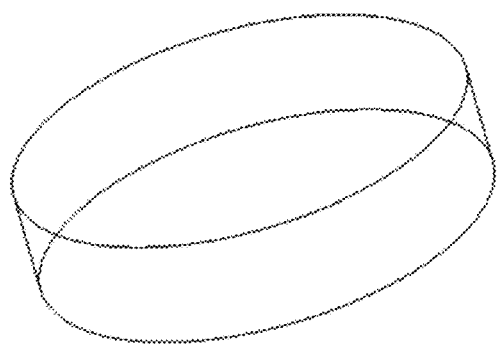
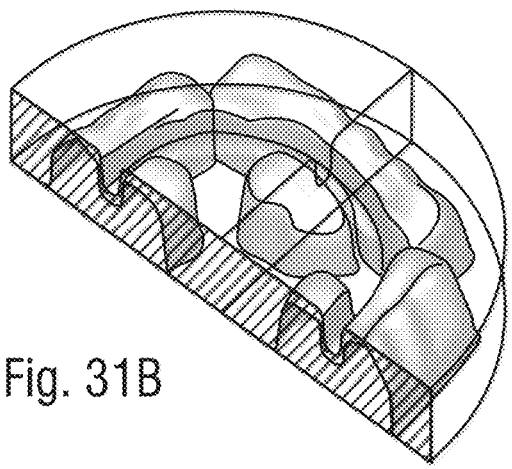
Fig. 31B
Fig. 31C 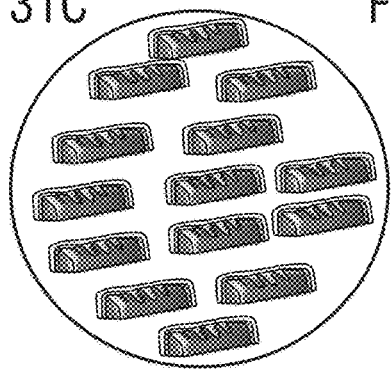 Fig. 31D 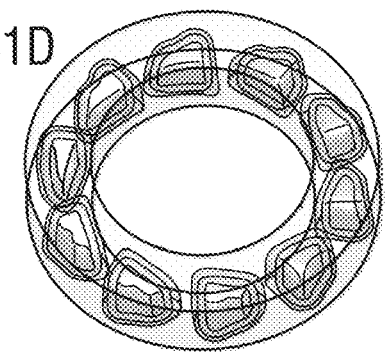

Fig. 32C

Original standard layering

Original standard layering

03 Section

04 Section

05 Section

03 Section

04 Section

05 Section

Fig. 62A
Fig. 62B
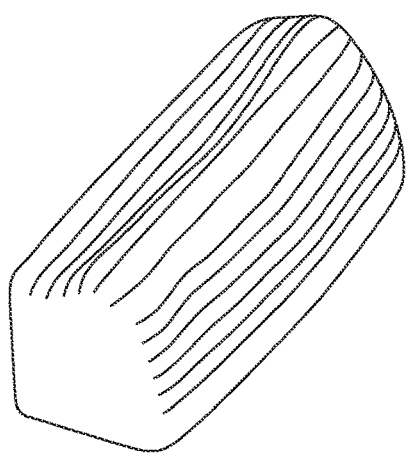
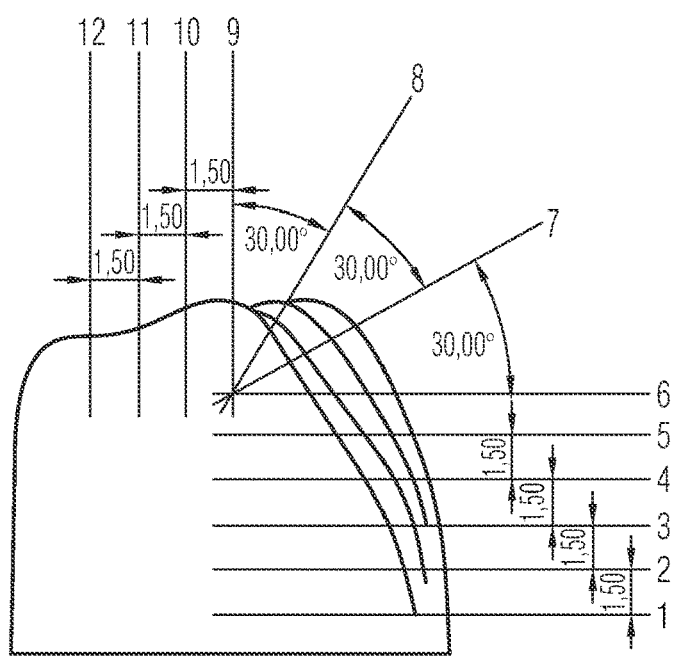
Fig. 63
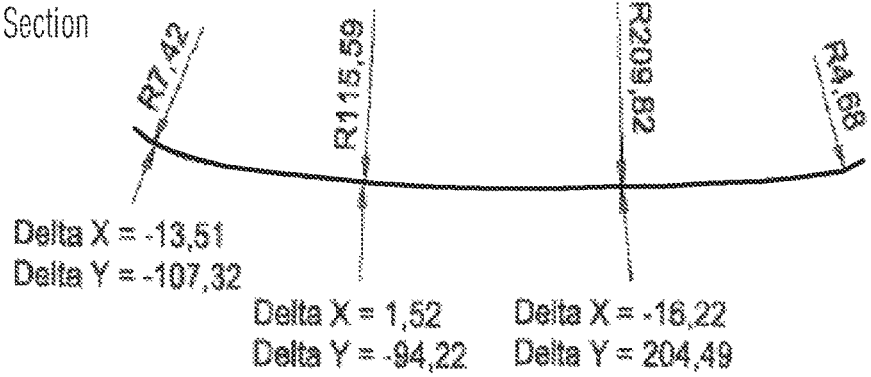
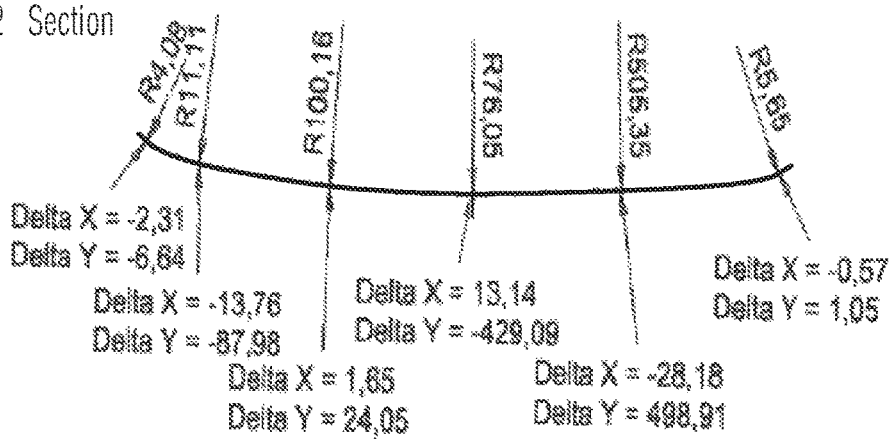

03 Section

04 Section

05 Section

06 Section

11 Section

12 Section

01 Section

02 Section

03 Section

04 Section

05 Section

06 Section

07 Section

08 Section

Fig. 69

01 Section

R64,99  R150,60  R5,71

Delta X = -2,57
Delta Y = -85,88

Delta X = -18,95
Delta Y = 143,64

02 Section

R83,92  R60,18  R5,78

Delta X = -0,08
Delta Y = -6,27

Delta X = -19,82
Delta Y = 84,14

Delta X = 0,95
Delta Y = -1,13

03 Section

R74,16  R117,88  R5,80

Delta X = 0,61
Delta Y = -43,55

Delta X = -20,06
Delta Y = 110,26

Delta X = -1,56
Delta Y = 1,73

04 Section

R65,30  R111,19  R73,84  R4,52

Delta X = 0,05
Delta Y = -46,00

Delta X = -4,71
Delta Y = 37,05

Delta X = -16,62
Delta Y = 67,51

Delta X = 0,74
Delta Y = -0,25

US 11,617,635 B2

PARTIAL DENTAL ARCH AND METHOD FOR MANUFACTURING A PARTIAL ARCH

CROSS-REFERENCE TO RELATED APPLICATIONS

This application is a National Stage application of International patent application PCT/EP2017/059169 filed on Apr. 18, 2017, which claims priority to European patent application No. 16165760.6 filed on Apr. 18, 2016, the disclosures of which are incorporated herein by reference in their entirety.

FIELD OF THE INVENTION

The invention relates to a partial dental arch blank as well as to a process for producing a partial dental arch blank.

BACKGROUND OF THE INVENTION

It has been known for long that dental restorations, in particular teeth, may be produced by CAD/CAM to fit perfectly. Corresponding blanks are frequently present in the shape of a disc and are subjected to milling.

It has also been known for long, for instance from U.S. Pat. No. 5,151,044, to construct blocks of this type in a multi-layered manner. This enables to color the dentin material different from the cutting material to achieve an aesthetically satisfying result.

As is known, teeth have to be aligned relative to one another such that—in accordance with U.S. Pat. No. 5,151,044—protrusions which extend away from one another are provided which may serve as a milling base and which may also form auxiliary means for the alignment process.

Multi-layered teeth—and respective blanks be it from composite, plastic materials or different ceramic materials—have become known in several configurations. For instance, tests have been carried out to provide semi-finished products which enable the production of a tooth within a predefined spatial structure after pre-fabrication of the semi-finished product. In this respect, it is referred to EP 0 850 601 A2 and DE 19 654 055 A1.

A particularly successful example of the provision of a dental restoration part is the solution according to EP 2 486 892 A1. According to this solution, the different transparency structure of different dental restoration materials is accounted for to provide an appearance which is as natural as possible.

Due to the fine structure by means of the voxels thereat an appearance full of nuances and thus coordinated optimally may be achieved. However, the process mentioned therein requires considerable effort and is thus rather suitable for the high-cost segment.

When dental restoration parts are produced it is differentiated between constructive or generative processes on the one hand and removing processes on the other hand. The production of dental restoration parts using firing processes or pressing processes belongs to the constructive processes. For this purpose, a positive model is initially produced based on a scan of the environment of the dental restoration part to be inserted by means of CAD/CAM, for instance made of plastic or wax. It is cast, for instance using a muffle, and the positive model is removed thermally such that a cavity remains which corresponds to the dental restoration part to be produced.

In case of a typical pressing process, ceramic material is pressed into the cavity. This process is relatively time-consuming and requires thermal treatment in any case but offers the advantage of a high surface finish quality and also a good quality of the dental restoration part which may also be multi-layered in accordance with a process developed by the present applicant.

Processes of this type also include the provision of industrially pre-fabricated restoration parts such as a prefacet which are produced, for instance, by means of a firing process or a pressing process and which are then inserted after adjustment to the original situation.

In contrast, the production of dental restoration parts from blocks to be milled is considerably more time-saving and includes the process according to the above-mentioned U.S. Pat. No. 5,151,044. A further removing process working with several layers may be taken from EP 807 422 A1. This process strives for a durable dental restoration without placing special emphasis on aesthetical aspects.

Typically, patients expect the provision of cost-effective dental prostheses of high and aesthetically appealing quality. At the same time, the dental prosthesis is to be provided in appropriate time.

In order to fulfill these requirements, in case of both above-mentioned processes teeth or at least crowns are typically kept ready in different sizes and at least the main colors. Then, in some cases, the painting technique is used to carry out the aesthetical fine adjustment to the patient.

As is known, teeth may have very different sizes depending on the patient. Even if only the basic colors are provided, a large plurality of teeth is to be stored and later to be individualized.

Thus, partial dental arches have been suggested particularly for full or partial prostheses but also for dental restorations which relate to several adjacent teeth. A partial dental arch is at least two teeth which are adjacent to one another in the mesial or distal direction and whose mesial/distal axes intersect with one another or are at least not parallel with one another such that they form an arch in this respect.

Typical partial dental arches comprise three or four teeth but may also consist of two or five teeth in individual cases.

Partial dental arches of this type may be produced comparatively easily, for instance by milling, but also require substantially greater requirements to logistics and storage.

SUMMARY OF THE INVENTION

With respect to the existing difficulties the invention is based on the task of providing a partial dental arch blank and thus a dental restoration part produced using the partial dental arch blank in accordance with the attached claims as well as a process of producing a partial dental arch in accordance with the attached claims which enable an aesthetically extremely satisfying restoration result while having low production and storage costs.

This task is inventively solved by the claims. Advantageous developments may be taken from the subclaims.

According to the invention it is provided that a partial dental arch which extends along at least two tooth regions, namely a primary-position tooth region and an additional tooth region which is arranged more distally, is configured in a special manner.

Here, the primary-position tooth region is the mesially arranged tooth region, or the most mesial tooth region in case of at least three tooth regions.

According to the invention it is made use of the fact that this tooth region is typically most relevant from an aesthetical point of view and thus needs to be designed particularly thoroughly.

According to the invention a partial dental arch having at least two layers or materials is provided, namely at least a dentin material and a cutting material, also known as an enamel material. The—three-dimensional—boundary area or boundary surface therebetween is configured specially. At the primary-position tooth region the boundary area or boundary surface is configured to have a convexity corresponding to the natural dentin boundary area course and is thus intensely structured. Also in case of the next tooth region, the so-called secondary-position tooth region, convex structuring is provided which is similar to the natural dentin boundary area course. However, it is less strongly distinct than with the primary-position tooth region, and the transition between the primary-position tooth region and the secondary-position tooth region is configured as a wave running in the concave direction, when viewed both from the vestibular direction and from the occlusal direction.

In this respect, there is a necking, also known as an indentation, between the primary position and the secondary position on the side of the boundary area which is, however, considerably smaller than 50 percent and amounts to particularly less than 20 percent.

According to the invention, a wavy structure of the three-dimensional boundary area is provided altogether whose amplitude decreases when viewed in the distal direction, particularly in one section. The decrease of the amplitude of the wavy structure may amount to for instance 3 to 10 percent.

The inventive solution is particularly suitable for milling, that is to say for a removing process. In order to provide for the inventive wavy structure of the boundary area different tooth shapes and tooth sizes are preferably laid on top of each other automatically by CAD according to the invention. For this purpose, a "best fit" is set for the primary-position tooth region, and the boundary area course averaged in this way is then used as a basis for the production.

Here, it is to be understood that not only the primary tooth but also the additional teeth which are used as a basis for the partial dental arch are set up properly, that is to say also corresponding to the anatomical curves in the mouth (curve of Spee, curve of Wilson, curve of Monson, etc.).

The above-mentioned wavy structure relates to the three-dimensionally extending boundary area between the dentin material and the cutting material. In this respect, the wavy structure is provided when viewed both from the vestibular direction and from the occlusal direction. Here, wave troughs correspond to the respective interdental spaces and wave crests to the tooth regions, that is to say the primary-position tooth regions, the secondary-position tooth regions, etc.

According to the invention, the boundary area, but also the outer surface of the cutting material, is initially determined by CAD. Determination of the outer surface takes place—at least in case of partial dental arches—based on a scan of the interior of the mouth of the patient using tooth libraries which revert to tried and tested teeth with respect to the shape, size and the structure which are similar to the natural teeth in their existing variation.

Now, according to the invention, a milling blank is provided which consists of at least two materials, for instance of dentin material and cutting material, or possibly also of a third or even fourth material. The boundary area is wavy in a particular manner according to the invention such that the amplitude of the wavy structure decreases when viewed in the distal direction.

It is to be understood that for the invention disc-shaped standard blanks may be used favorably having a standard diameter of 98 or 100 mm. Blanks of this type may be divided into numerous regions, for instance three, five, ten or even twenty regions, which may be provided inventively for realizing dental restorations. One primary-position tooth region is provided each which is characterized by a particularly convexly configured boundary area of the dentin material and whose position is known and taken into consideration accordingly during the milling process.

In order to produce dental restorations from the milling blank, the milling blank is initially stored virtually in the CAD/CAM program with its specially shaped boundary area. Based on this storage a suitable region for the provision of the inventive partial dental arch is chosen, and the envelope of the cutting material but also of the basal surface in the region of the dentin material is determined by CAD. Determination may be carried out at least partially in accordance with automated specifications, possibly also with user intervention.

The STL data produced based thereon is forwarded to the dental milling machine. The inventive milling blank comprises at least one, preferably two reference points which enable exact alignment between the stored virtual image and the actual clamping position of the milling blank in the associated workpiece holder.

Based on the STL data, the inventive partial dental arch is now milled from the milling blank, typically while leaving holding bars which enable removal.

In a way known per se the partial use of the milling blank, that is to say for instance of a correspondingly shaped disc, is stored such that it is known to the CAD/CAM device which regions of the milling blank are already used such that a region which has been unused up to now is chosen for the next production requirement of a partial dental arch.

The inventive partial dental arches exhibit significant advantages compared to the use of individual teeth. If they are used for prostheses, for instance, optimally configured adhesive bonding surfaces are available which improves the quality of the prosthesis or partial prosthesis produced in this way.

In the region of the interdental spaces the inventive wavy structure prevents the dentin layer which is less transparent and rather dark in most cases from standing out clearly. The most visible one of the interdental spaces, namely the interdental space between the primary-position tooth region and the secondary-position tooth region comprises the strongest necking and thus the lowest visibility of the dentin layer. This holds true both when a particularly large and when a particularly small tooth is milled from the milling blank as then the difference of the position between the smallest and the largest teeth is smallest in this interdental space.

Thus, the inventive partial dental arch is characterized by a "best fit configuration" for the primary-position tooth region. It is always the most visible one, while distally arranged tooth regions are typically less relevant in terms of aesthetics.

Surprisingly, considerable cost-savings may be achieved by pre-fabrication of corresponding milling blanks which may then be processed in any desired suitable manner to become partial dental arches without having to accept aesthetical compromises.

Besides the size of the individual teeth, the arch radius is also a relevant size for partial dental arches. Here, in an advantageous configuration of the invention, to achieve an aesthetically satisfying result the primary-position tooth region is again arranged according to "best fit" in such a way that the cutting material around the convexly configured dentin material comprises a minimum layer thickness on all sides, that is to say in the occlusal and in the vestibular direction, but also in the mesial direction of the primary-position tooth region or in the lingual direction, respectively, already in the design phase.

Typically, the arch radius is smaller in case of smaller sized teeth. Even if the arch length is larger, having for instance six teeth, the virtual partial dental arch is preferably swiveled in the design phase such that a minimum layer thickness of the cutting material in the occlusal and vestibular regions is not undercut, at least in the tooth regions. Here, the primary-position tooth region is determined to be the swiveling center.

According to the invention, it is particularly favorable that differently sized fragments or partial dental arches, altogether between two and preferably five, or in extreme cases even up to 14 teeth, may be milled in one piece with an adapted color and translucency set-up. In doing so, an advantage specific to partial dental arches results in the fact that an additional alignment of individual teeth to one another is not required anymore facilitating the vertical alignment of the teeth.

According to the invention, it is particularly favorable that the occlusal surfaces of the tooth regions of the inventive partial dental arch may be determined relative to one another in advance, that is to say during the design phase.

If functional, that is to say dynamic anatomical data is provided based on the impression, the relative design of the occlusal surfaces of the upper jaw and the lower jaw partial dental arch may be optimized in this way based also on functional aspects.

In an advantageous configuration of the invention it is provided to mirror the dentin layer in the horizontal direction to provide partial dental arches for the right- and the left-hand side. Individualization may still be realized by configurations of the respective cutting material layers adapted to the anatomic situation.

A further possibility of individualization is to determine the position of height of the dentin material or dentin material layer. The share of cutting material is increased by lowering in the gingival direction and reduced by shifting in the occlusal direction.

In a further preferred configuration it is provided to provide an additional layer basally or gingivally relative to the dentin layer.

In a further configuration it is provided to provide a translucent intermediate layer between the cutting material layer and the dentin material layer.

In an advantageous configuration of the invention it is provided that the sequence of the wavy structure changes when viewed from the mesial to the distal direction. Depending on the type of partial dental arch this may be an increase in frequency, for instance when the primary-position tooth region corresponds to tooth 1, or a decrease when the partial dental arch covers for instance position 3 to 7.

In an inventively favorable configuration it is provided to provide a partial dental arch with the teeth 1 and 2, and an additional one with the teeth 3, 4, 5, 6, 7. Typically, in case of a division of this type the differences in curvature of the arches between small and large teeth or sets of teeth, respectively, are not very large, and thus there is the additional swiveling possibility at the division between tooth 2 and tooth 3. This is also preferred due to the natural change of color of anterior tooth-canine tooth.

An alternative possibility of division is as follows: 123/4567.

In an advantageous configuration a partial dental arch is realized basically as a circular arch starting from the mesial side at the mesial end when viewed in section parallel to the occlusion plane such that the occlusion side extends substantially equidistantly to a curve of Wilson or Monson to provide accurate curvature relative to a jaw bone curvature.

This circular arch merges into a wave line which substantially corresponds to a sine wave, however having a changing frequency and amplitude. The frequency decreases at least partially in the mesial/distal direction, but this does not exclude that there is also an increase in frequency in certain sections. Particularly in case of a partial dental arch for the teeth 3-4-5-6-7 the maximum amplitude may possibly only be reached after the first tooth, that is to say the canine/3rd tooth. This holds true particularly for shorter partial dental arches than partial dental arches comprising 5 teeth as the maximum amplitude is preferably closer to the mesial than the distal end.

Construction of a partial dental arch is realized preferably based on tooth library shapes. Typically, tooth libraries have a size spectrum and different tooth shapes are preferably superimposed on one another according to the invention. Superimposition is preferably carried out virtually such that a medium tooth shape is basically produced. They are also superimposed for adjustment to different tooth sizes such that an adjustment to a medium tooth size is preferably carried out according to the invention.

It is to be understood that the tooth size adjustment may be refrained from at least partially, if necessary, such that for instance three sizes of partial dental arches may be offered, that is to say a small, a medium-sized and a large tooth size of the partial dental arch.

A particularly three-dimensional scaling factor may be used if necessary for tooth size consideration such that the inventive partial dental arch is based on combined empirical and mathematical production instructions in this configuration.

When realizing rearward partial dental arches, that is to say partial dental arches which start with the canine tooth or the first premolar, ridge lines of the boundary area between the dentin material and the cutting material are inventively produced along the vestibular or the lingual cusps of the teeth. The virtual superimposition of different existing tooth lines results in the fact that the vestibular ridge line is much more wavy than the lingual one.

This means that the vestibular dentin material side which is visible more clearly is structured considerably more clearly—which does not only hold true when viewed from the occlusal direction but also when viewed from the vestibular direction. There, the inventive wavy structure is considerably more distinct.

BRIEF DESCRIPTION OF THE DRAWINGS

Further advantages, details and features will result from the following description of different embodiments of the invention in conjunction with the drawings FIG. 1 shows an overview of the tooth lines of the present application which were used for the provision of the virtual shapes of the boundary area by means of superimposition wherein the table on the left-hand side refers to the teeth 3 to 6 and the table on the right-hand side refers to the incisors;

FIGS. 31a and 31b show illustrations of dental milling blanks in the shape of a disc, wherein from FIG. 31b layering courses of the boundary layer of the dentin material are already present;

FIGS. 31c and 31d show further arrangement possibilities of partial dental arches in milling blanks in disc-shape;

FIGS. 32a to 32c show further arrangement possibilities of the dentin material boundary area schematically illustrating the cutting material envelope;

FIG. 62A shows an embodiment of the invention in an illustration according to FIG. 50A illustrating a partial dental arch for the teeth 4, 5, 6 and 7 in the lower jaw;

FIG. 62B shows a view of the partial dental arch in the embodiment according to FIG. 62A from the mesial view;

DETAILED DESCRIPTION

The tooth types are apparent from the overview according to FIG. 1 which were used in one embodiment of the invention to produce the superimposed partial dental arches.

Basically, the tooth lines SR Phonares and S-PE were used, namely different types thereof. On the one hand Phonares lingual and on the other hand Phonares Typ were used. The letter U indicated at the second position means that the respective set of teeth is provided for the upper jaw, and the corresponding letter L means that the set of teeth is provided for the lower jaw.

"3", "5" and "6" refers to the size of the tooth.

The meaning of the letters L and U and of the numbers 3, 4, 5 and 6 also holds true analogously for the two further tooth lines "Phonares Typ" and "S-PE".

While the left part of the table from FIG. 1 relates to molars and premolars (teeth 3, 4, 5, 6 and 7), the right part relates to incisors, wherein here, too, different shapes of teeth of Phonares B61 to S-PE A09 were selected from the present tooth library separated into upper jaw teeth and lower jaw teeth and provided for the production of partial dental shapes from the superimposition.

Figure 2:
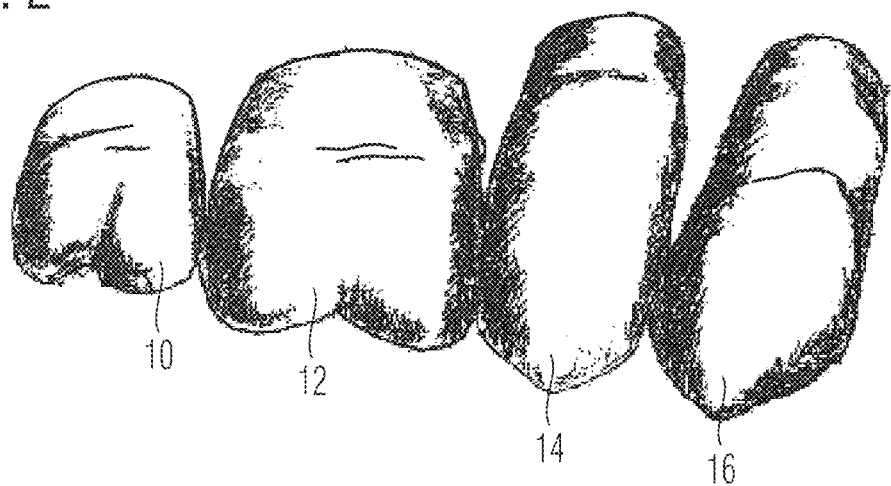
FIGS. 2 and 3 show exemplary illustrations of the teeth from FIG. 1 in the sequence 6-5-4-3 and 2-1.

Exemplarily, FIG. 2 shows molars and premolars illustrated in the vestibular view, with the molars 10 and 12 (tooth positions 7 and 6) and further with the premolars 14 and 16 according to the tooth positions 5 and 4.

Figure 3:
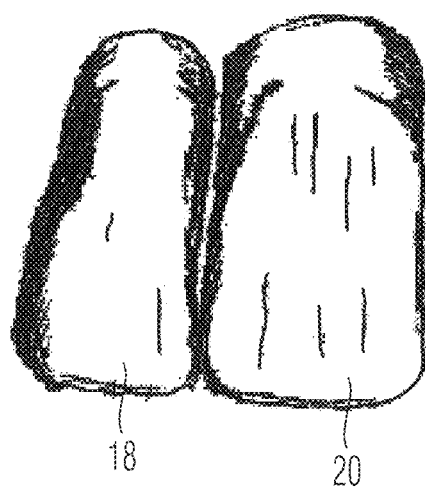

Analogously, FIG. 3 illustrates incisors 18 and 20 which each correspond to the positions 2 and 1.

Figure 4:
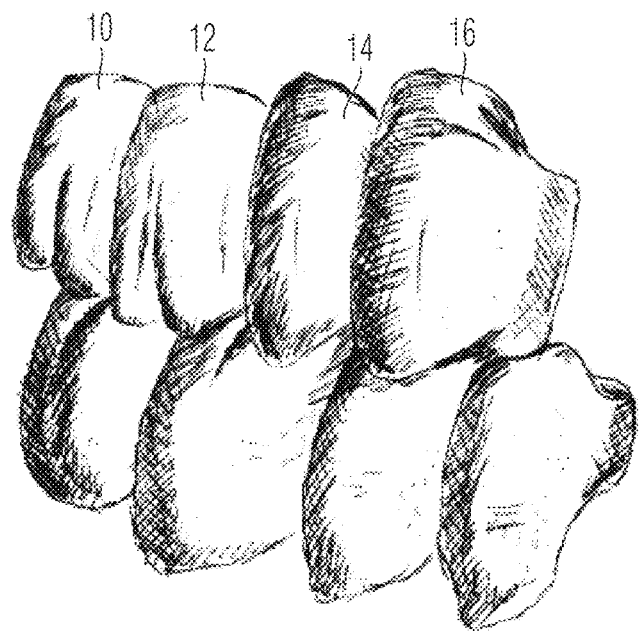
FIG. 4 shows illustrations of the teeth 3 to 6 in occlusion which have been considered during set-up.

Matching lower jaw teeth are selected from the tooth library for these upper jaw teeth, and a functional set-up is carried out according to FIG. 4, wherein the opposing teeth are illustrated in occlusion in FIG. 4.

A corresponding functional set-up is also carried out for the incisors 1 and 2.

In the next production step, the shapes of the teeth are superimposed on each other. Here, this is explained based on the FIGS. 5 to 8 for the teeth 1 and 2.

Figure 5:
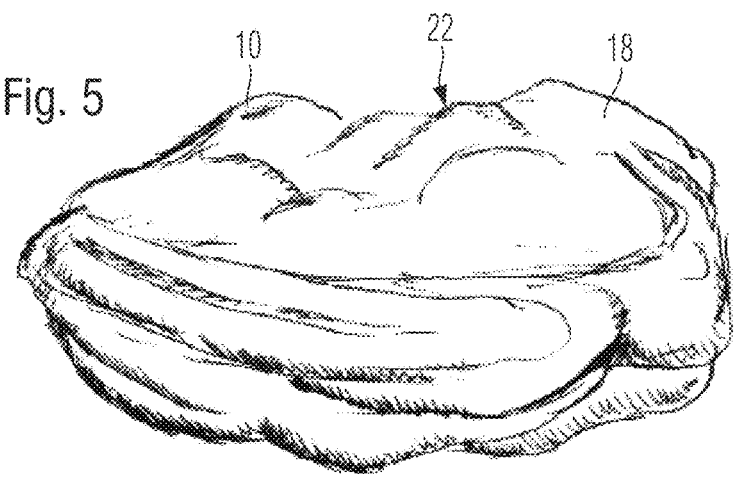
FIGS. 5 to 8 show exemplary illustrations of the set-up data after "superimposition" wherein the most mesial tooth (tooth 1) had the highest priority during alignment.

Basically, it is apparent from FIG. 5 how tooth shapes of different tooth lines for the teeth 1 and 2 were superimposed on each other.

Only the outer shape of the raw partial dental arch constructed in this way is apparent from FIG. 5 but it is to be understood that the same also holds true for the boundary area of dentin/cutting material of which superimpositions are also produced and particularly from 10 percent to 3 percent.

Now, higher priority is given to the tooth 10 illustrated on the left-hand side in FIG. 5 during alignment. It represents the primary-position tooth region. It is apparent that on the lingual side between the teeth 10 and 18 a concavity 22 is provided which basically indicates an interdental space.

Figure 6:
Figure 7:
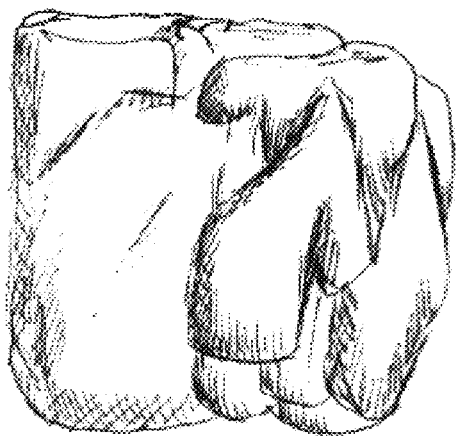
Figure 8:
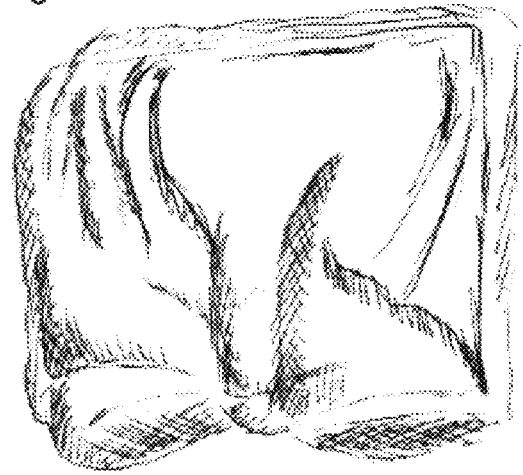

FIG. 6, FIG. 7 and FIG. 8 show the raw partial dental arch 24 in the mesial view (FIG. 6), in the vestibular view (FIG. 7) and in the lingual view (FIG. 8).

Figure 9:
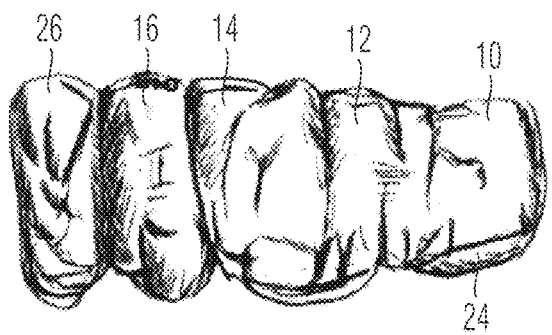
FIGS. 9 to 12 show corresponding illustrations for the teeth 3 to 6.
Figure 10:
Figure 11:
Figure 12:
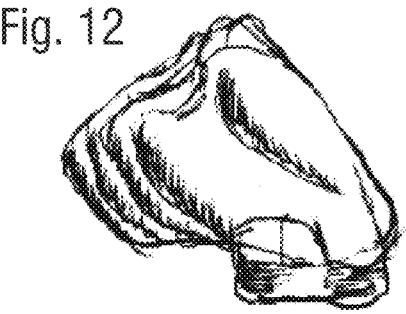
Figure 13:
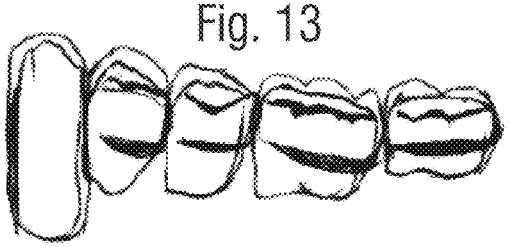
FIGS. 13 to 16 show printed set-up data corresponding to the original layers for the teeth 3 to 7, for the upper jaw and lower jaw, respectively.
Figure 14:
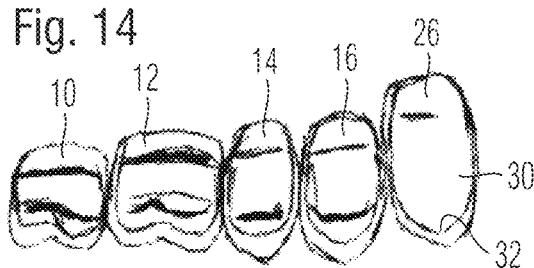
Figure 15:
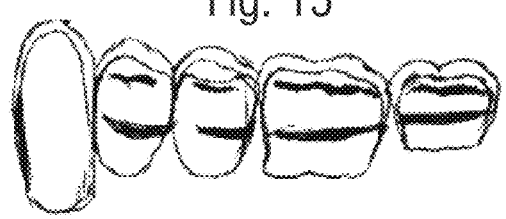
Figure 16:
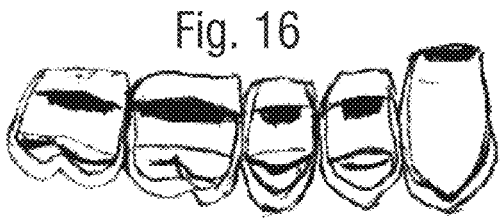

A corresponding raw partial dental arch 24 for the molars is apparent from FIGS. 9 to 12. Here, in turn, FIG. 9 shows the vestibular view, FIG. 10 the occlusal view, FIG. 11 the lingual view and FIG. 12 the mesial view of the raw partial dental arch 24. Here, the highest priority is given to the tooth 26 with the tooth position 3. Here, it represents the primary-position tooth region.

It is apparent that the tooth 26 is limited clearly with respect to the tooth 16 based on the mentioned superimposition which starts with the tooth 26 for different sizes and tooth shapes, while the interdental spaces in case of the following teeth 14, 12 and 10 become more and more blurred and may only be recognized suggestively for instance between the teeth 12 and 10.

As is apparent, the superimposition creates numerous recesses and protrusions which are basically not very suitable as a basis for a universally insertable partial dental arch.

This holds true particularly for the cutting material, while irregularities of this kind are less relevant for the dentin material.

The set-up data collected both with respect to the incisors and with respect to the molars will now be used further. This is illustrated schematically in the FIGS. 13 to 17. It is apparent on the basis of the tooth 26 that the dentin material 30 thereat basically renders an original tooth shape, and is applied on this cutting material 32 with a layer thickness which increases slightly towards the incisal region but is substantially uniform. The dentin material and thus also its boundary area towards the cutting material may be produced based on a mathematical reduction of the interlocked outer geometry of the tooth.

Figure 17:
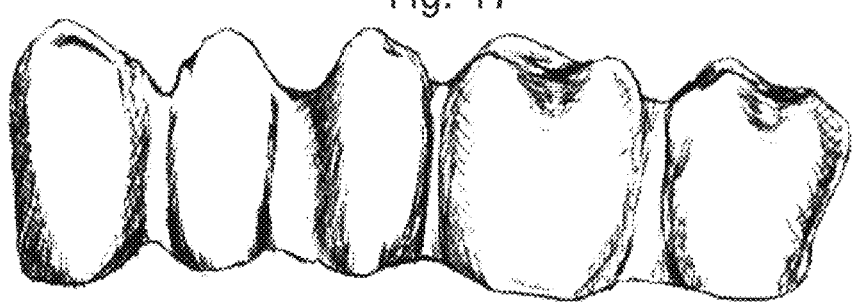
FIG. 17 shows a partial dental arch having a constructed connected layering for the teeth 3 to 7.
Figure 18:
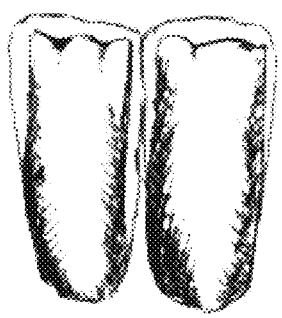
FIGS. 18 to 22 show illustrations of partial dental arches for upper jaw and lower jaw teeth 1 and 2 with first connected layering (FIG. 22)
Figure 19:
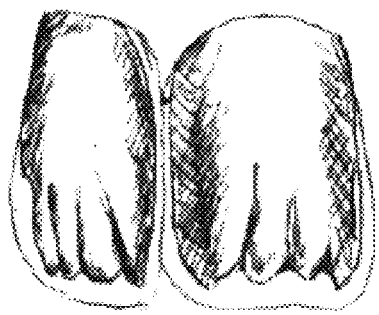
Figure 20:
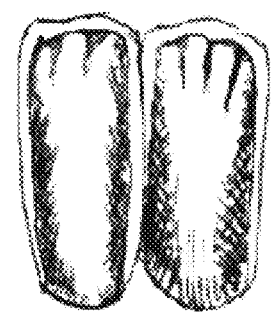
Figure 21:
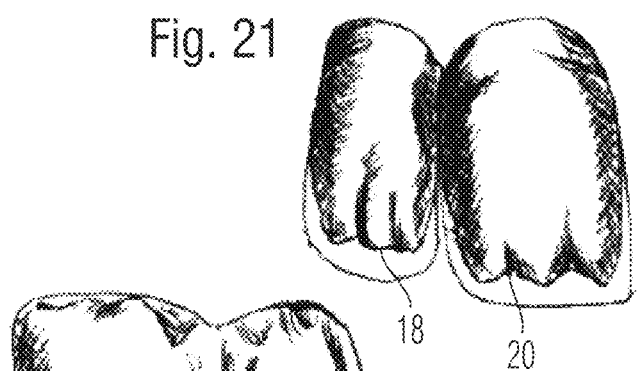

Based on a substantially uniform layer thickness, a connected layering is now constructed in the cutting material according to FIG. 17. It indicates clearly the interdental spaces 34. There, the dentin material may possibly protrude.

The layering for the incisors is provided along the same lines, as is apparent from FIGS. 18 to 22, wherein, here too, a transition is created between the teeth 18 and 20 by means of the inventive wavy structure, and thus interlocking is achieved.

A partial dental arch interlocked in this way is particularly suitable as a milling blank.

It is to be understood that the steps illustrated herein all relate to the draft phase, that is to say that a virtual cutting material etc. is present in this respect.

Figure 22:
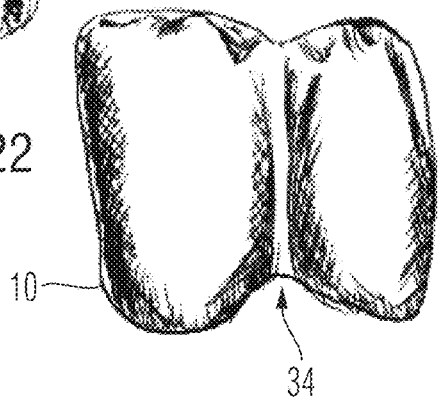

The present results in accordance with the FIGS. 17 and 22 will then be smoothened incisally or occlusally as well as labially or buccally. In addition, the transition corresponding to the interdental spaces 34 is configured as a wave trough such that altogether a buccal wave shape or wavy structure is provided at least in the incisally-close or occlusally-close region of the partial dental arch when viewed from the occlusal direction. This holds true particularly for the vestibular tooth ridge while the wavy structure of the lingual tooth ridge is considerably less distinct.

Figure 23:
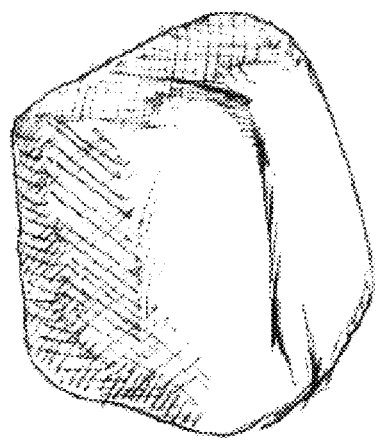
FIGS. 23 and 24 show corresponding layer courses of the teeth 1 and 2 or 3 to 7, respectively, but which have been smoothened with respect to FIGS. 13 to 22, wherein the interdental spaces have been designed more homogeneously.
Figure 24:
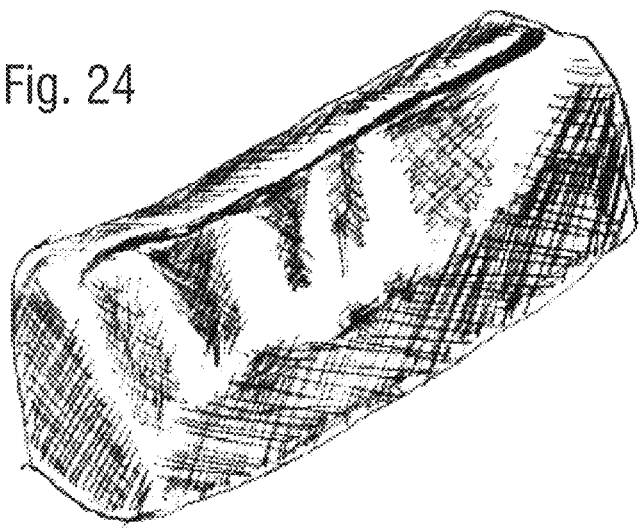
Figure 25:
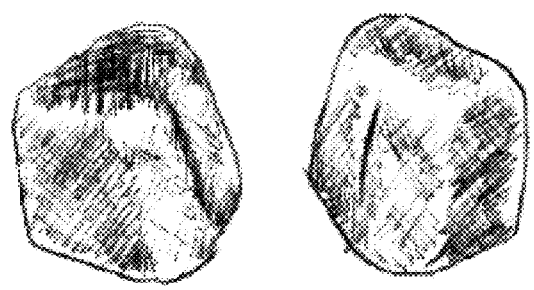
FIGS. 25 and 26 show mirrored partial dental arches compared to FIGS. 23 and 24.
Figure 26:
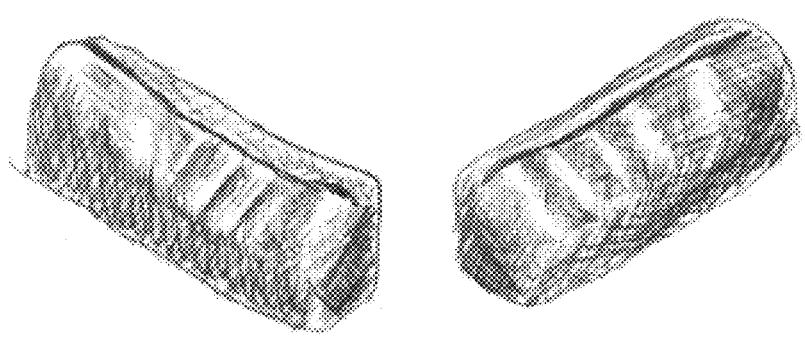

The results obtained in this way according to the FIGS. 23 and 24 are now mirrored according to the FIGS. 25 and 26 for the other half of the prosthesis, respectively, as is apparent from the FIGS. 25 and 26.

Figure 27:
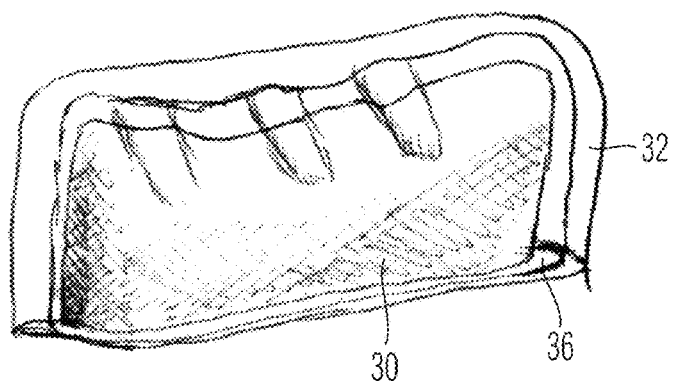
FIGS. 27 and 28 show a modification of the layer courses according to FIGS. 23 and 24 with a shifted layer course and added colors.
Figure 28:
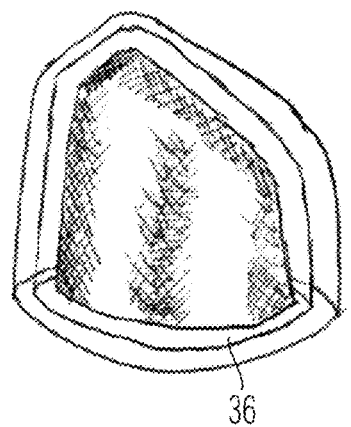

In accordance with FIGS. 27 and 28 the layer course is additionally set off. Between the translucent cutting material 32 and the opaque dentin material 30 an additional transition material 36 is inserted, and in this respect a reduction of the dentin material boundary layer between the dentin material 30 and the transition material 36 takes place at least with respect to the originally constructed raw partial dental arches.

As is apparent from the FIGS. 27 and 28, a certain homogenization of the layer thickness of the cutting material 32 takes places additionally.

Figure 29A:
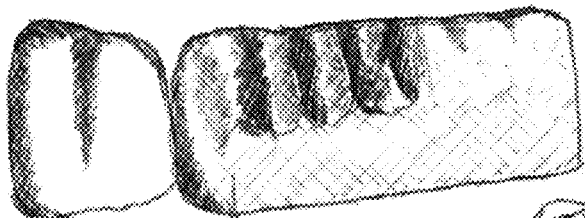
FIGS. 29a to 29f show illustrations of different dentin material boundary layers divided as 1-2 with 3-7 or 1-3 with 4-7, respectively.
Figure 29B:
Figure 29C:
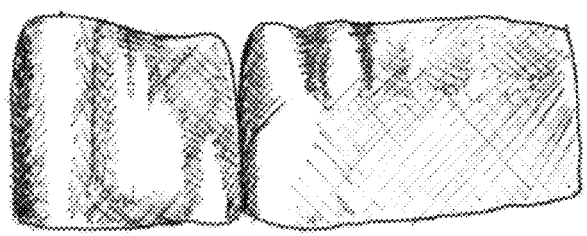
Figure 29D:
Figure 29E:
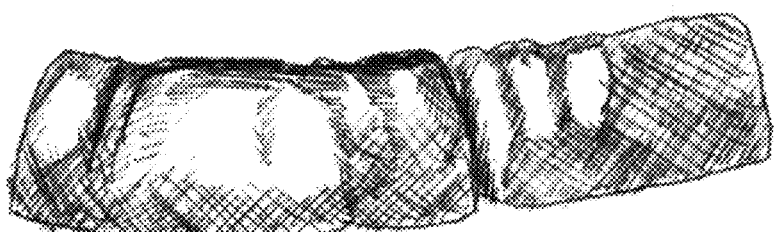
Figure 29F:
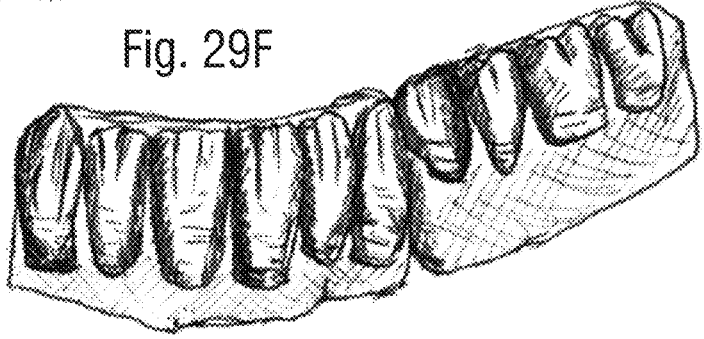

Alternatively to the division 12-34567 illustrated herein, as is also expressed in the FIGS. 29a and 29b, it is also possibly to make another division. According to FIG. 29c, the teeth are divided as follows: 123-4567, and according to FIG. 29e the teeth are divided as follows: 321123-4567.

Figure 30A:
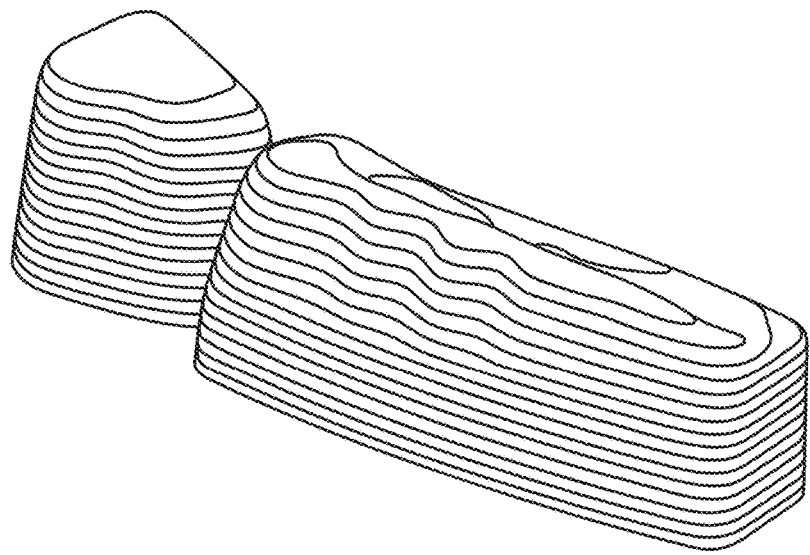
FIGS. 30a and 30b show illustrations of dentin material boundary layers additionally illustrating horizontally extending curves with antinodes of vibration.
Figure 30B:
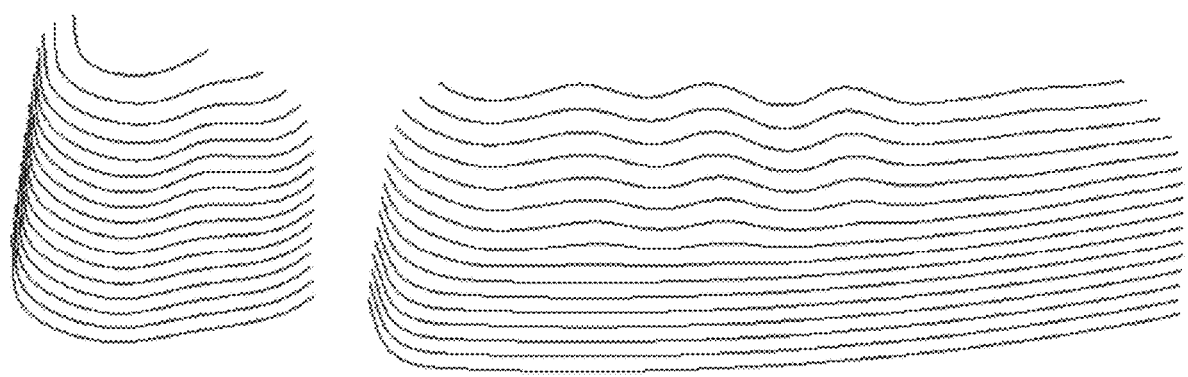

For mathematical processing, a layer detection of the respectively existing horizontal profiles takes places, as is apparent from FIG. 30a and FIG. 30b.

According to the FIGS. 31 and 32, different production possibilities for the inventive partial dental arches are apparent. Initially, a commercially available blank according to FIG. 31a may be used which comprises the shape of a disc and a diameter of almost 100 mm. Within it, partial dental arches may be accommodated in any desired manner according to the FIGS. 31b and 31c. The blank may consist of dental plastic material, composite material or ceramic material.

According to FIG. 31d, the blank is illustrated to have a ring-shape which is particularly suitable for the accommodation of partial dental arches 1-2.

Figure 32A:
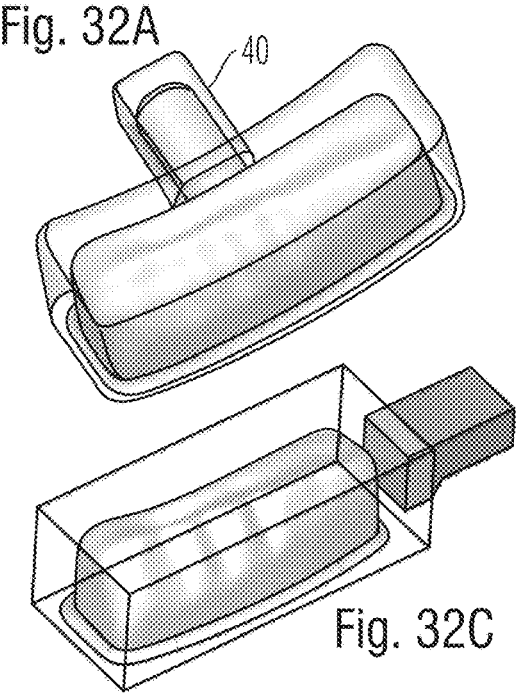
Figure 32B:
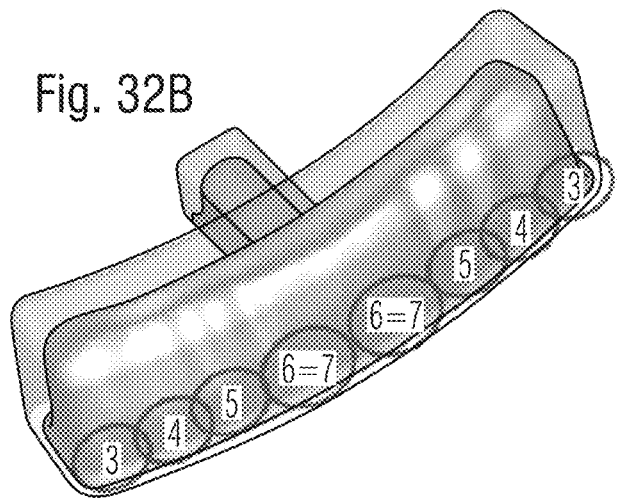
Figure 33A:
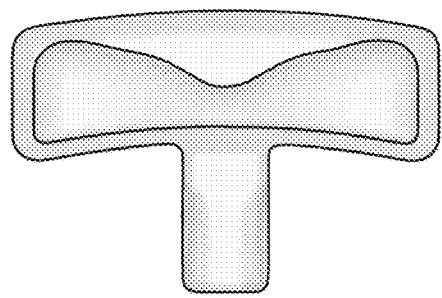
FIGS. 33a to 35 show further illustrations of the dentin material boundary area for use with any desired outer geometry.
Figure 33B:
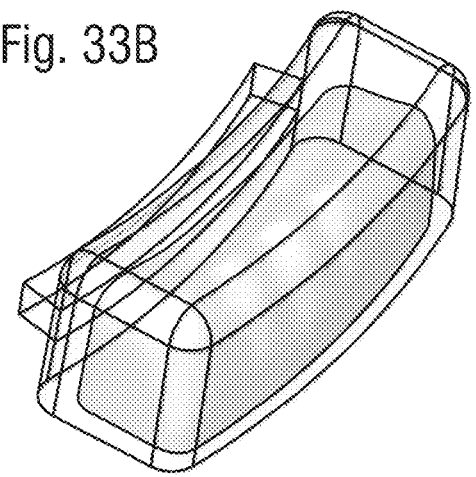
Figure 34:
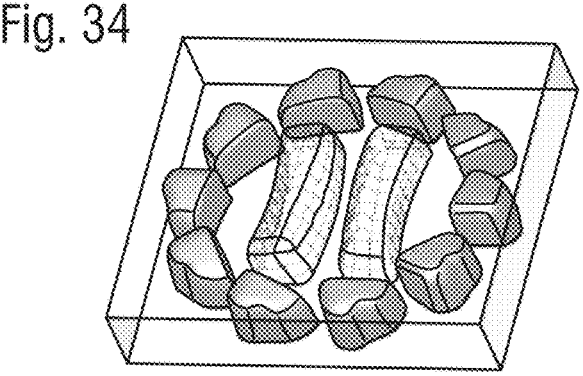
Figure 35:
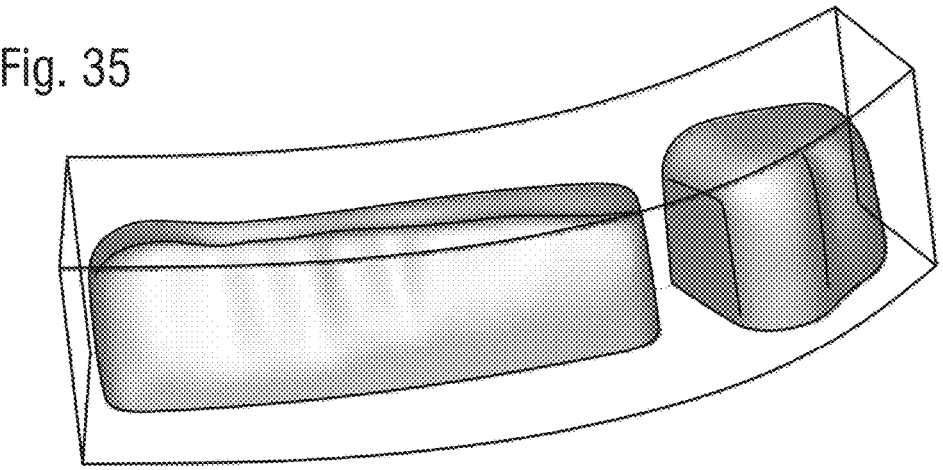

It is also possible to realize a holding pin 40 with the FIGS. 32a and 32b or according to FIG. 32c which serves as a basis for mounting during milling.

FIGS. 33a and 33b, 34 and 35 show different types of accommodation of partial dental arches in different blanks.

Figure 36:
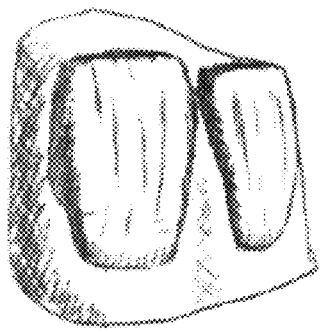
FIGS. 36 and 37 show illustrations for comparison of the original layering according to the existing tooth libraries with the layering using the inventive partial dental arches.
Figure 37:
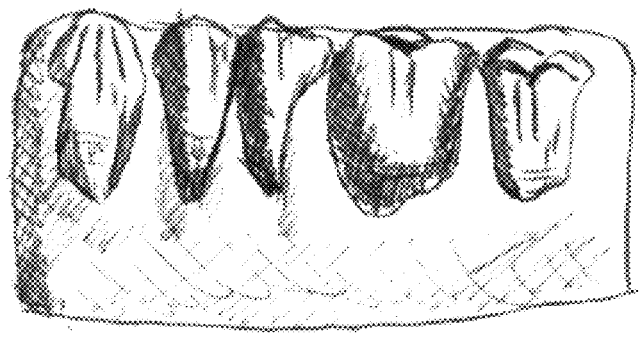

During set-up, the positioning upon completion is realized according to FIGS. 36 and 37 such that the layering is as close as possible to the target layering. In each case, the tooth arranged most mesially is used as a basis for positioning.

Figure 38:
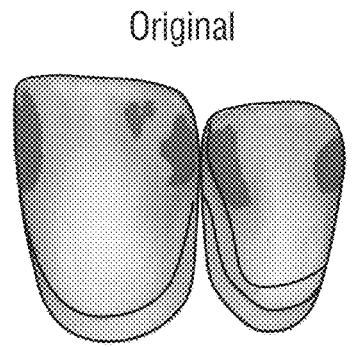
FIGS. 38 and 39 show a slightly schematized view of the layering course during milling from partial dental arches to individual teeth, compared to the original individual teeth.
Figure 38:
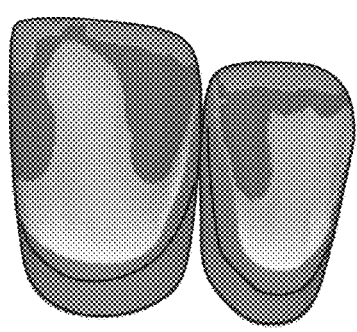
Figure 39:
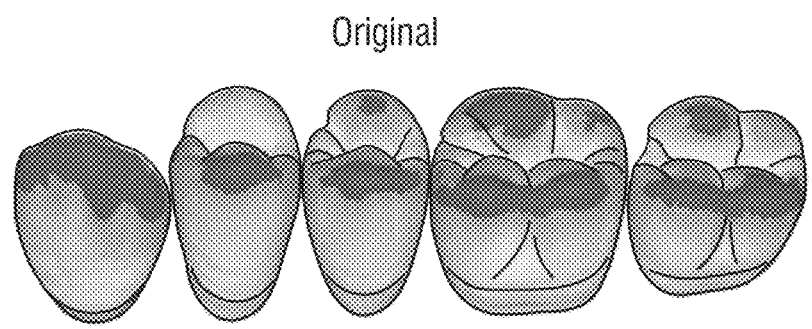
Figure 39:
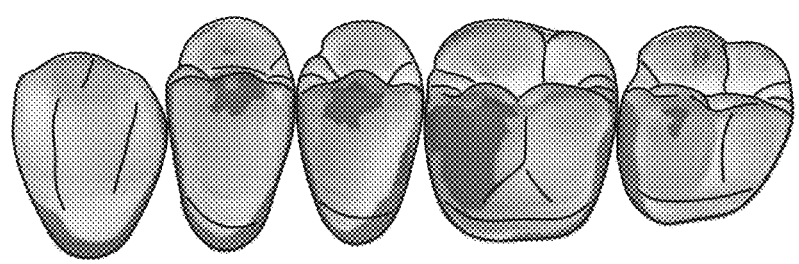

Now, the partial dental arch produced by standard layering is milled in a way known per se such that the layering is as close as possible to the original. This is apparent from the FIGS. 38 and 39.

It is also possible to realize the "best fit" of the selected interlocking of the tooth parts by software, for instance similar to the least squares method. In doing so, of course the primary tooth position has to be provided with a higher weighting than the secondary tooth position and further positions.

Figure 40:
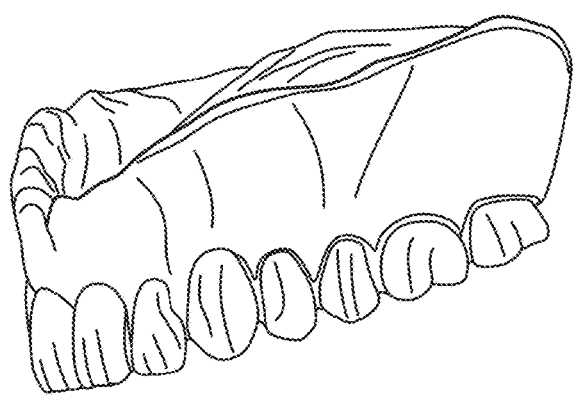
FIG. 40 shows a view of a set of teeth using teeth which are produced from partial dental arches and divided into individual teeth, wherein the partial dental arches were divided into 1-2 left 1-2 right 3-7 left and 3-7 right according to FIG. 41.

A correspondingly produced prosthesis already equipped with teeth is apparent from FIG. 40. It is apparent that tooth material, here dentin material, remains in the transition area between the interdental spaces. It is typically darker than cutting material such that the aesthetical effect is similar to that of individual teeth.

Figure 41:
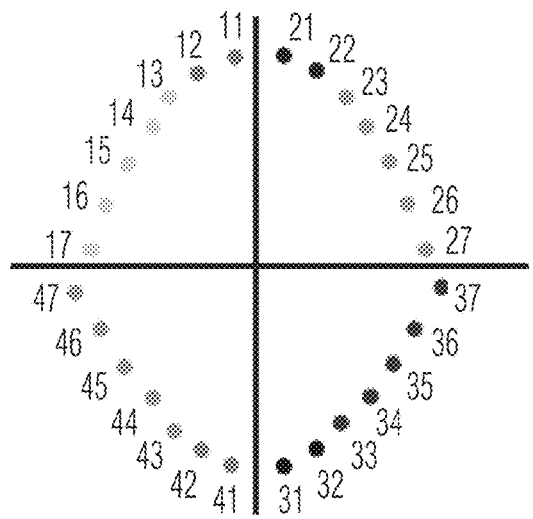
FIG. 41 shows the division of partial dental arches.

According to FIG. 41 any splitting is possible. Here, the teeth 12 and 11 on the one hand, and 13 to 17 or 23 to 27 on the other hand are each summarized in one partial dental shape.

The same holds true for the teeth of the lower jaw.

Figure 42:
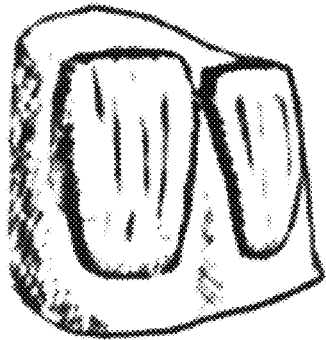
FIGS. 42 and 43 show views of the tooth set-up similar to FIGS. 36 and 37 wherein a "best fit" shift with respect to tooth 1 or tooth 3, respectively, has been carried out.
Figure 43:
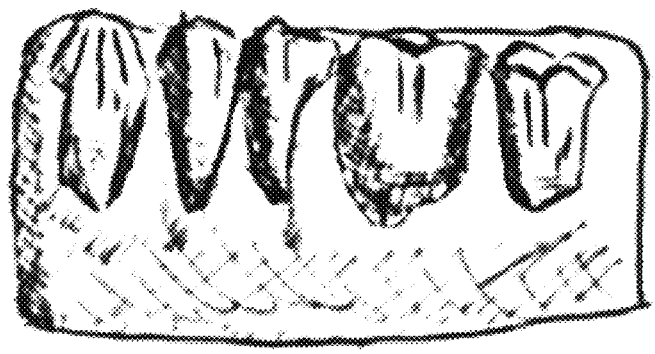
Figure 44A:
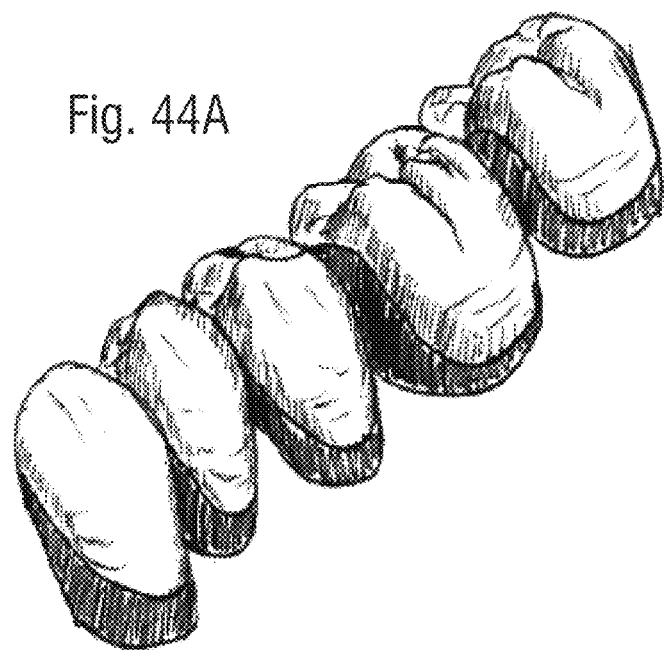
FIGS. 44a to 45b show schematic views of teeth produced from inventive partial dental arches, by showing the boundary area between the dentin and the cutting material.
Figure 44B:
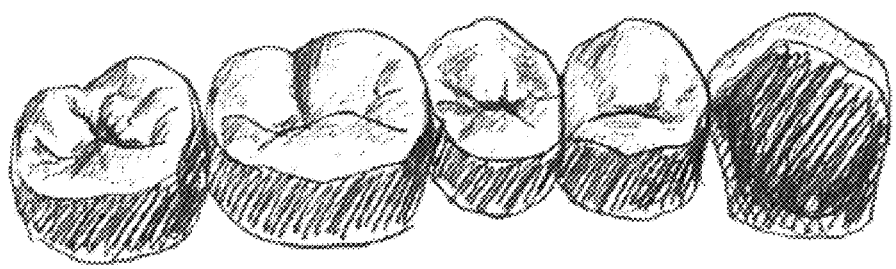
Figure 45A:
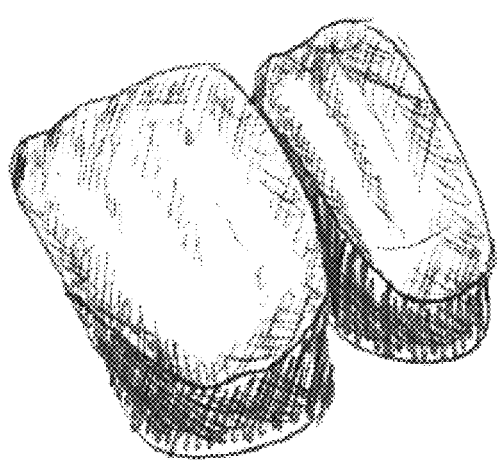
Figure 45B:
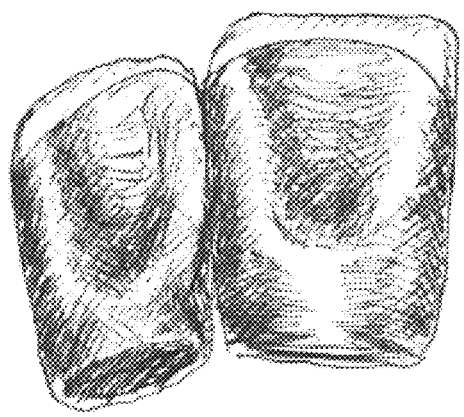

When setting-up the teeth the "best fit" is also taken into consideration with respect to occlusion. This is done virtually, that is to say before the actual milling process. This is to be indicated by the FIGS. 42 and 43. In this respect, occlusion corresponds to that illustrated in FIG. 4.

The inventive teeth comprise a comparatively high share of cutting material of 15 to 35 percent such that 75 percent of dentin material remain, provided that the structure is made of two layers. The share of dentin material is correspondingly lower when the structure comprises three or more layers. This is apparent schematically from the FIGS. 44a to 45b.

The mathematical design of partial dental arches is described as follows on the basis of FIGS. 46a to 61.

Figure 46A:
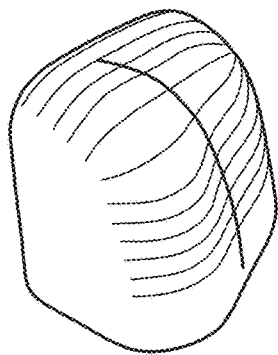
FIG. 46A shows a schematic view of a partial dental arch 1-2 illustrating 12 layers whose profile is apparent from FIG. 47.

FIG. 46a shows a partial dental arch for the teeth 1 and 2. The layer orientation, as is described in FIG. 47, is apparent from FIG. 46b. For anterior teeth, the layer orientation is equal in the upper jaw and in the lower jaw.

The section 01 from FIG. 47 is described exemplarily thereof: The section line may be defined as a succession of circular arches which altogether produce the inventive wavy structure—when viewed substantially in a plane parallel to occlusion as far as the section lines 01 to 06 are concerned:

The center of the circle of a circular arch which is referred to as the fourth circular arch herein with the radius R8.27— expressed in mm—represents the primal source. It is positioned above the section line which is referred to as curve herein. In the drawing, the values Delta X=7.35 and Delta Y=23.47 are assigned to this point. The next center of the circular arch which is that of the third circular arch is shifted to the left by 7.35 mm and to the bottom by 23.47 mm compared to the primal source. The point of inflection of the curve is the intersection of the curve with the straight line connecting these two centers of the circular arch.

This third circular arch comprises a radius of 16.33 mm as is indicated in FIG. 47 as R16.33. It is evidently below the curve.

With the Delta X and the Delta Y values of −11.95 and −21.46 the second center of the circular arch is shifted by corresponding mm values to the top and to the right with regard to the third center of the circular arch.

The second circular arch comprises a radius of R8.24, that is to say 8.24 mm, and is positioned above the curve.

The center of the first circular arch is shifted to the left by 0.72 mm in the X-direction and to the bottom by 3.02 mm in the Y-direction compared to the second center of the circular arch, corresponding to the Delta values X=+0.72 and Y=+3.02. It is also positioned above the curve.

As is apparent, the first circular arch has a radius of 5.13 mm, corresponding to R5.13.

In this respect, the first circular arch starts on the right-hand side in FIG. 47 (radius 5.13 and x=y=z=0). The second circular arch has a radius of 8.24 and is shifted by x=0.72 and y=3.02 compared thereto. The third circular arch with a radius of 16.33 is shifted with respect to the second radius center by −11.94 or −21.46, respectively. The first circular arch of the second section positioned above is shifted by x, y, z with respect to it (in this case by −0.24 or 0.26 (and z=1.50)). The following circular arches of the section again relate to the last center in every case and do not have any shifting out of the drawing plane and thus a z of 0.

At the same time, the first and second circular arches form the primary-position tooth region, while the fourth circular arch surrounds the secondary-position tooth region, and the third circular arch corresponds to the necking positioned therebetween—in this respect to the later interdental space.

The following eleven section lines, and also those of the further embodiments, are dimensioned in accordance with this method, and the dimensions are always entered into the drawings.

Figure 46B:
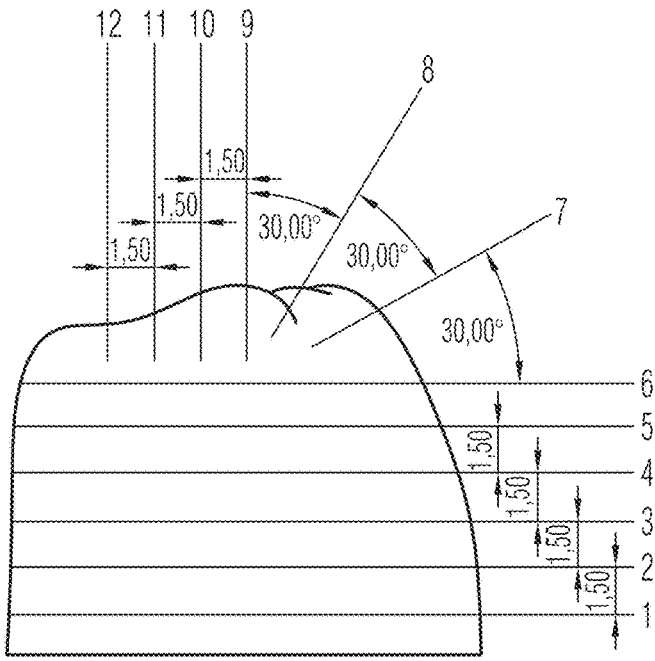
FIG. 46B shows the partial dental arch according to FIG. 46a in the mesial view, also illustrating the sections 1 to 12.
Figure 47:
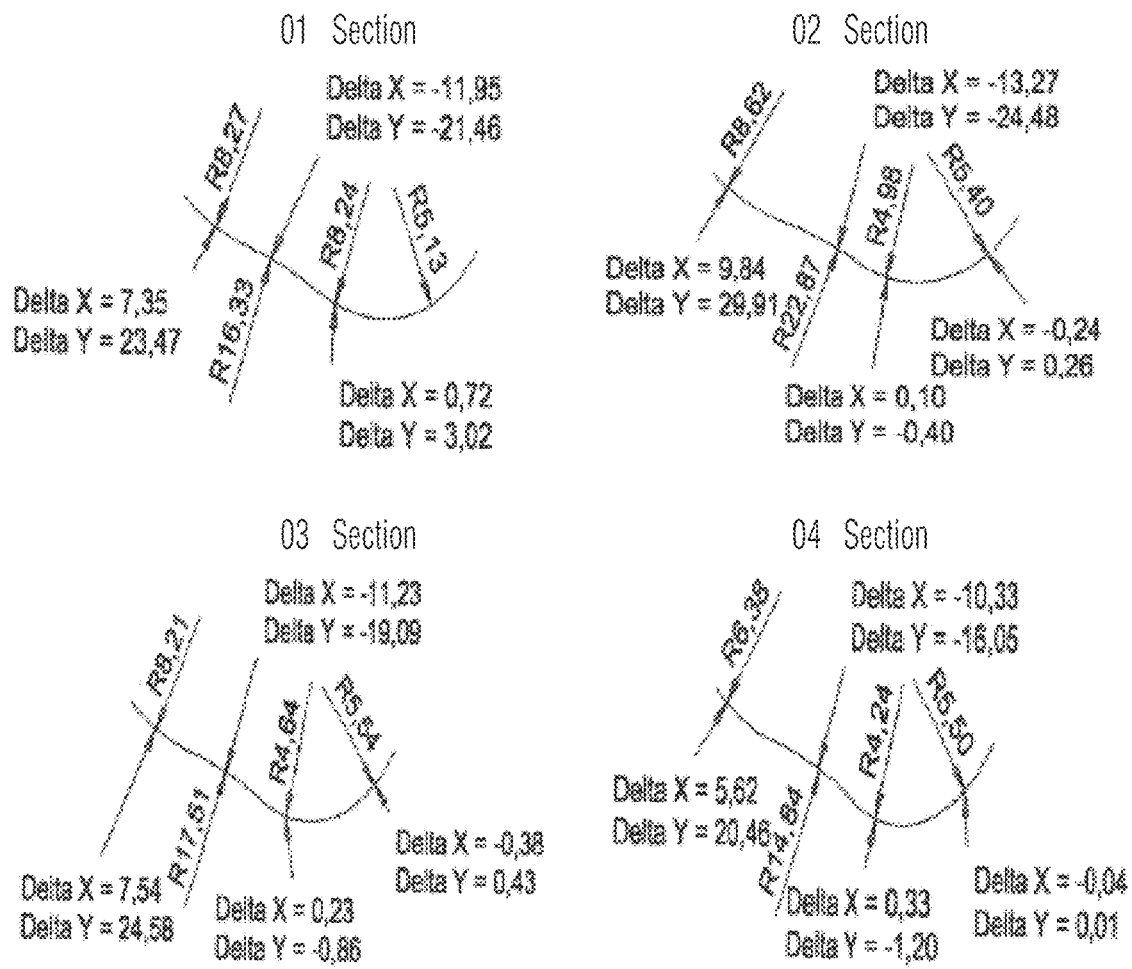
FIGS. 47 and 47A show curves of the sections 1 to 12 from FIG. 46B in a preferred embodiment of the invention.

The section lines 07 and 08 each show the curve courses of the dentin material milling blank, when viewed transversely across the vestibular dentin material ridge, in different angles as is apparent from FIG. 46b, and the section lines 09 to 12 each show curve courses in a plane parallel to the mesial-distal orientation of the incisors.

Figure 47A:
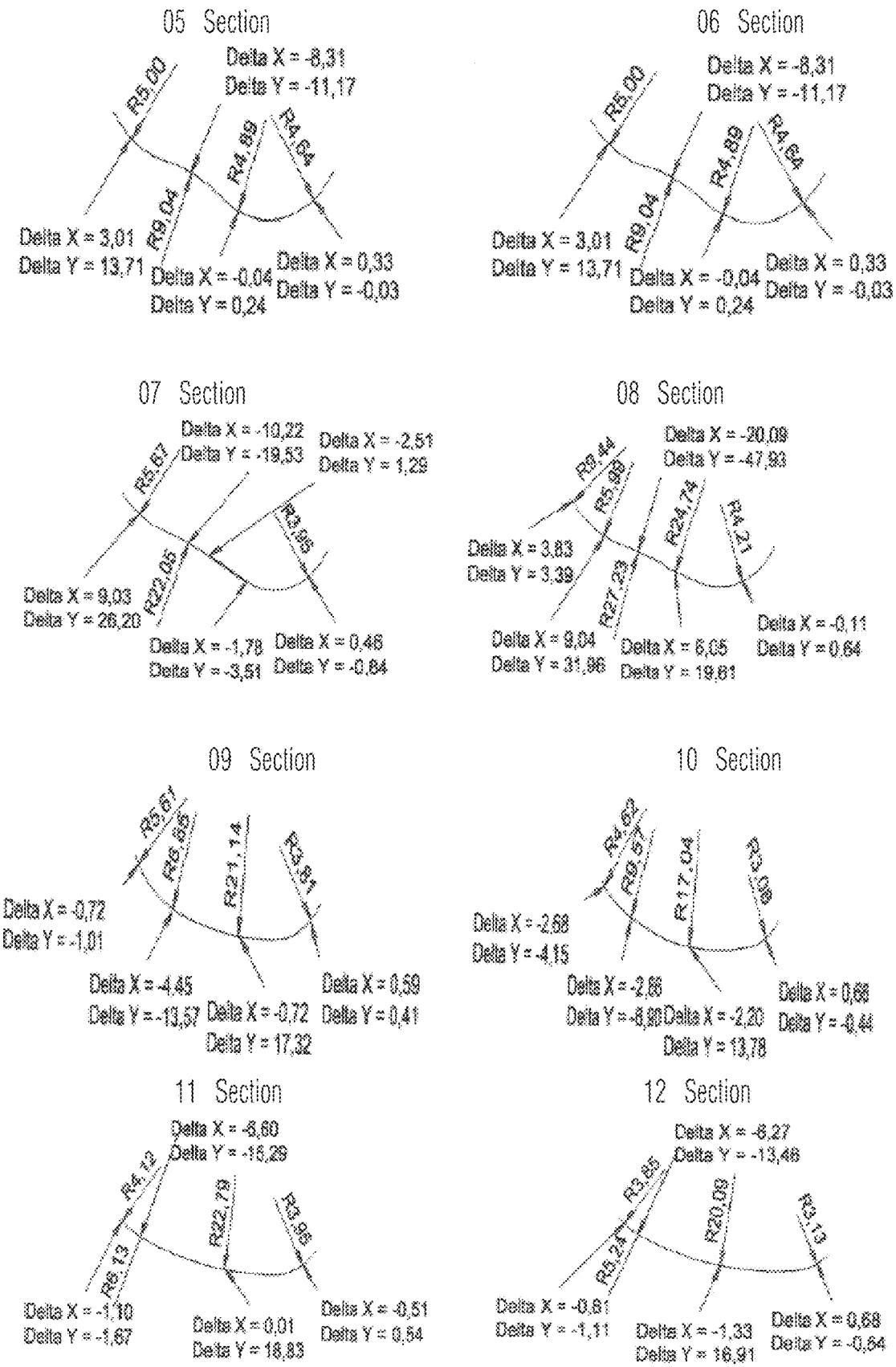

The sections 1 to 12 apparent from FIGS. 47 and 47a show a comparatively intensely structured partial dental arch having a correspondingly more distinct wavy structure which may be considered as optimum wavy structure.

Figure 48:
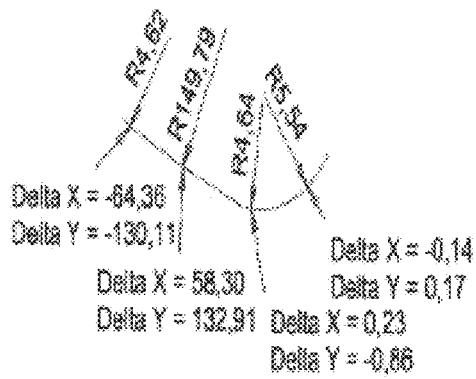
FIGS. 48 and 48A show a further embodiment of an inventive partial dental arch illustrating 12 sections, corresponding to the position according to FIG. 46B.
Figure 48:
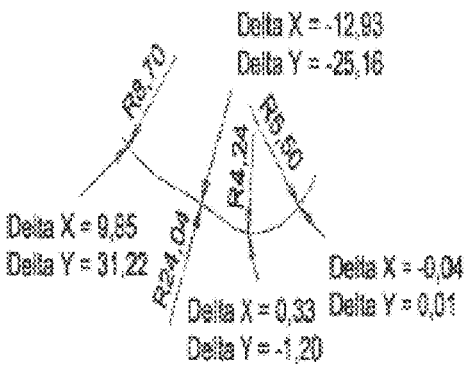
Figure 48:
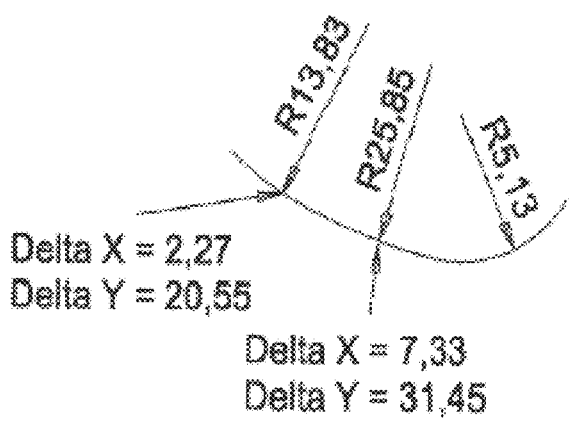
Figure 48:
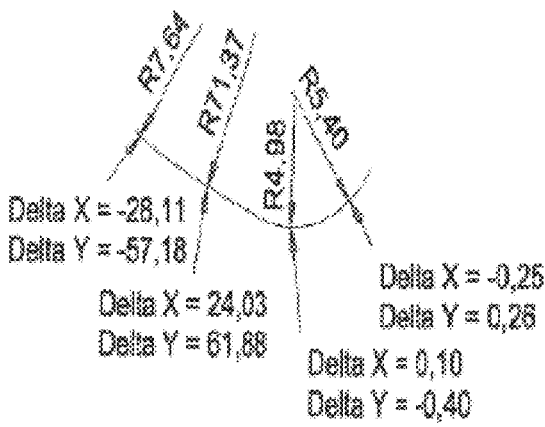
Figure 48:
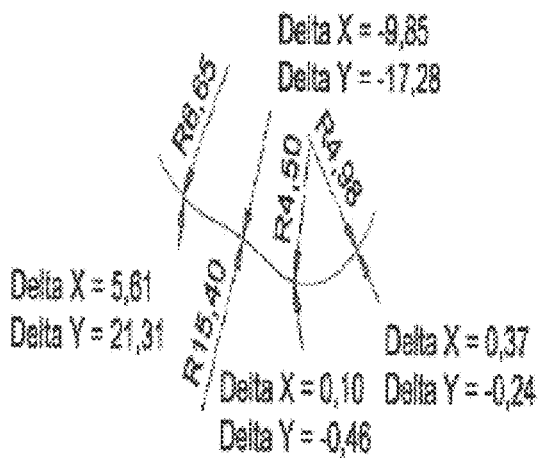
Figure 48:
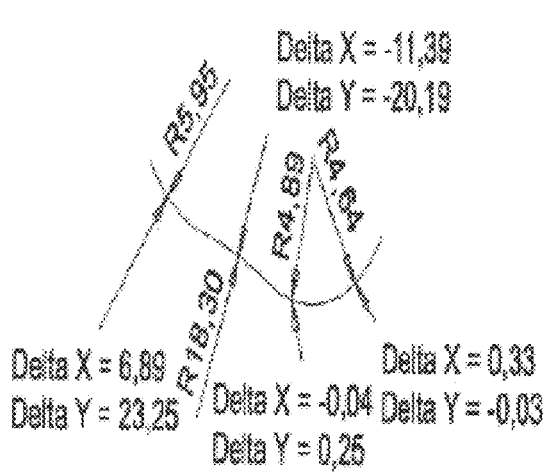
Figure 48A:
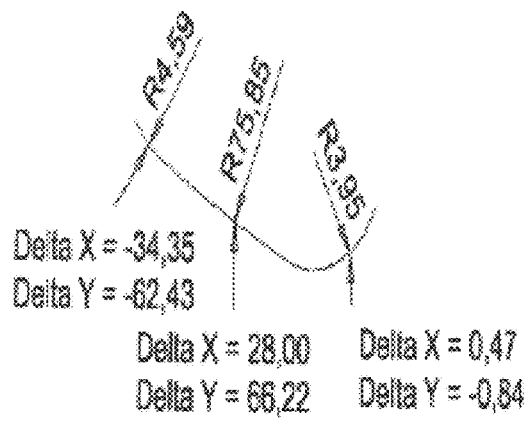
Figure 48A:
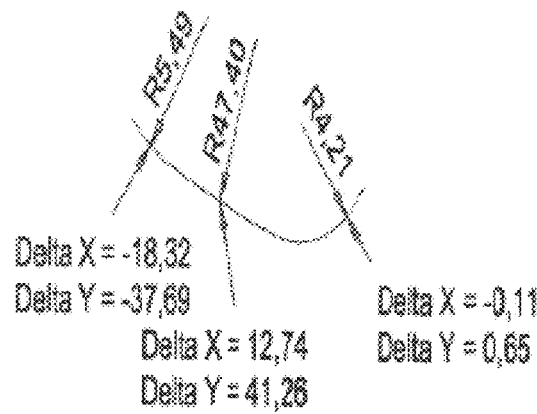
Figure 48A:
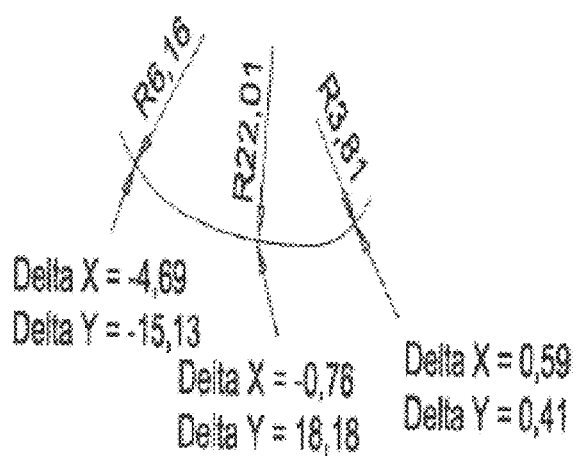
Figure 48A:
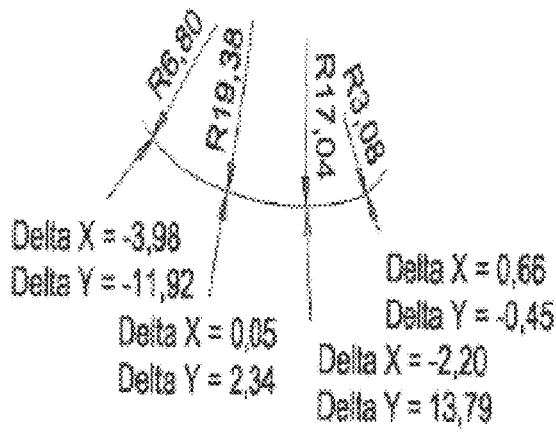
Figure 48A:
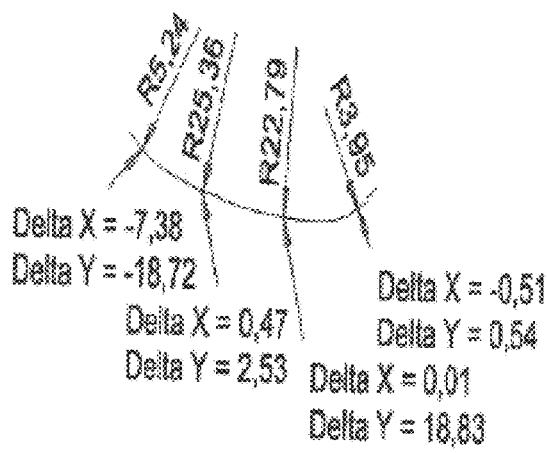
Figure 48A:
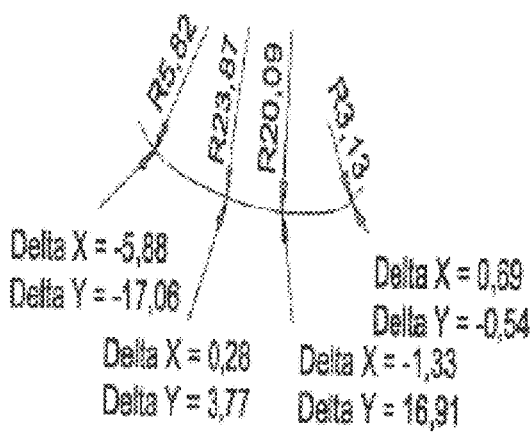

The sections 1 to 12 apparent from FIGS. 48 and 48*a* show a comparatively less intensely structured partial dental arch having a correspondingly less distinct wavy structure which may be used as a milling blank in this respect. This solution may be produced more easily and offers a result which is—almost—as good for the primary-position tooth region but an aesthetically slightly less appealing result for the next tooth.

Figure 49:
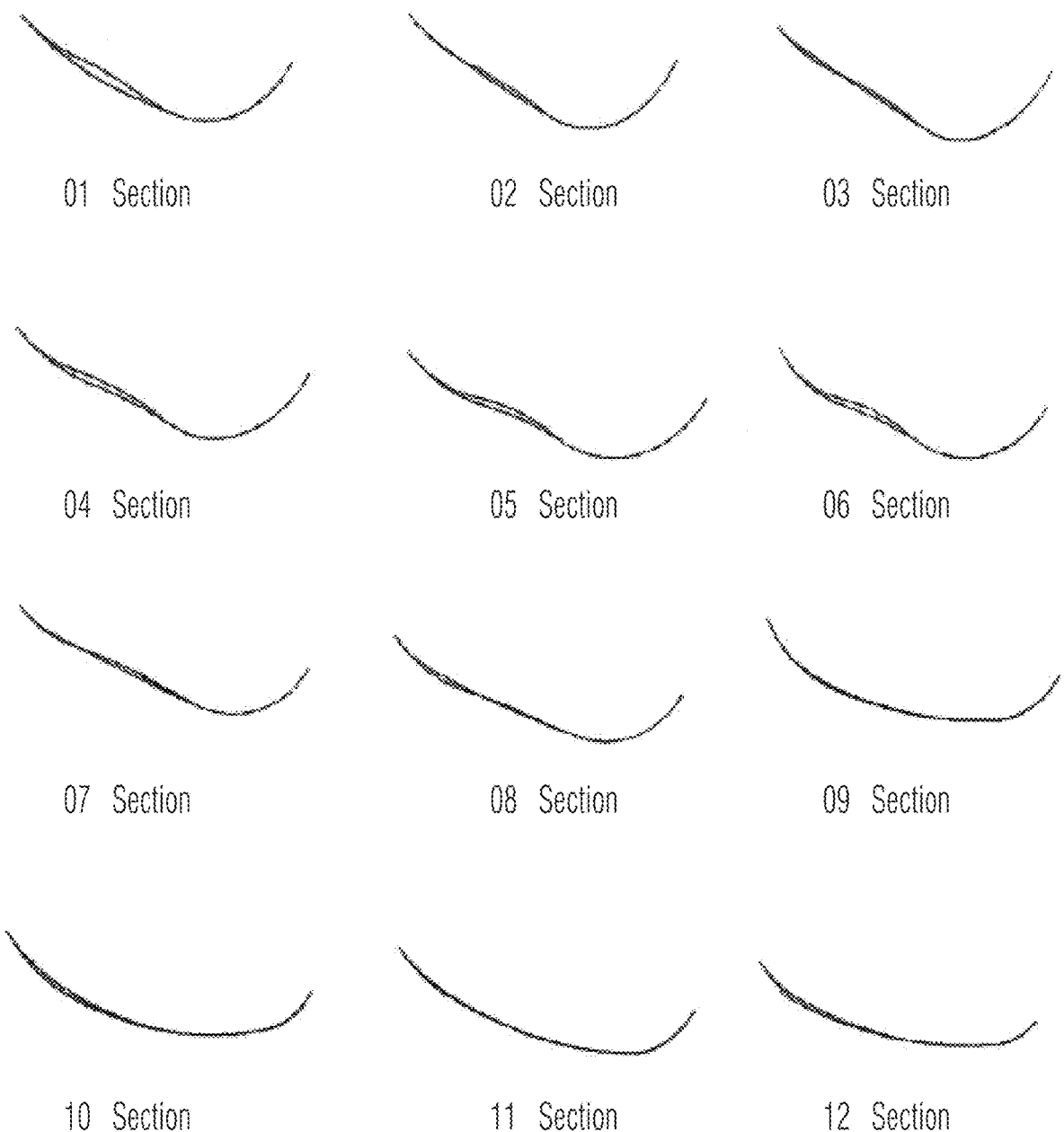
FIG. 49 shows a schematic illustration of the difference of the sections 1 to 12 from the FIGS. 47 and 48.

For clarification, the curves of the sections from the FIGS. 47 and 48 are entered one above the other in FIG. 49.

Figure 50A:
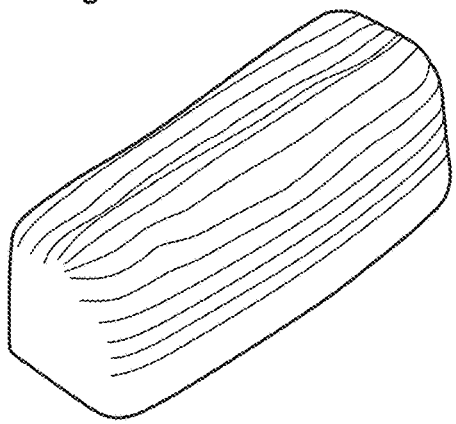
FIG. 50A shows a partial dental arch for molar teeth in the upper jaw in a perspective illustration, illustrating 12 sections and their position.
Figure 50B:
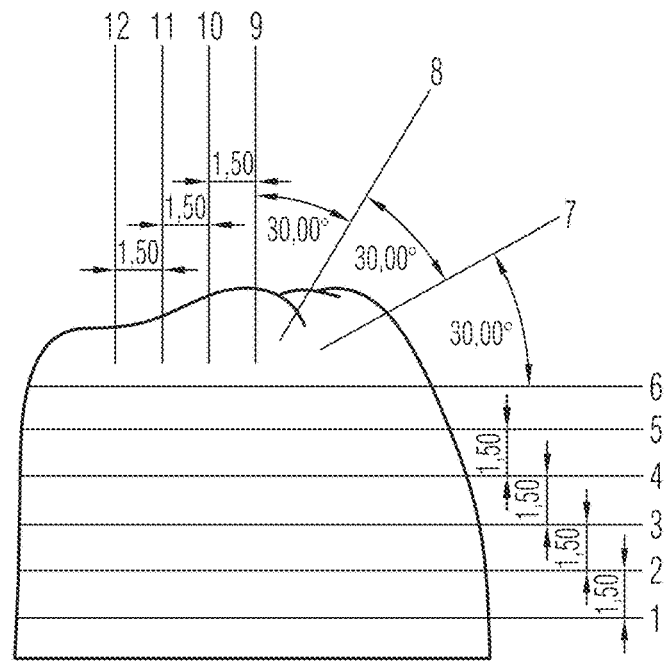
FIG. 50B shows the partial dental arch according to FIG. 50A in the mesial view.

The same holds true for FIG. 50*a* et seq. for a molar partial dental arch with the teeth 4-5-6-7.

FIG. 50*a* shows a partial dental arch for the teeth 4 to 7 in the upper jaw. The layer orientation, as is described in FIG. 51, is apparent from FIG. 50*b*.

Figure 51:
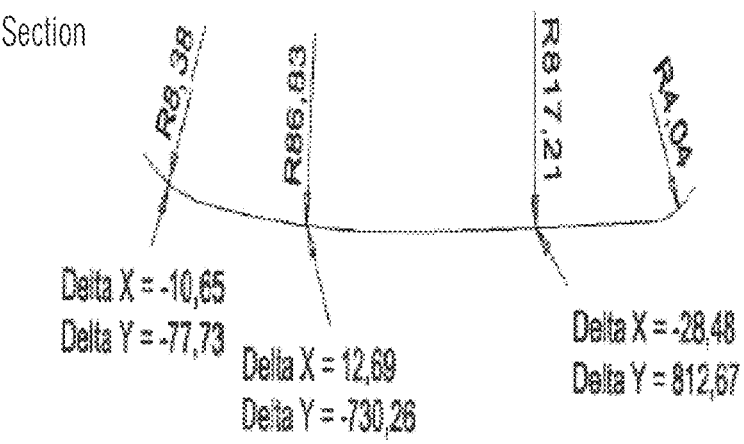
FIGS. 51, 51A, 51B, 51C and 51D show curves of the sections 1 to 12 from FIG. 50B corresponding to the position according to FIG. 50B.
Figure 51:
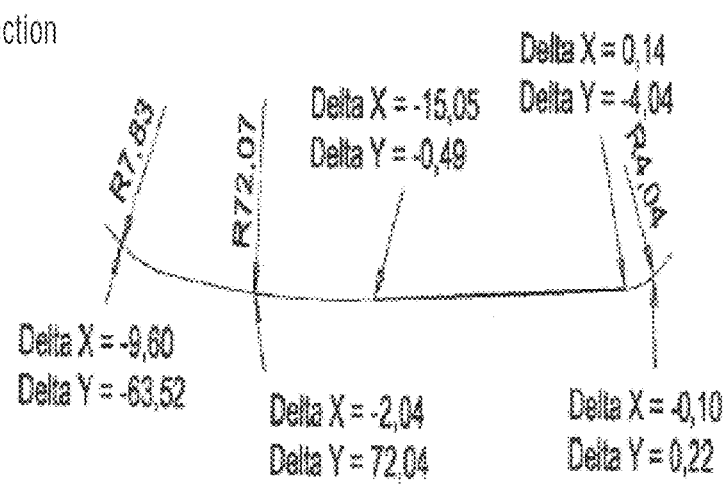
Figure 51A:
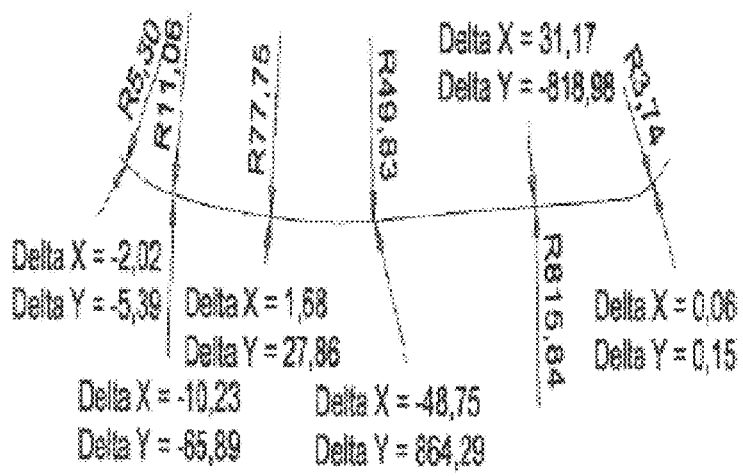
Figure 51A:
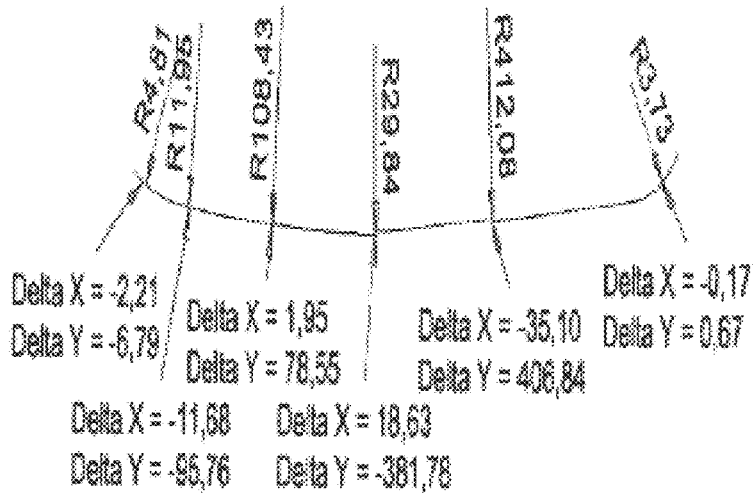
Figure 51A:
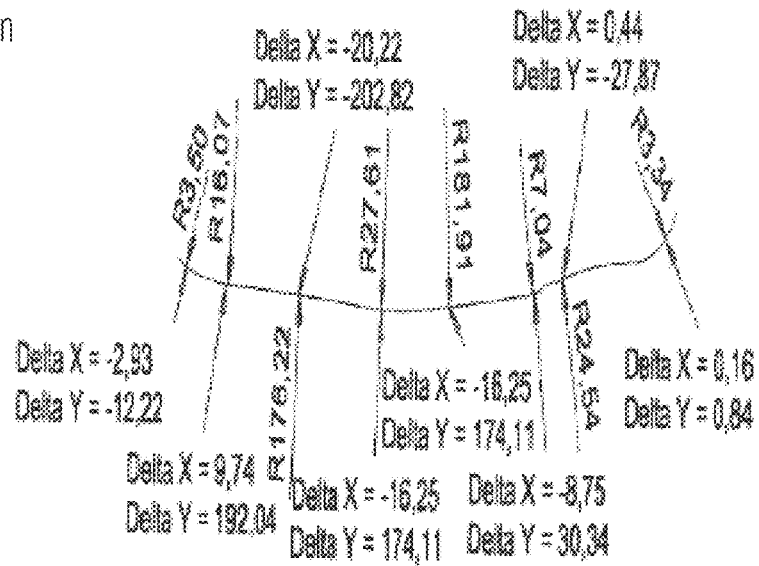
Figure 51B:
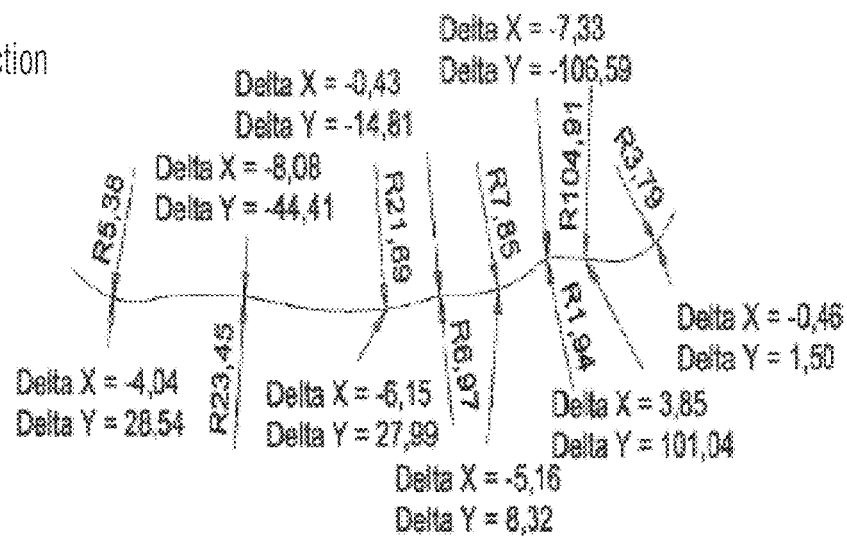
Figure 51B:
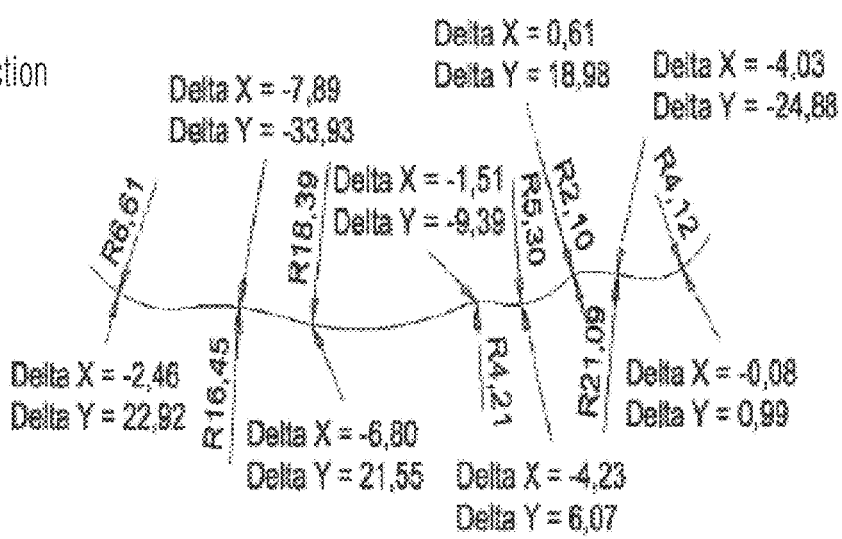
Figure 51B:
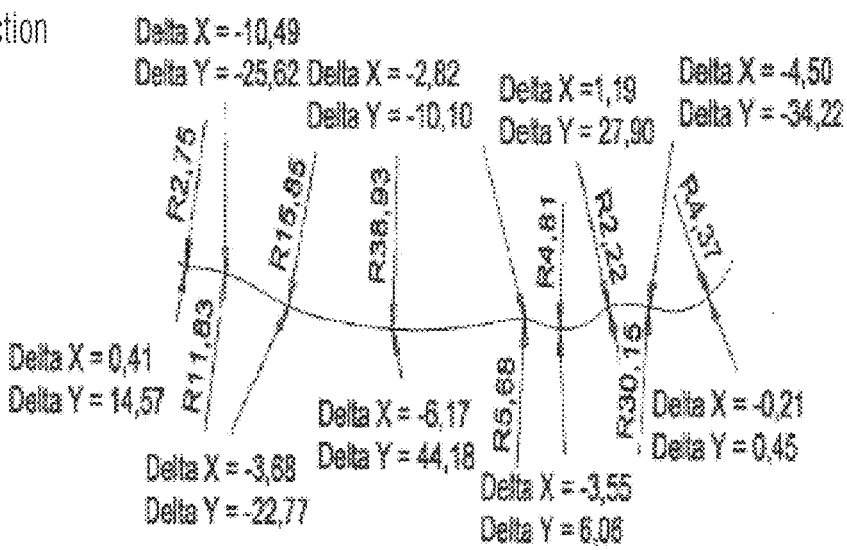
Figure 51C:
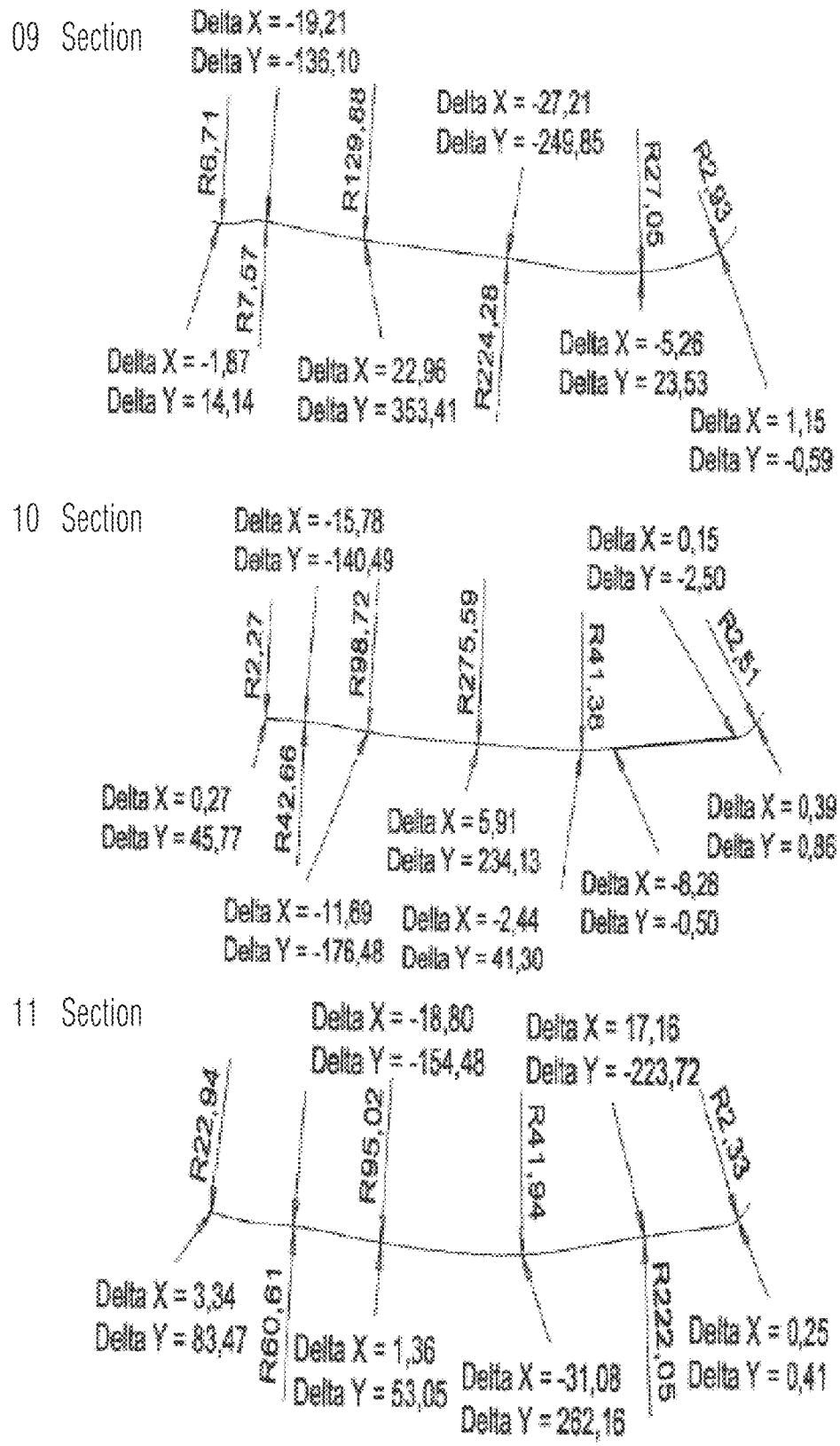
Figure 51D:
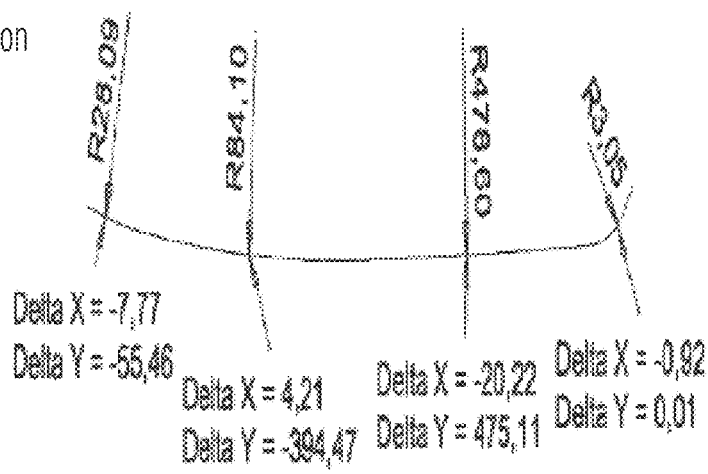

The sections 1 to 12 apparent from FIGS. 51 to 51*d* show a comparatively intensely structured partial dental arch having a correspondingly more distinct wavy structure.

Figure 52:
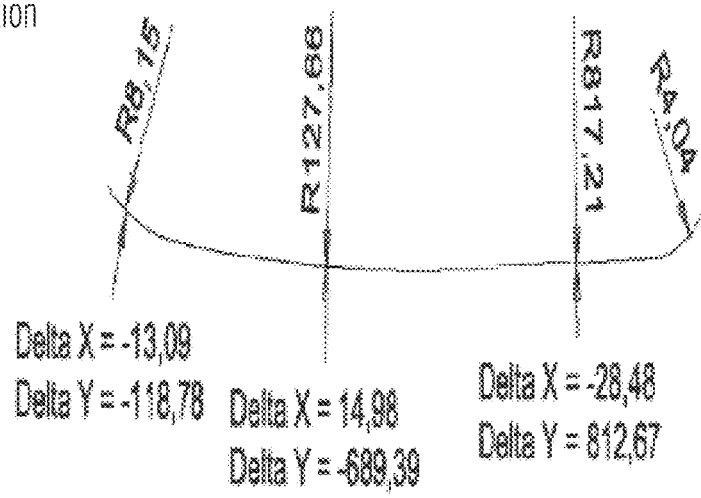
FIGS. 52, 52A, 52B, 52C and 52D show a further embodiment of an inventive partial dental arch illustrating 12 sections, corresponding to the position according to FIG. 50B.
Figure 52:
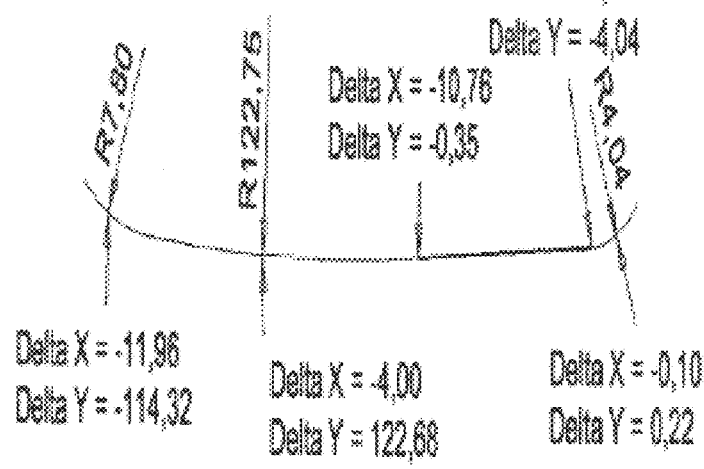
Figure 52A:
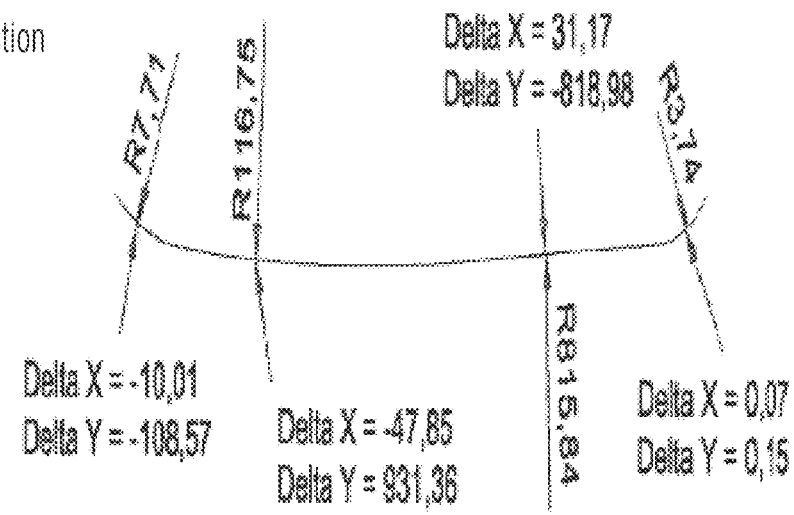
Figure 52A:
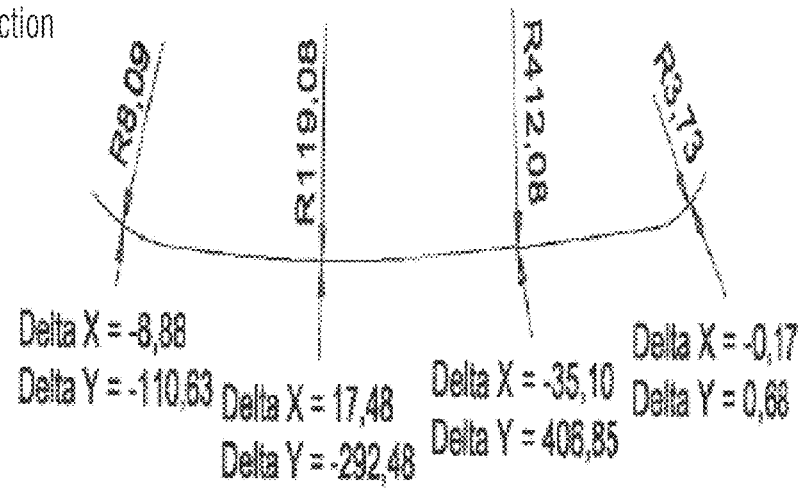
Figure 52A:
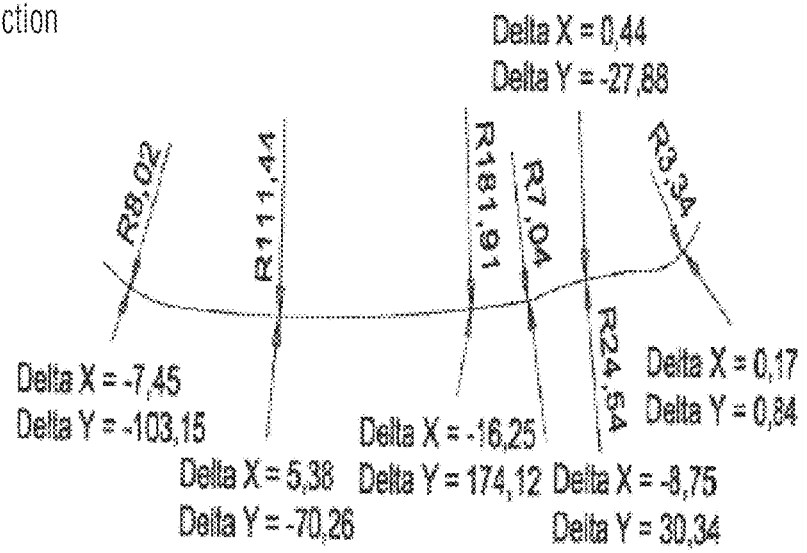
Figure 52B:
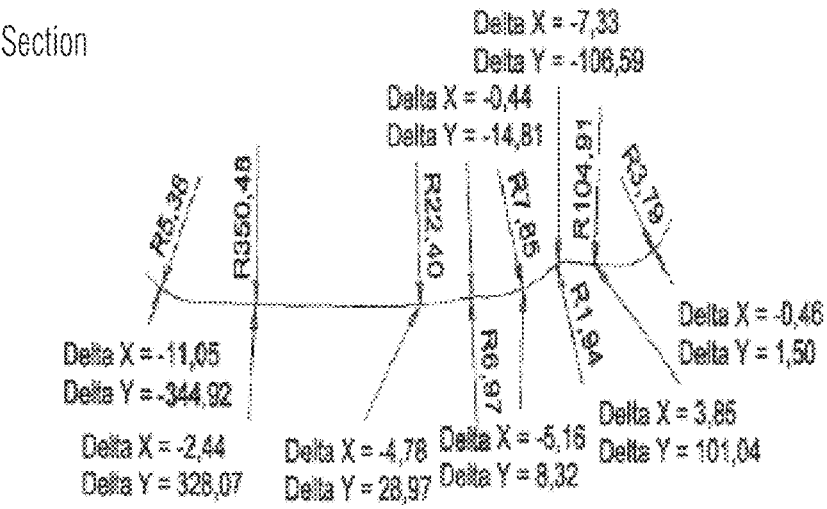
Figure 52B:
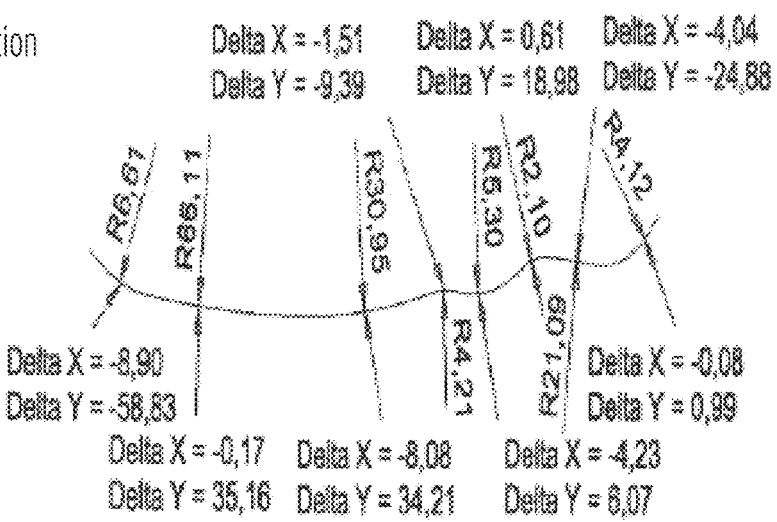
Figure 52B:
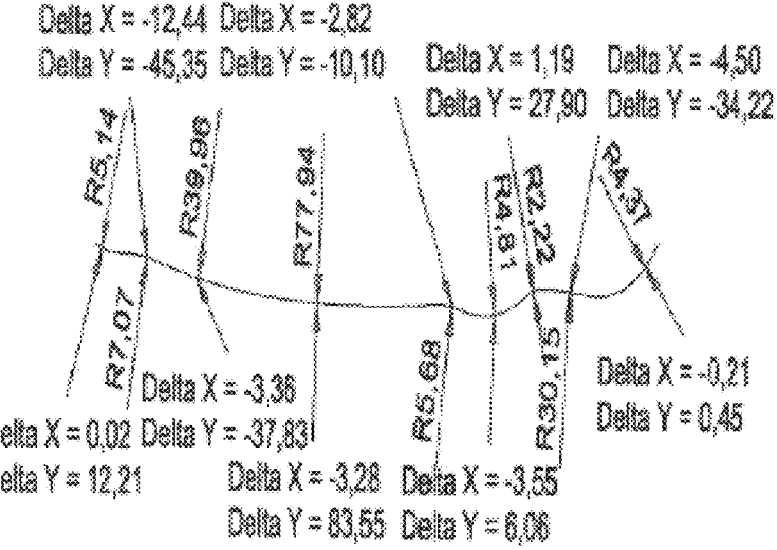
Figure 52C:
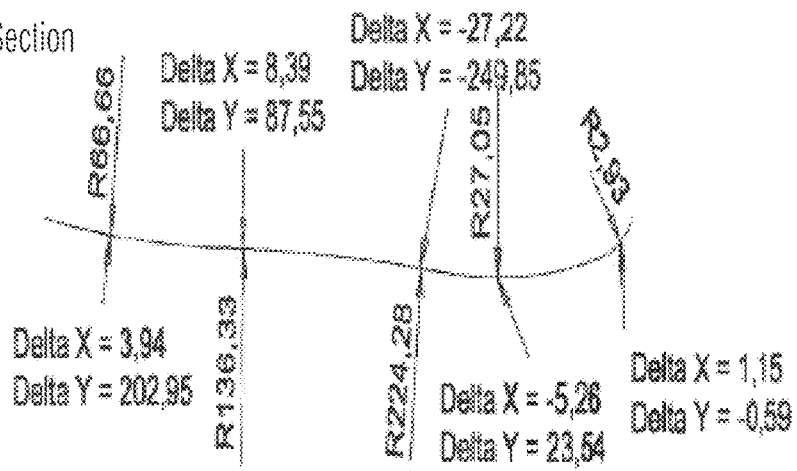
Figure 52C:
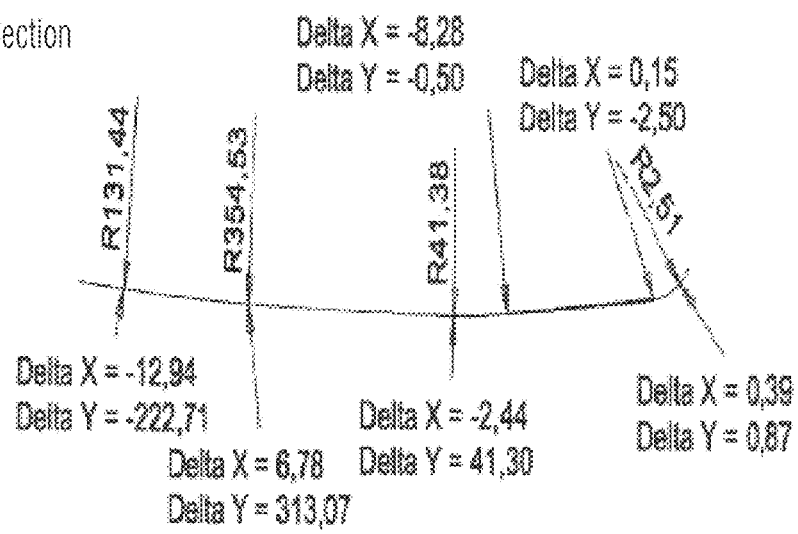
Figure 52C:
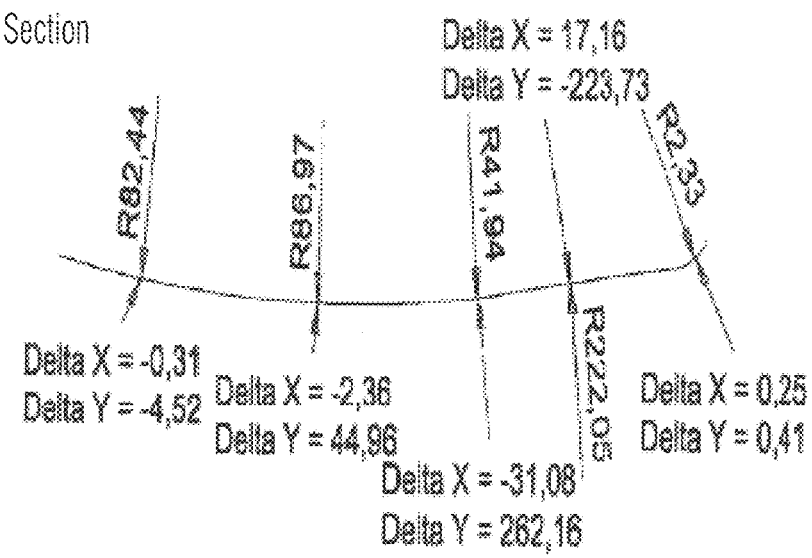
Figure 52D:
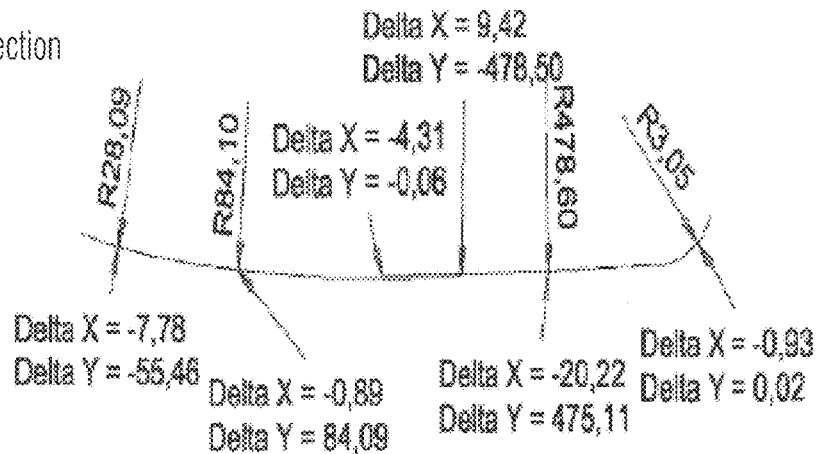

The sections 1 to 12 apparent from FIGS. 52 to 52*d* show a comparatively less intensely structured partial dental arch having a correspondingly less distinct wavy structure which may be used as a milling blank alternatively in this respect.

Figure 53:
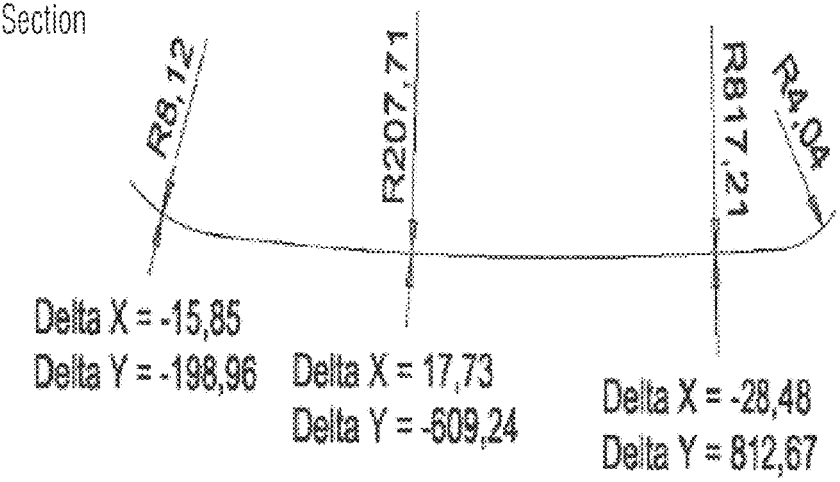
FIGS. 53, 53A, 53B, 53C and 53D show a further embodiment of an inventive partial dental arch illustrating 12 sections, corresponding to the position according to FIG. 50B.
Figure 53:
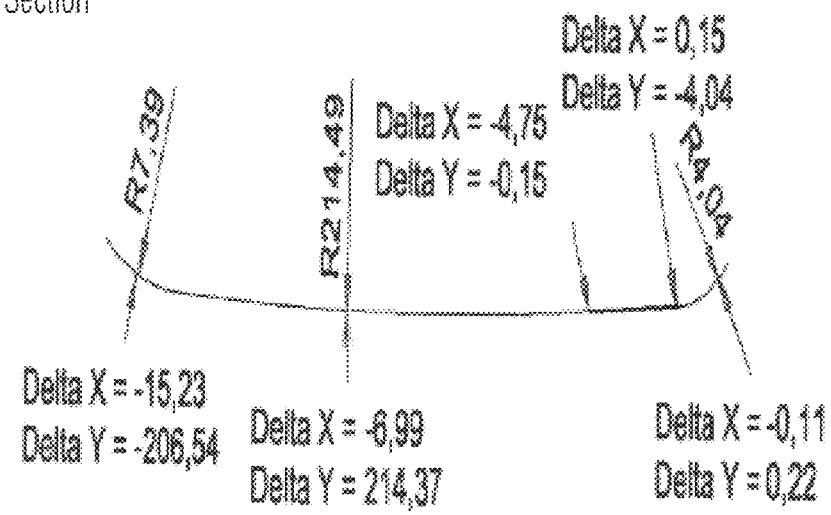
Figure 53A:
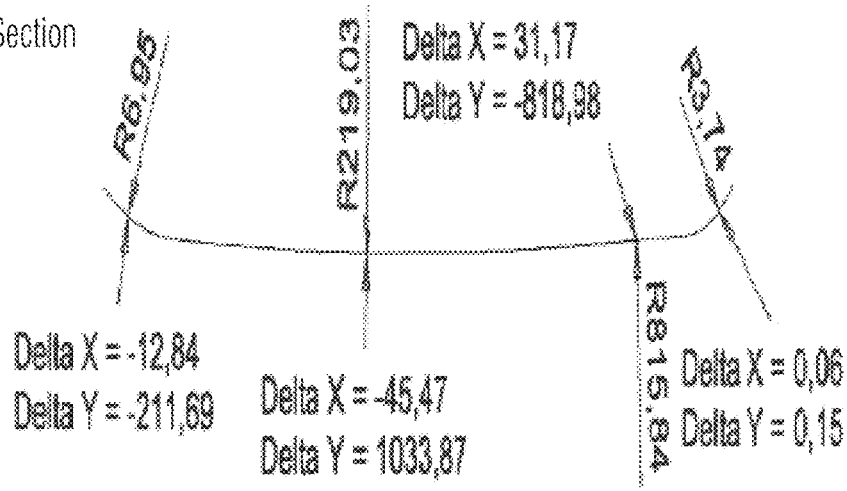
Figure 53A:
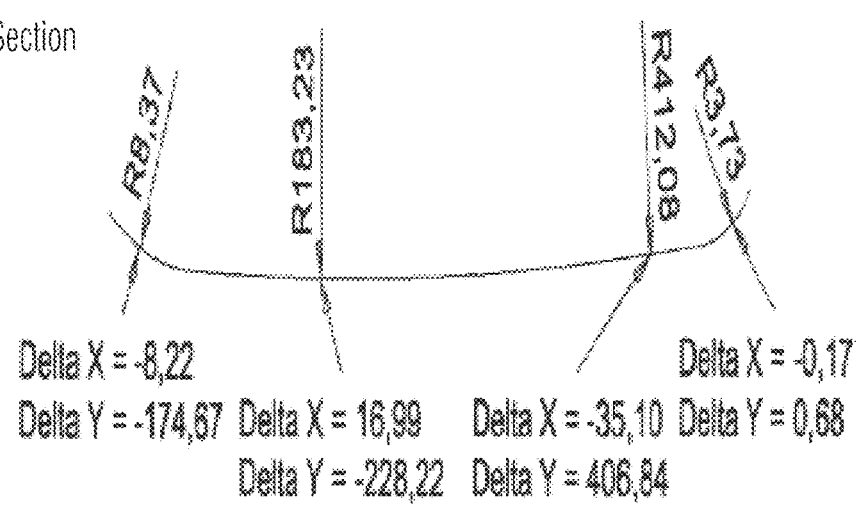
Figure 53A:
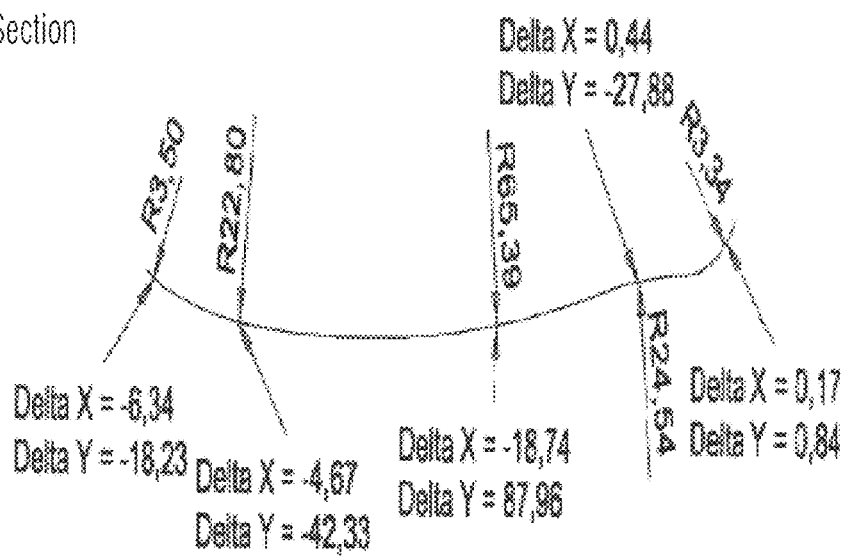
Figure 53B:
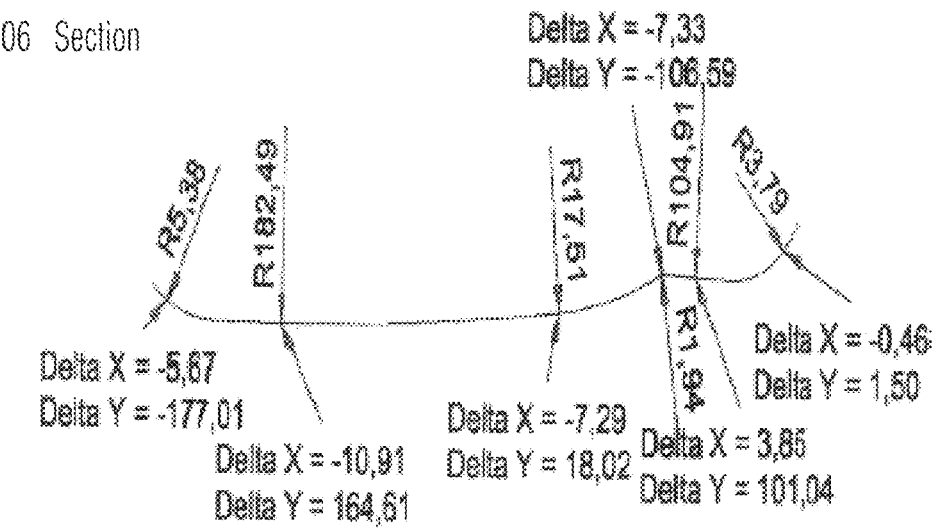
Figure 53B:
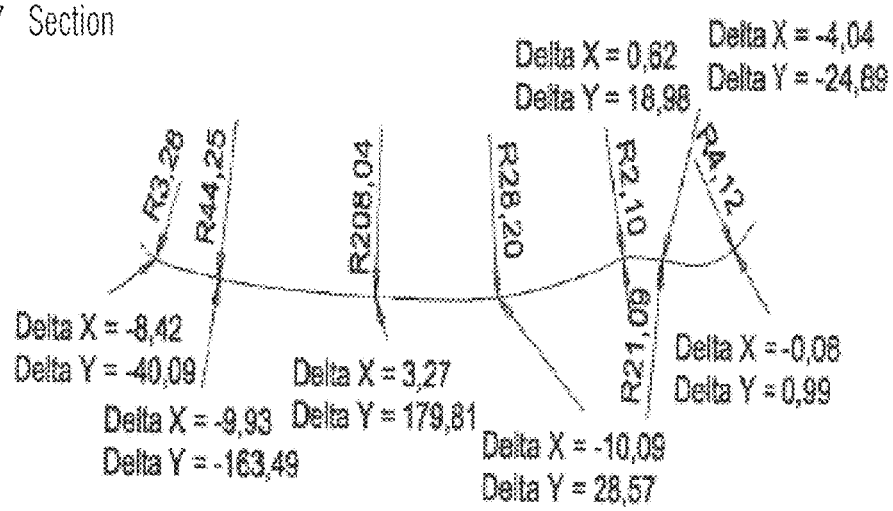
Figure 53B:
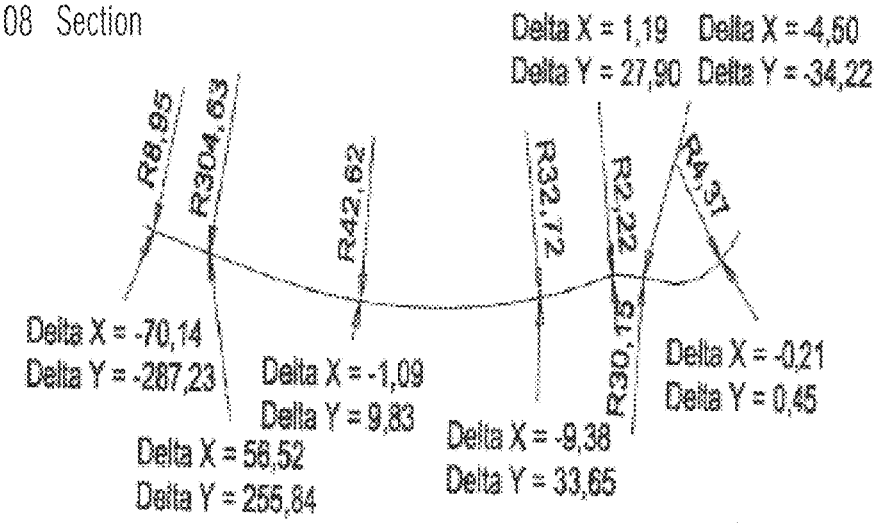
Figure 53C:
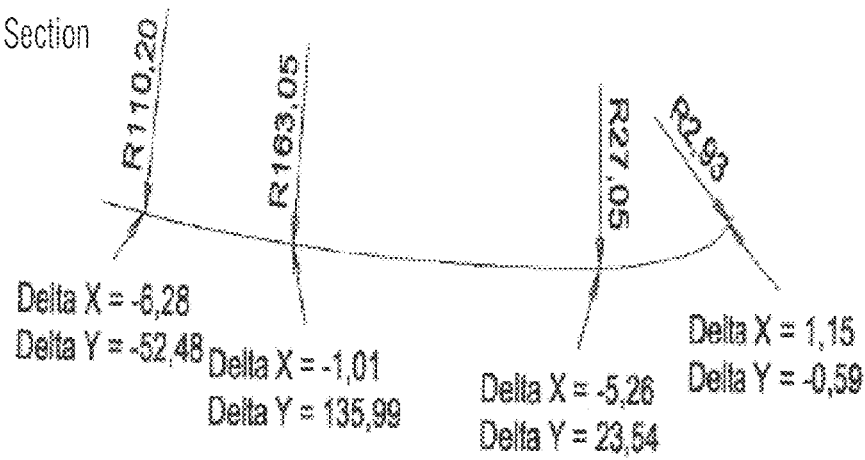
Figure 53C:
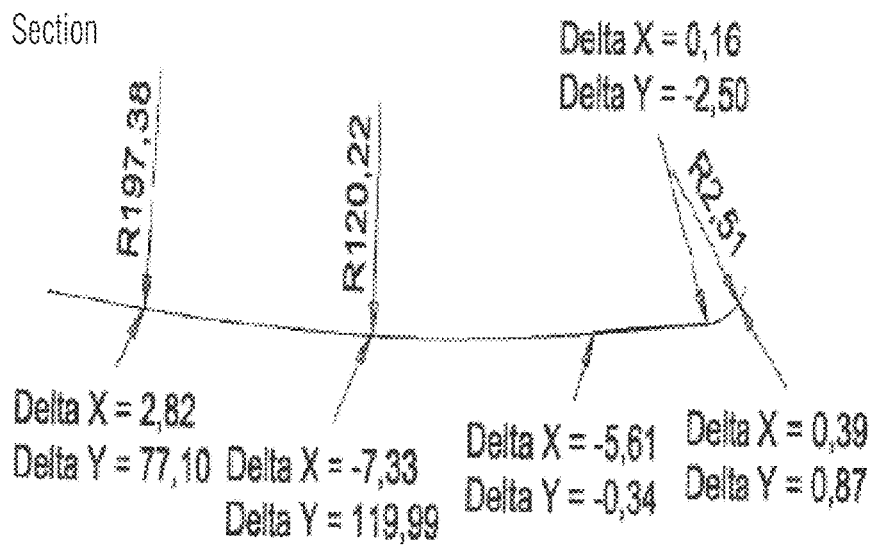
Figure 53C:
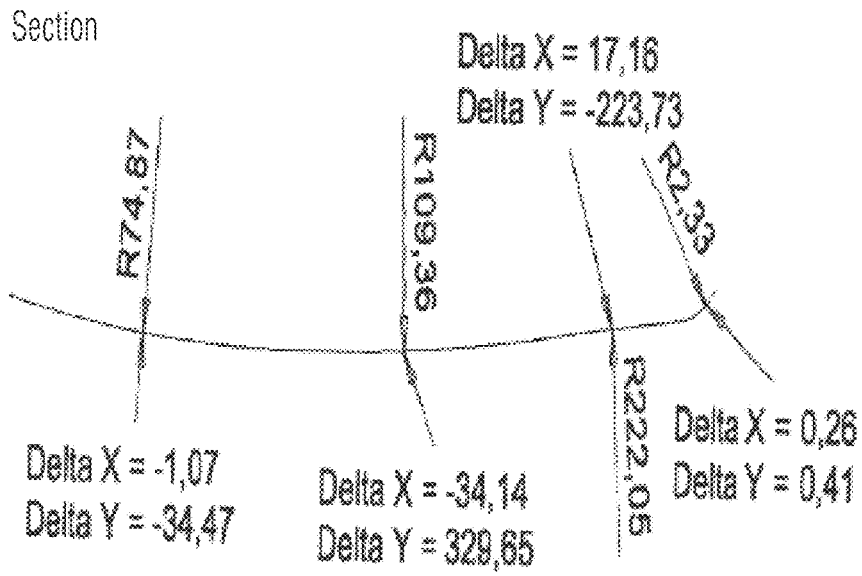
Figure 53D:
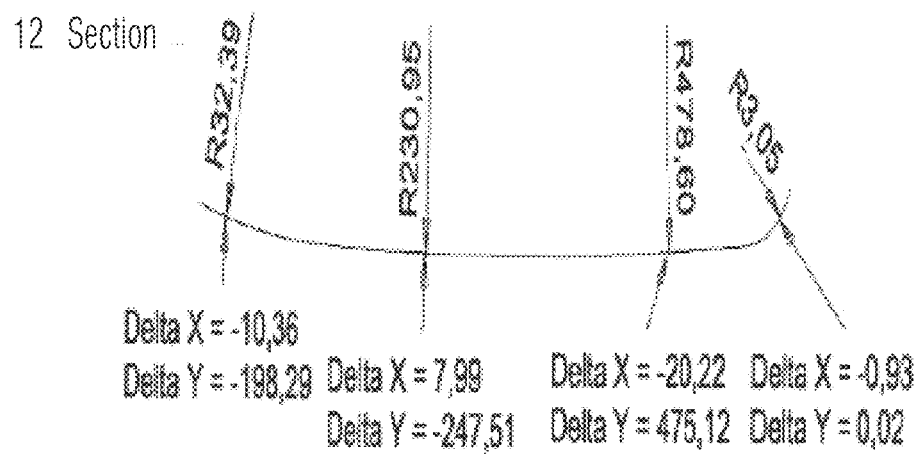

A partial dental arch modified compared thereto is apparent from FIGS. 53 to 53*d*. This is an even more simplified option with an aesthetical result which is even worse distally as the wavy structure is reduced in the distal region.

Figure 54:
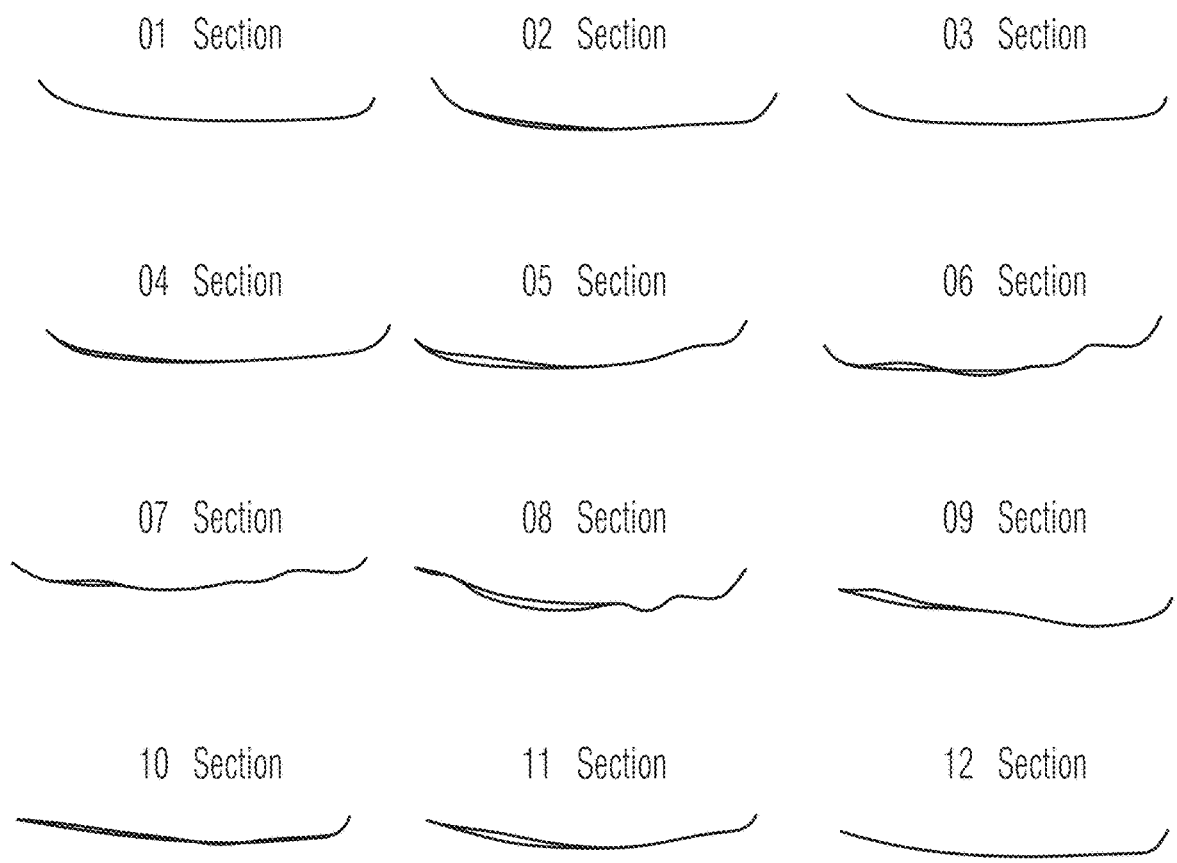
FIG. 54 shows a comparison of the sections from FIG. 51 and FIG. 52.
Figure 55:
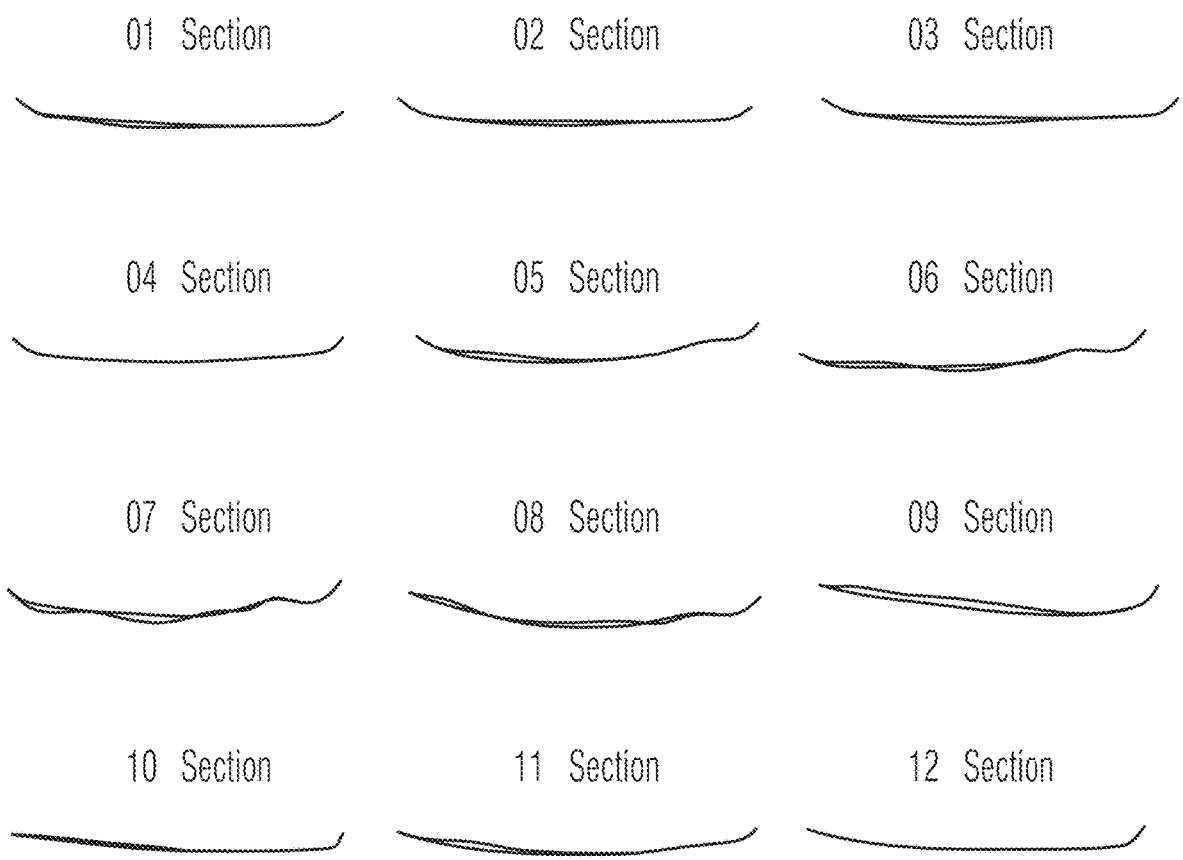
FIG. 55 shows a comparison of the sections from FIG. 51 and FIG. 53.

For clarification, the curves of the sections from the FIGS. 51 and 52 are entered one above the other in FIG. 54, and that from the FIGS. 51 and 53 in FIG. 55.

Figure 56A:
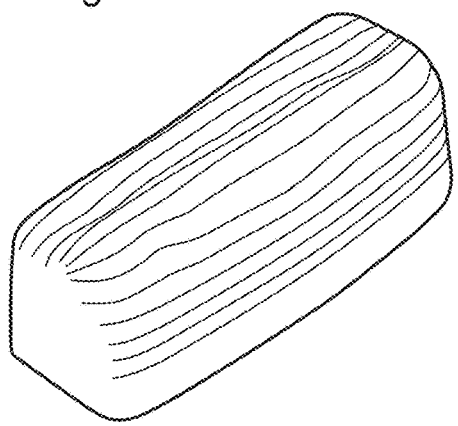
FIG. 56A shows an embodiment of the invention in an illustration according to FIG. 50A illustrating a partial dental arch for the teeth 3, 4, 5, 6 and 7 in the upper jaw.

FIG. 56*a* shows a partial dental arch for the teeth 3 to 7 in the upper jaw. The layer orientation, as is described in FIGS. 57 to 57*d*, is apparent from FIG. 56*b*.

Figure 57:
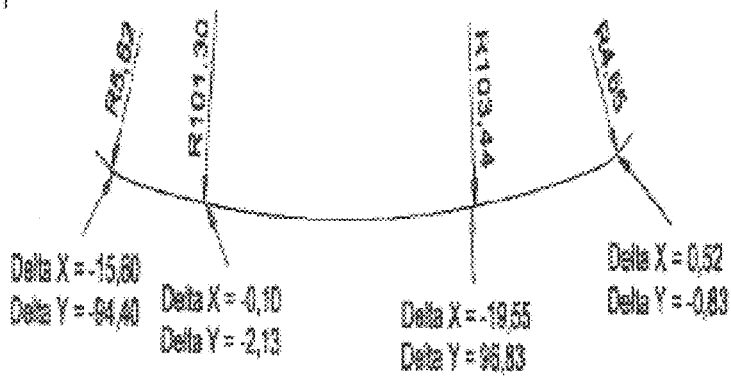
FIGS. 57, 57A, 57B, 57C and 57D show a further embodiment of an inventive partial dental arch illustrating 12 sections, corresponding to the position according to FIG. 56B.
Figure 57:
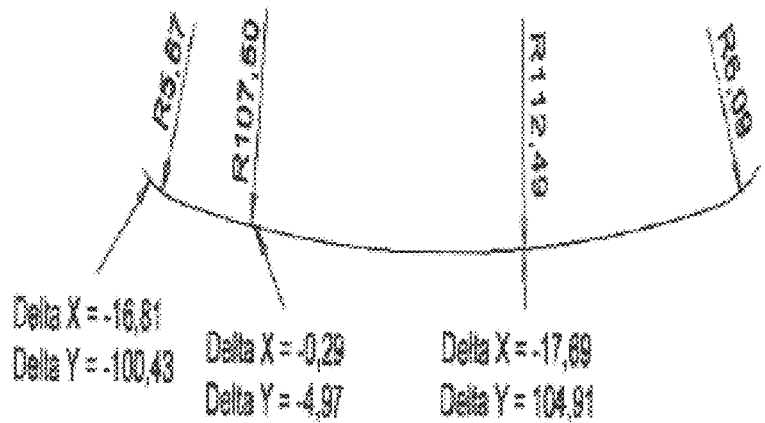
Figure 57A:
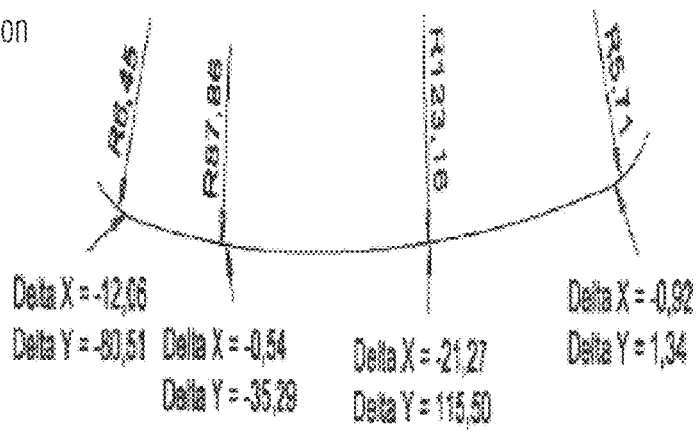
Figure 57A:
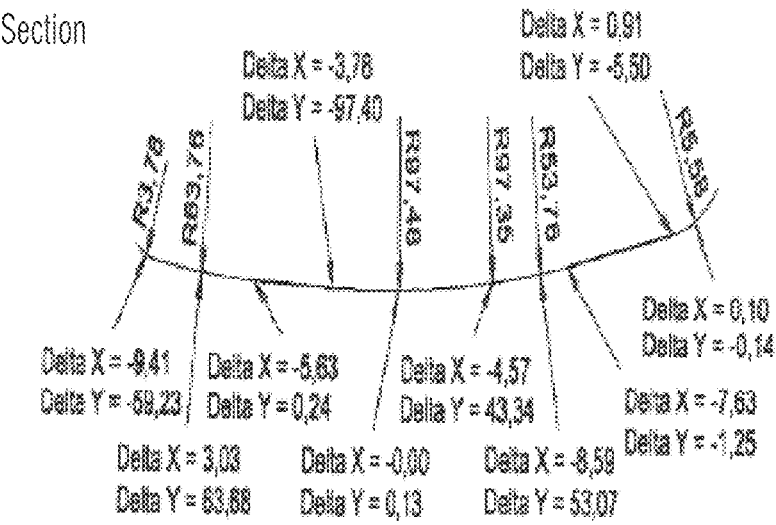
Figure 57A:
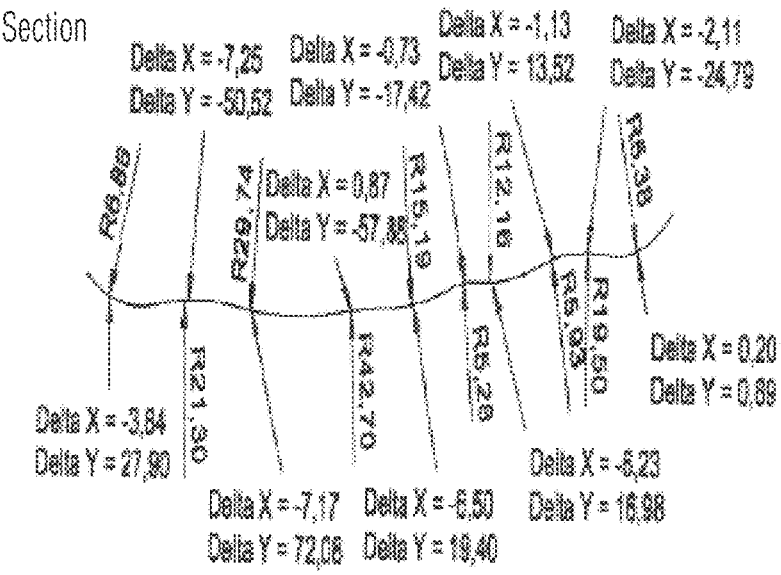
Figure 57B:
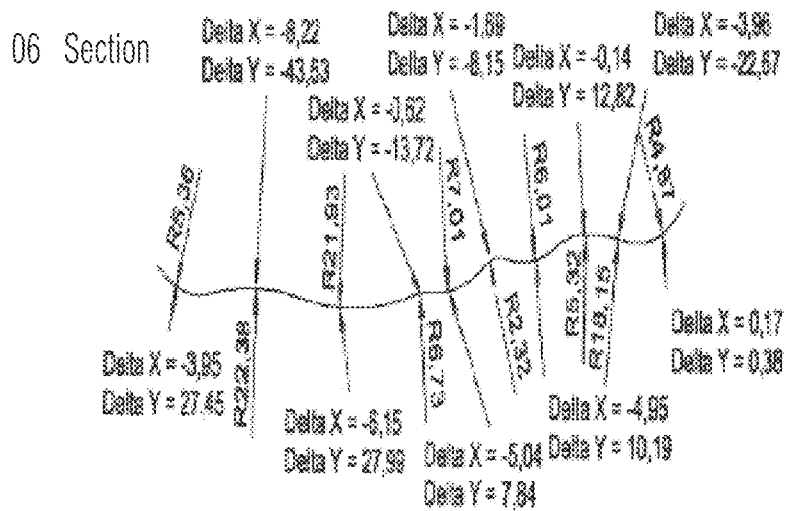
Figure 57B:
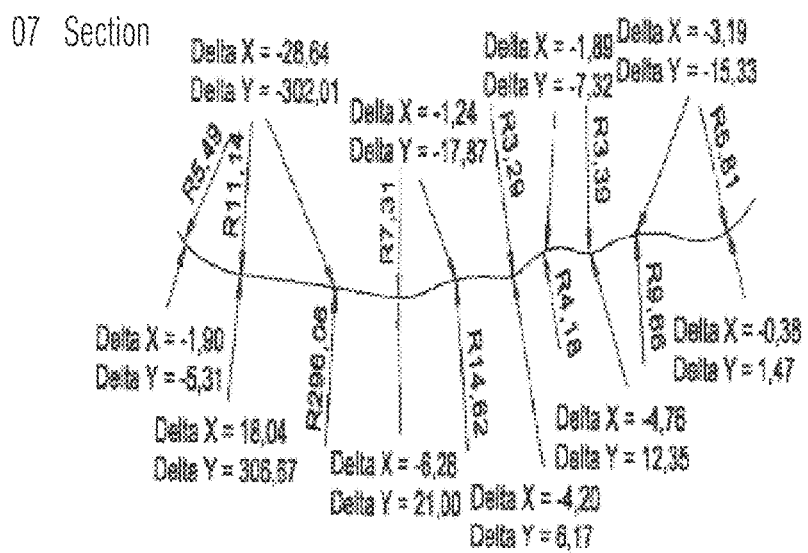
Figure 57B:
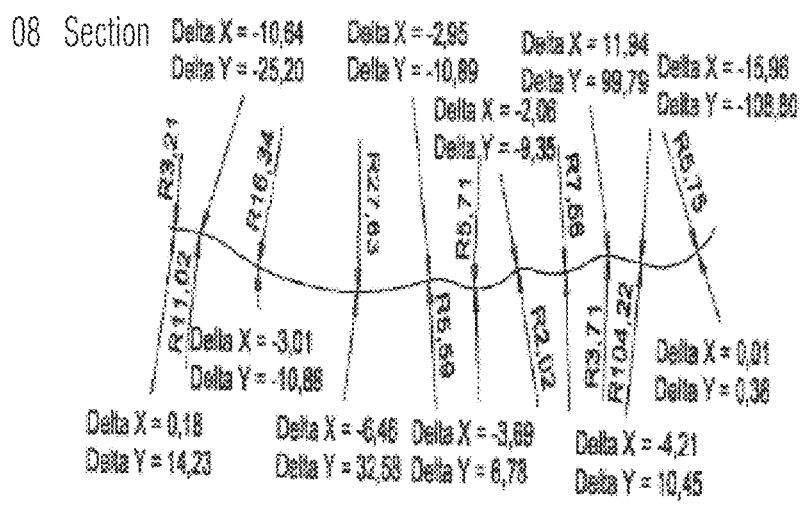
Figure 57C:
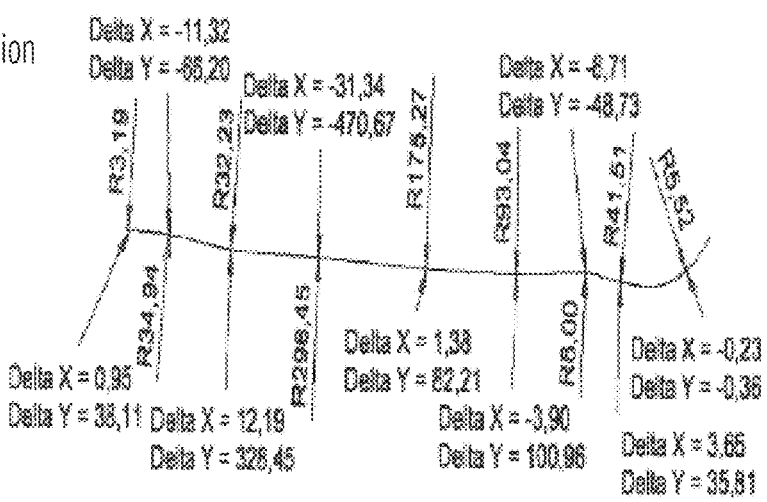
Figure 57C:
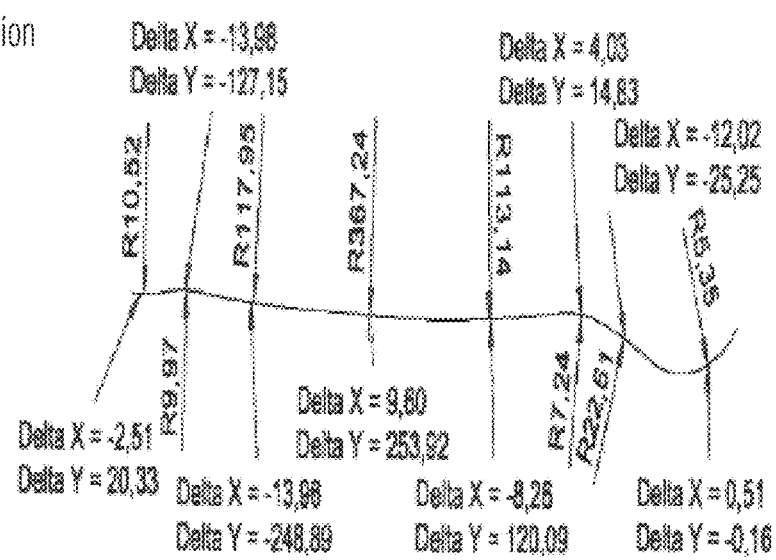
Figure 57C:
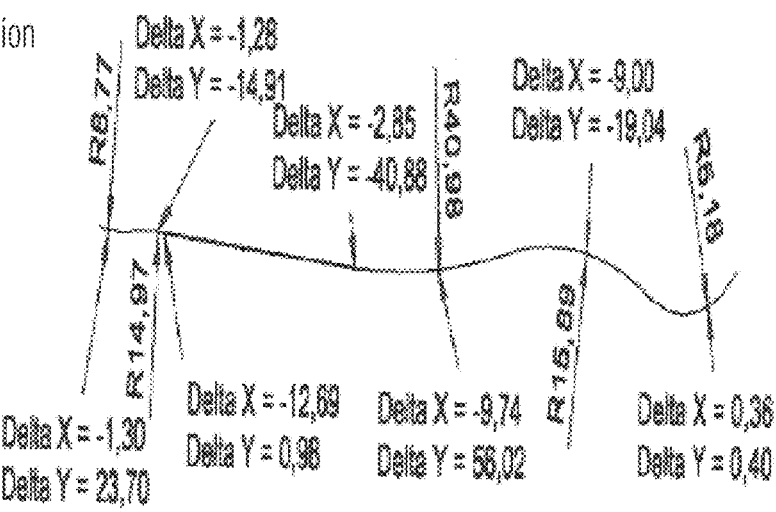
Figure 57D:
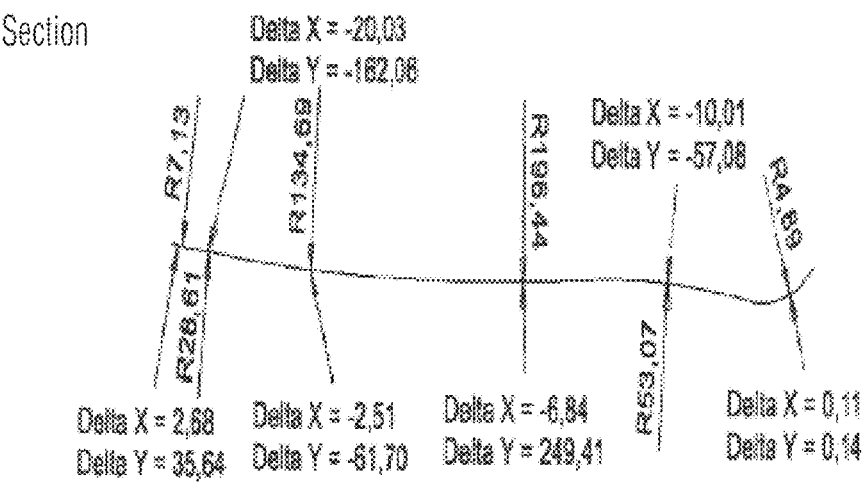

The sections 1 to 12 apparent from FIGS. 57 to 57*d* show a comparatively intensely structured partial dental arch having a correspondingly more distinct wavy structure.

Figure 58:
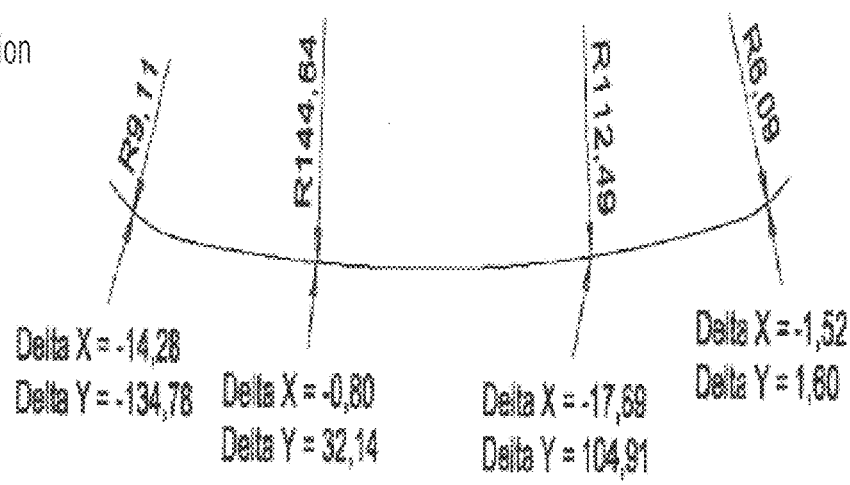
FIGS. 58, 58A, 58B, 58C and 58D show a further embodiment of an inventive partial dental arch illustrating 12 sections, corresponding to the position according to FIG. 56B.
Figure 58:
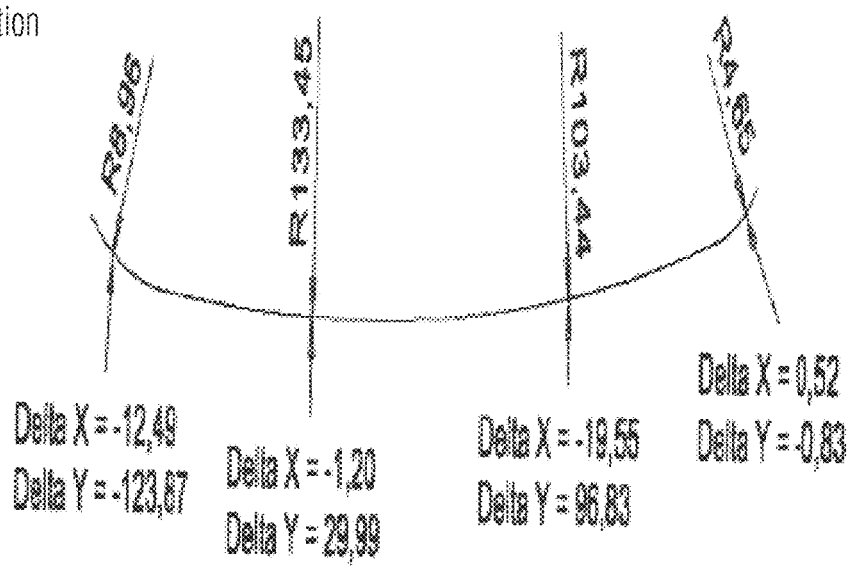
Figure 58A:
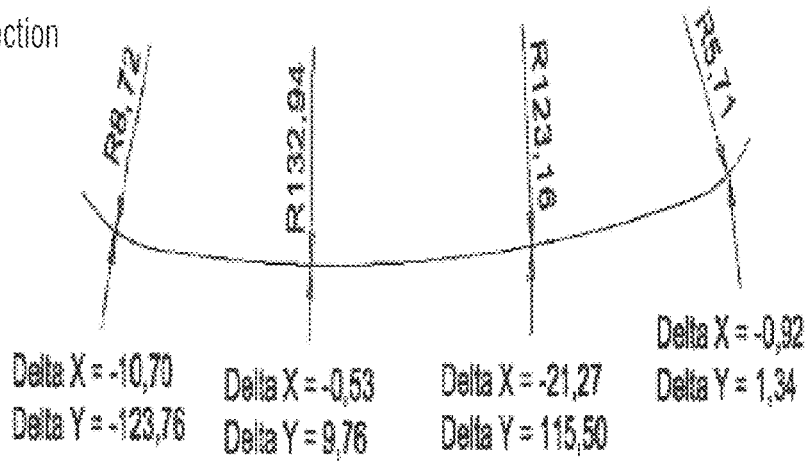
Figure 58A:
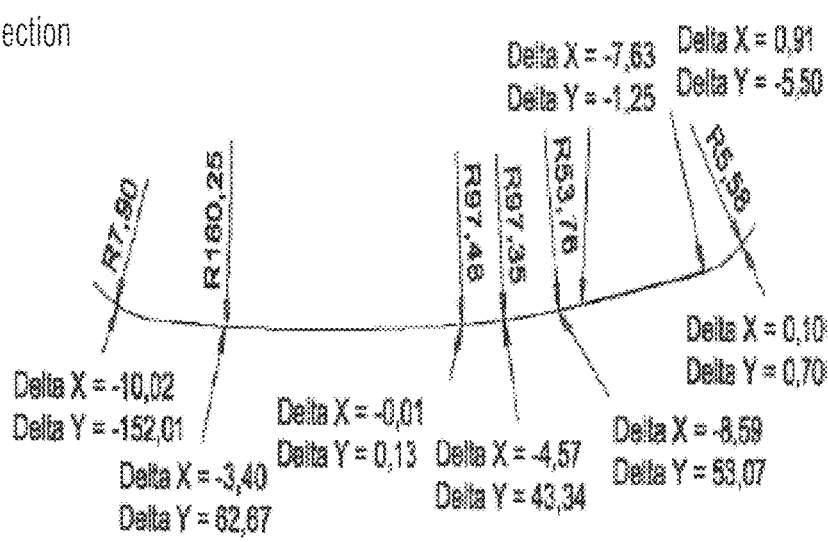
Figure 58A:
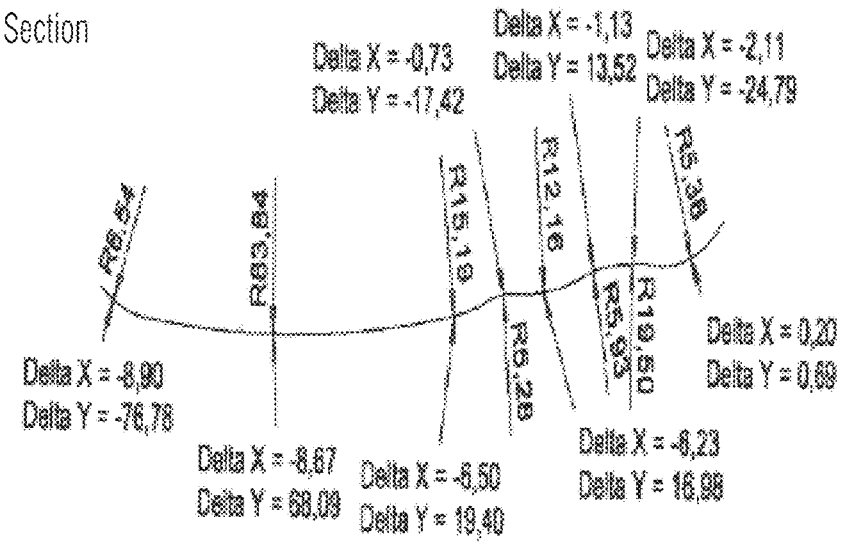
Figure 58B:
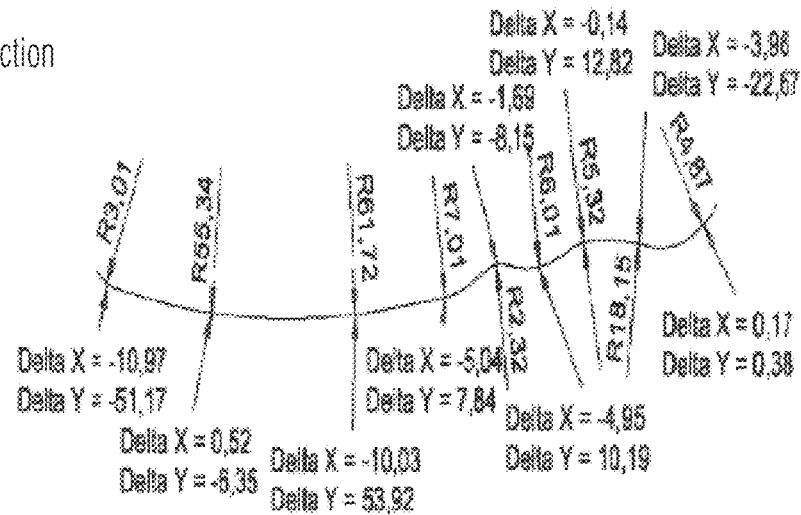
Figure 58B:
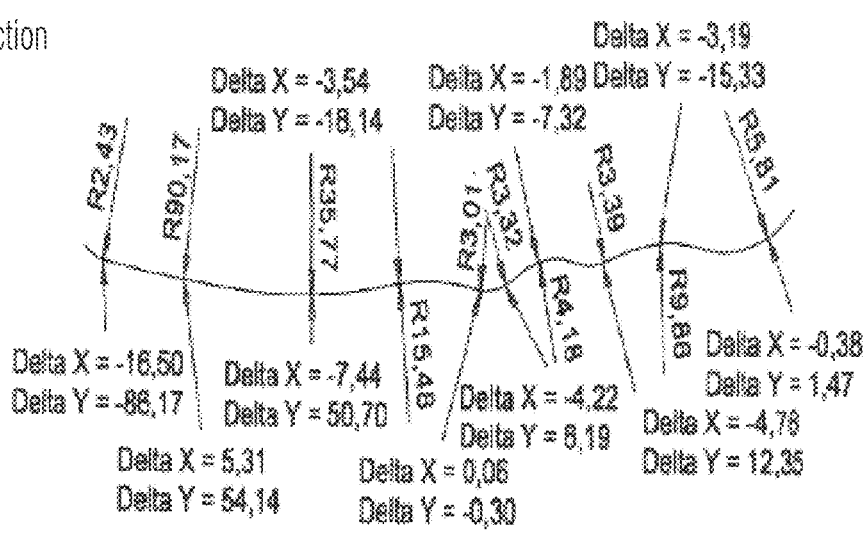
Figure 58B:
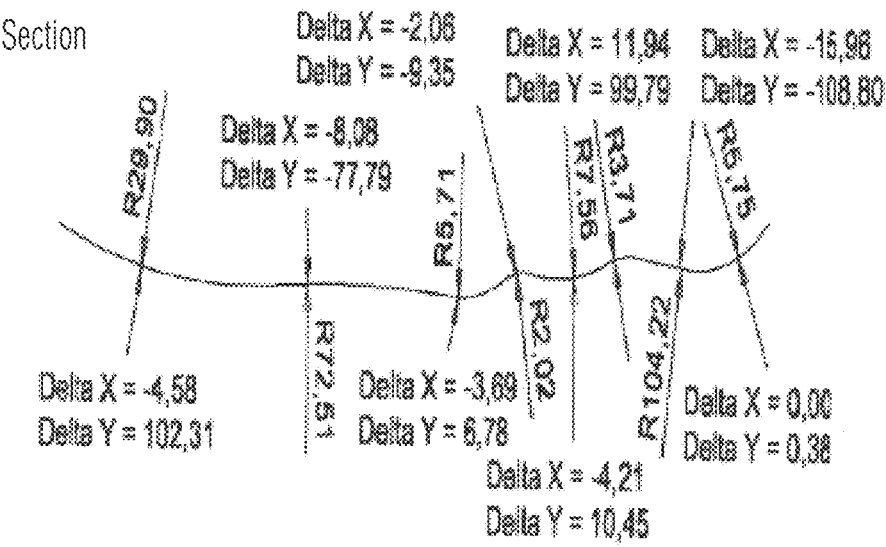
Figure 58C:
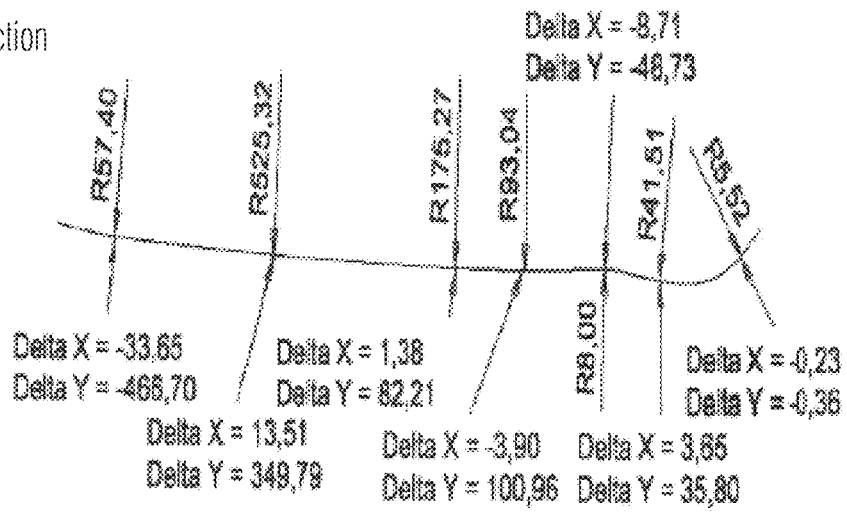
Figure 58C:
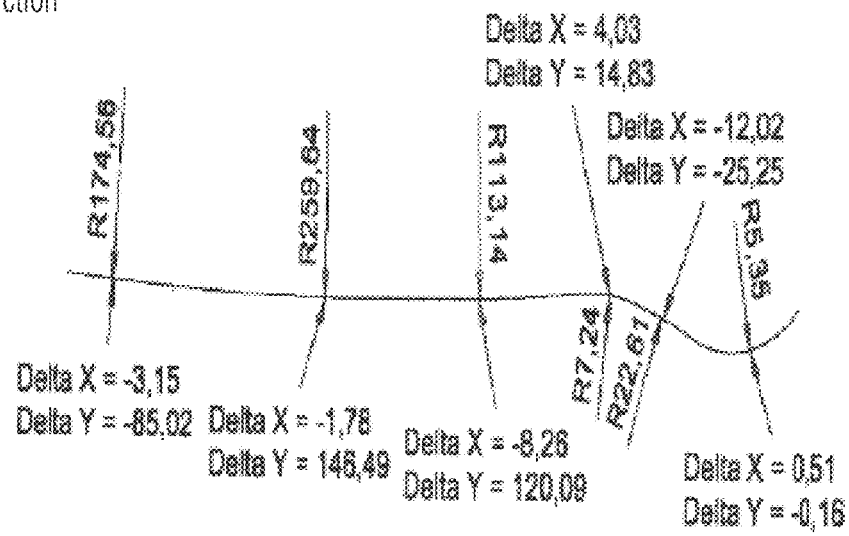
Figure 58C:
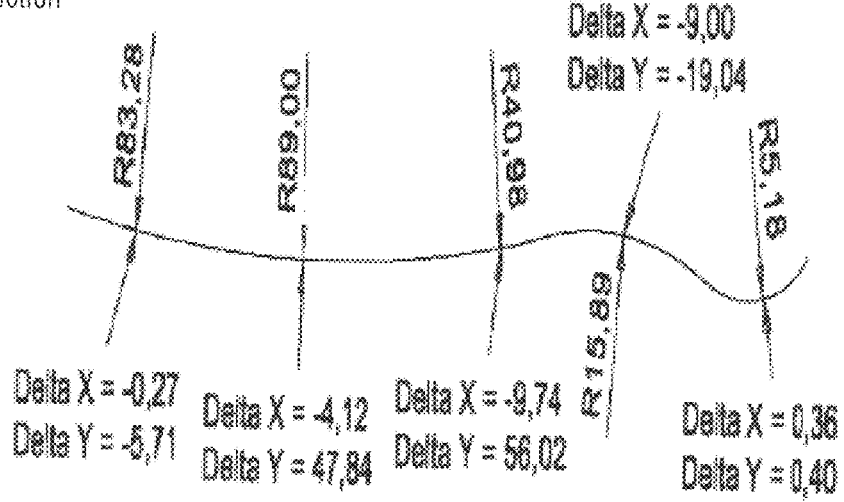
Figure 58D:
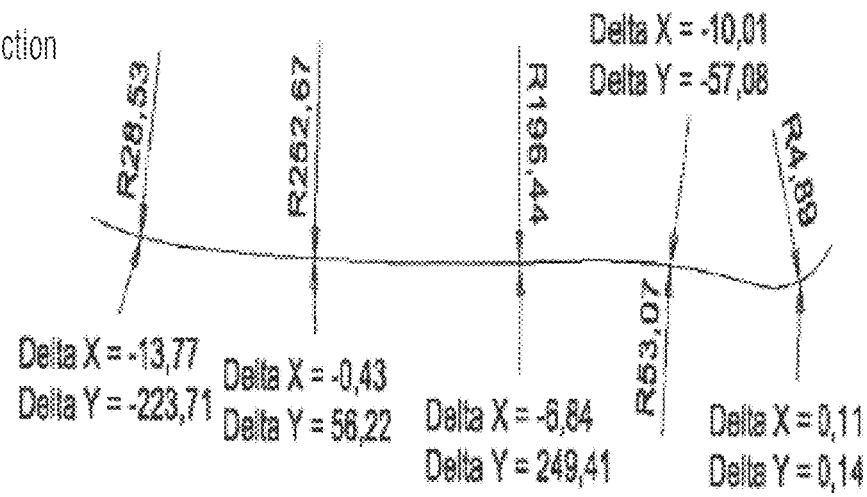

The sections 1 to 12 apparent from FIGS. 58 to 58*d* show a comparatively less intensely structured partial dental arch having a correspondingly less distinct wavy structure which may be used as a milling blank alternatively in this respect.

Figure 59:
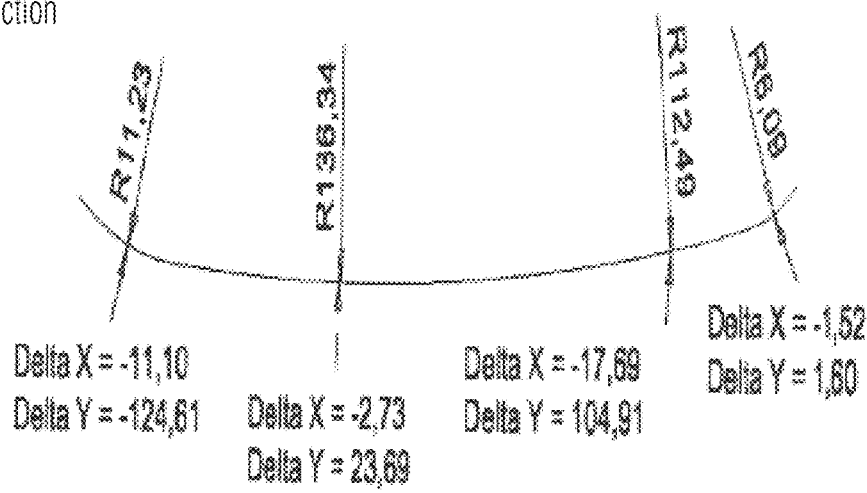
FIGS. 59, 59A, 59B, 59C and 59D show a further embodiment of an inventive partial dental arch illustrating 12 sections, corresponding to the position according to FIG. 56B.
Figure 59:
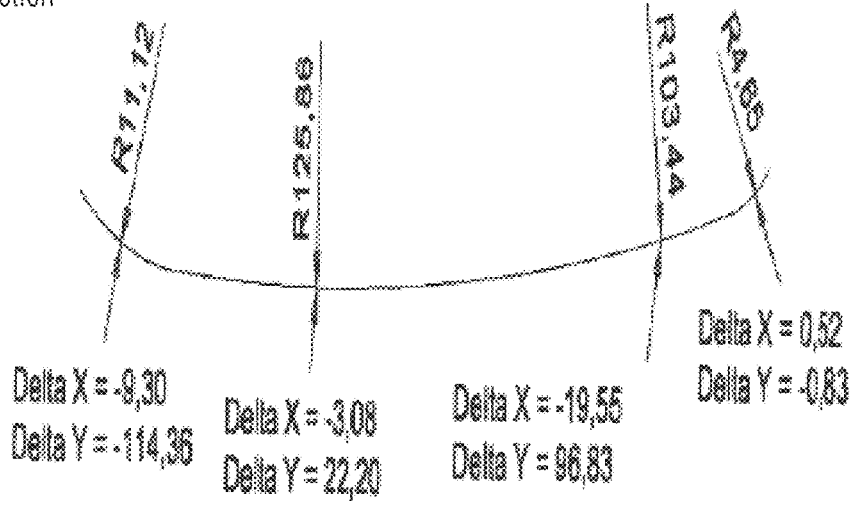
Figure 59A:
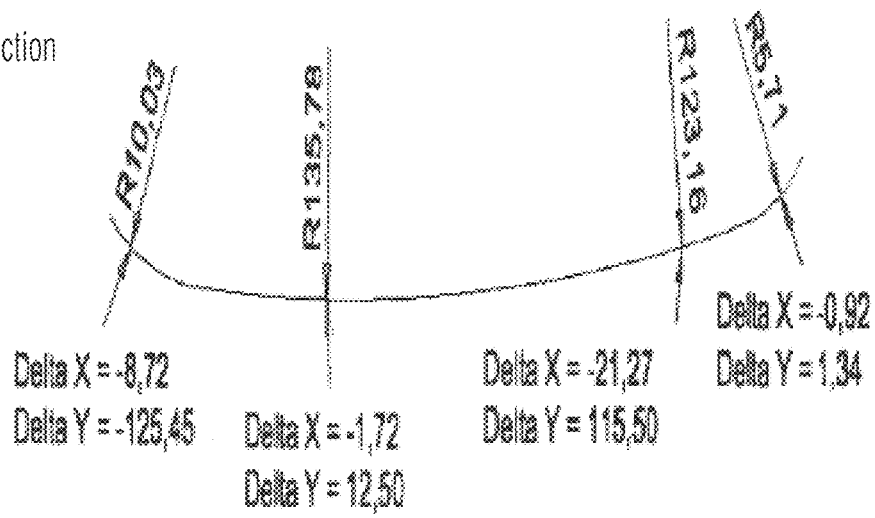
Figure 59A:
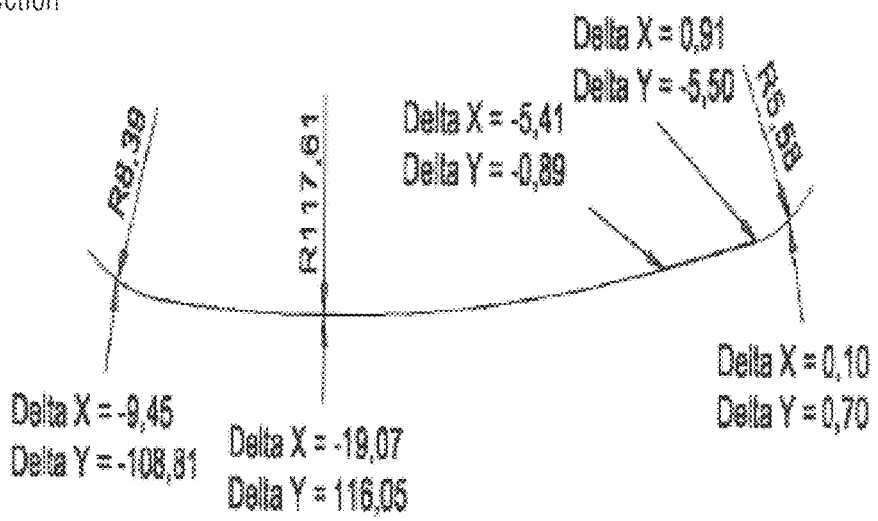
Figure 59A:
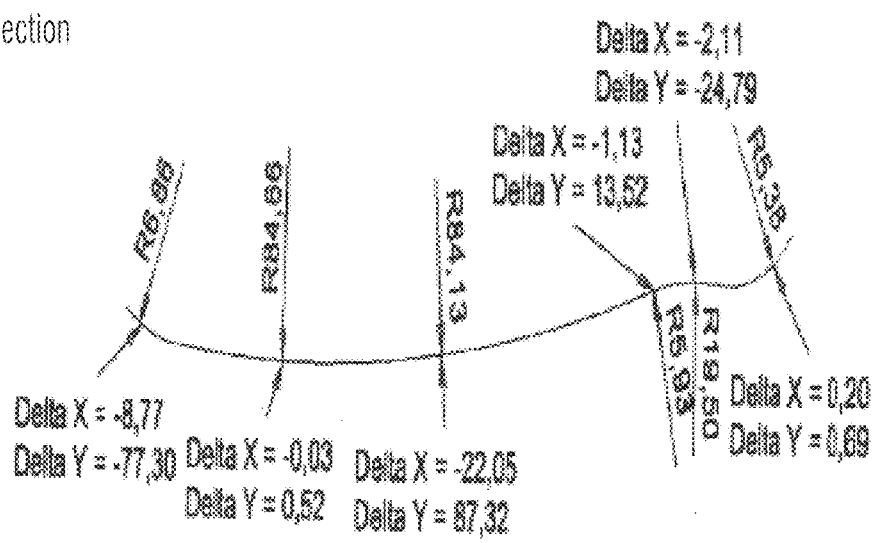
Figure 59B:
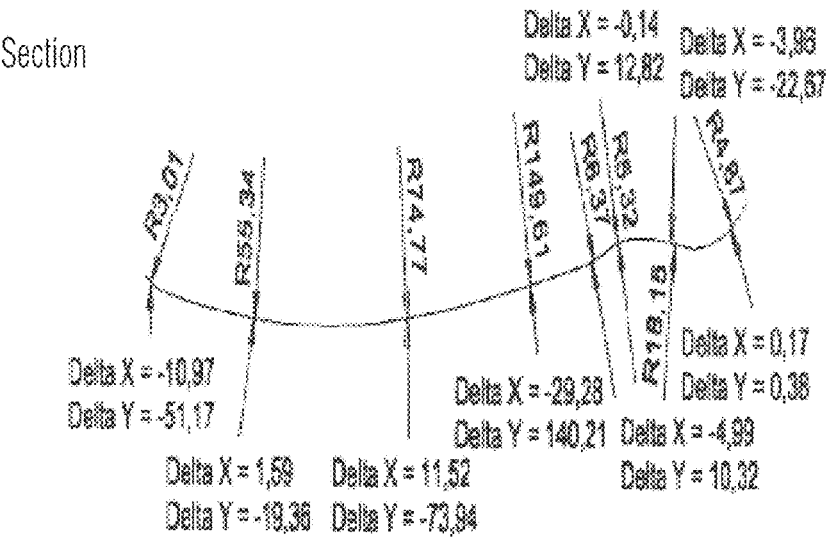
Figure 59B:
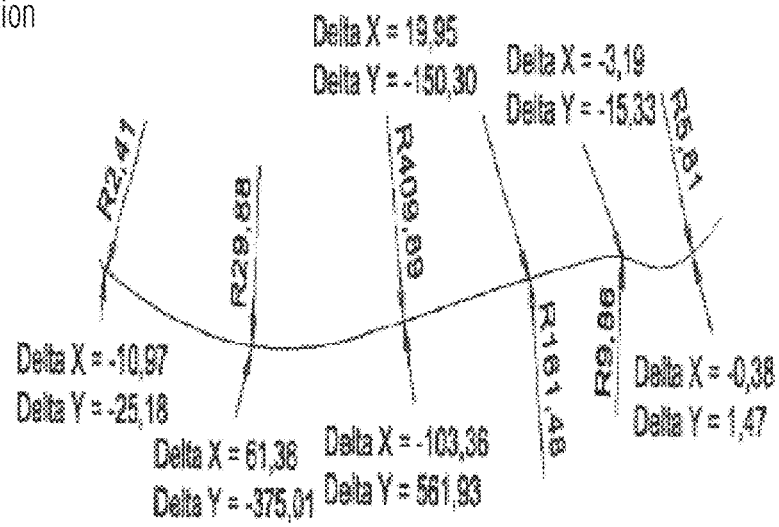
Figure 59B:
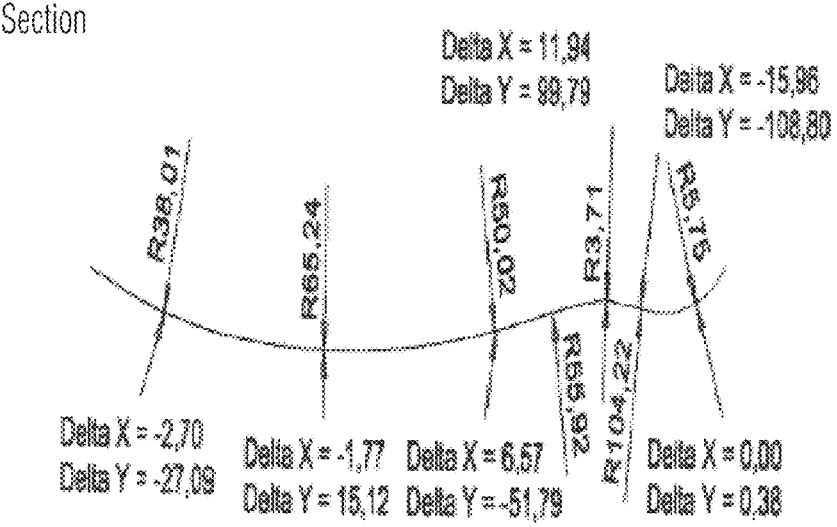
Figure 59C:
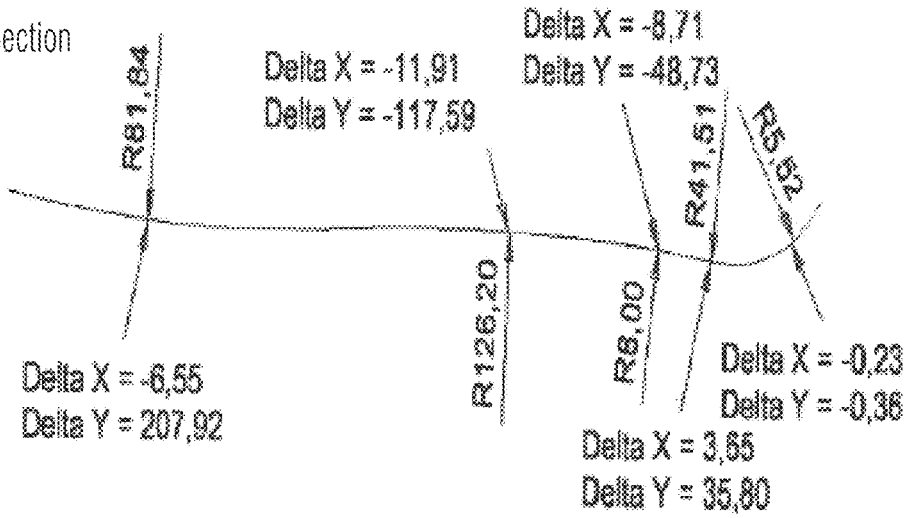
Figure 59C:
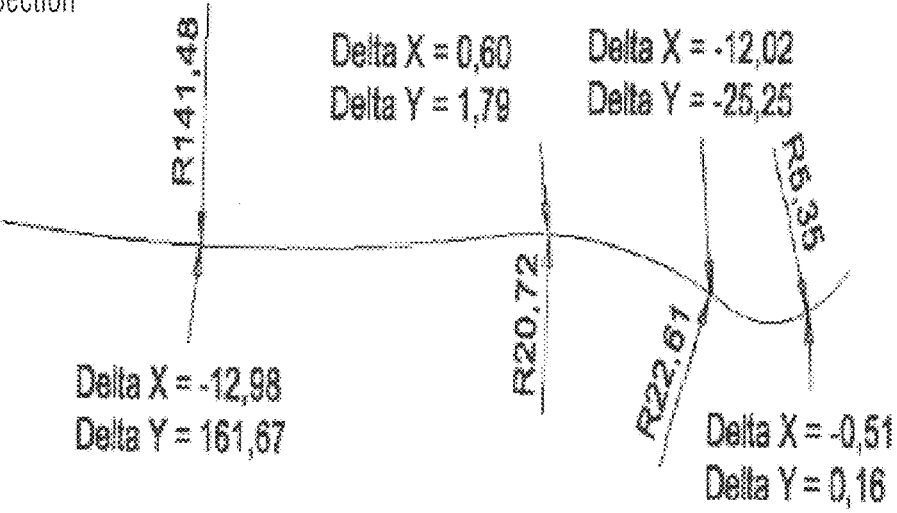
Figure 59C:
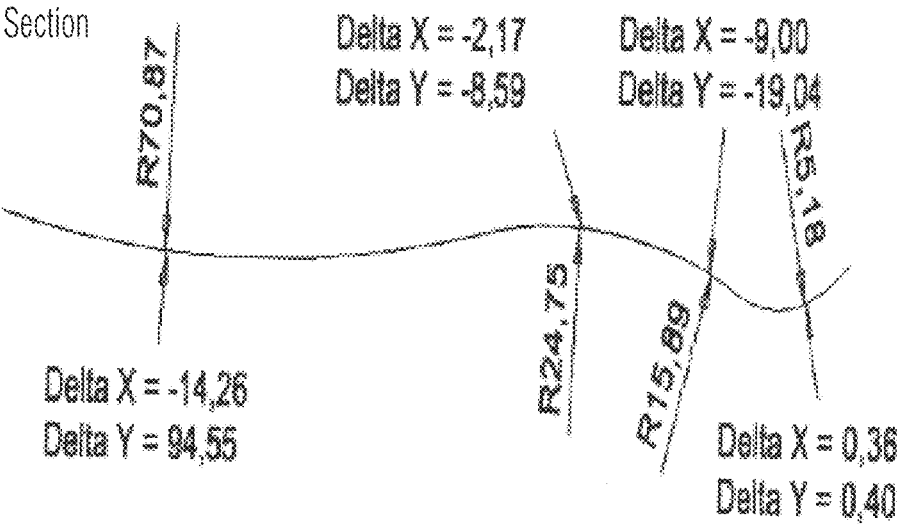
Figure 59D:
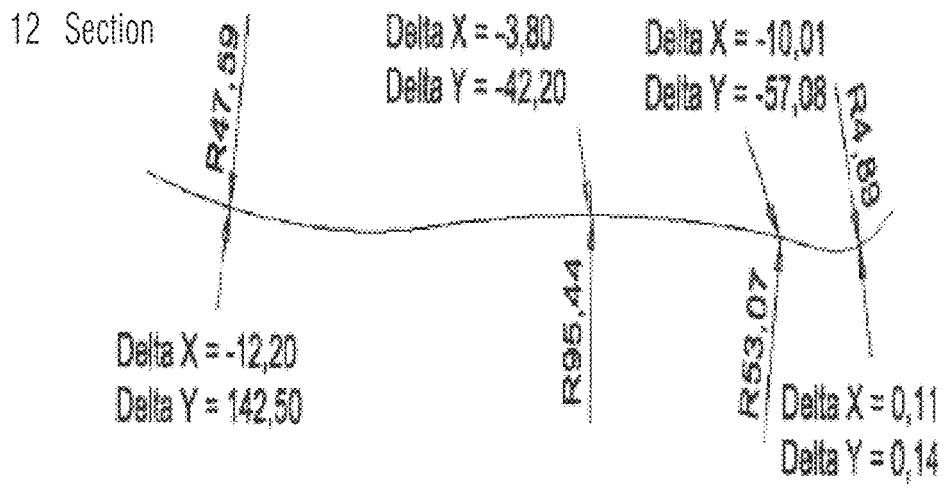

A partial dental arch which is modified compared thereto and even less wavy is apparent from FIGS. 59 to 59*d*.

Figure 60:
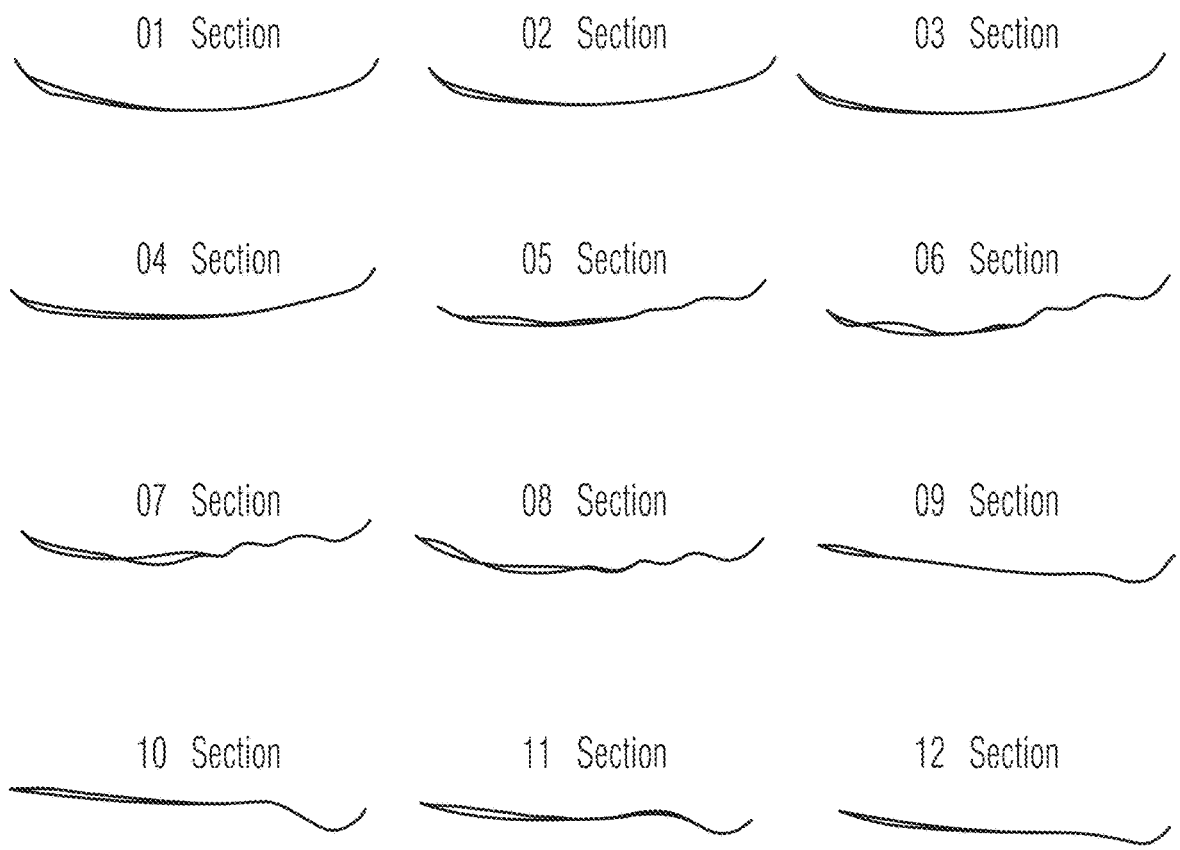
FIG. 60 shows a comparison of the sections from FIG. 57 and FIG. 58.
Figure 61:
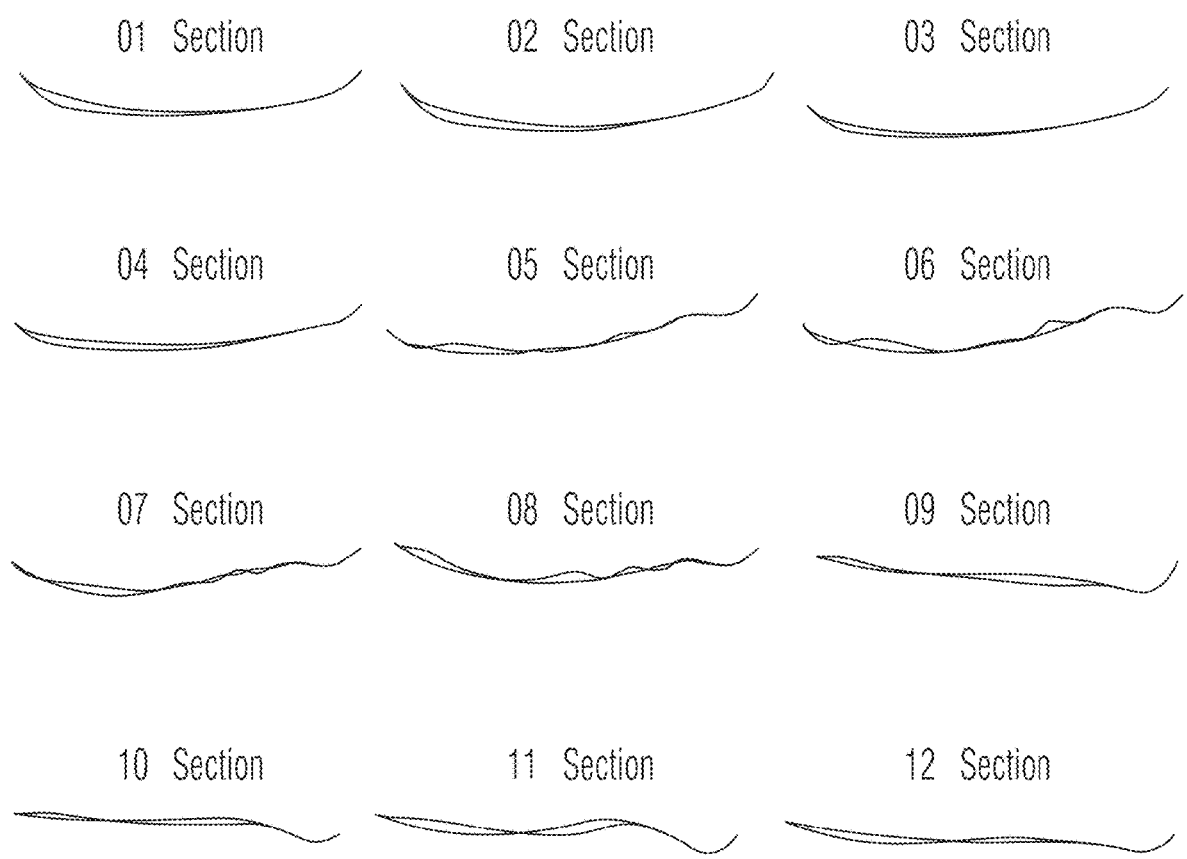
FIG. 61 shows a comparison of the sections from FIG. 57 and FIG. 59.

For clarification, the curves of the sections from the FIGS. 57 and 58 are entered one above the other in FIG. 60, and that from the FIGS. 57 and 59 in FIG. 61.

FIG. 62*a* shows a partial dental arch for the teeth 4 to 7 in the lower jaw. The layer orientation, as is described in FIG. 63, is apparent from FIG. 62*b*.

Figure 63:
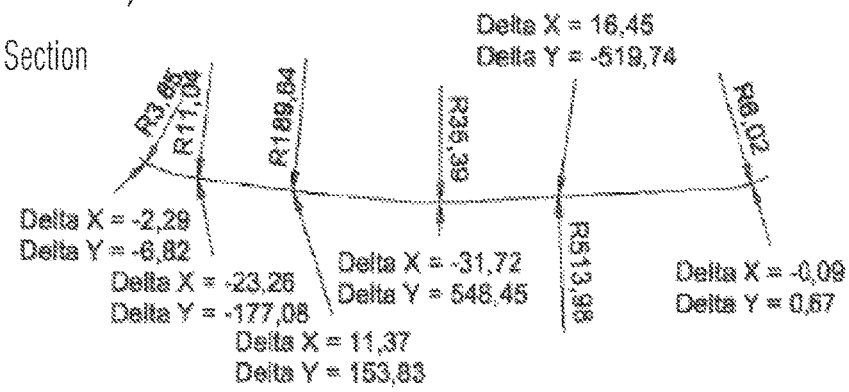
FIGS. 63 and 63A show curves of the sections 1 to 12 from FIG. 62B corresponding to the position according to FIG. 62B.
Figure 63:
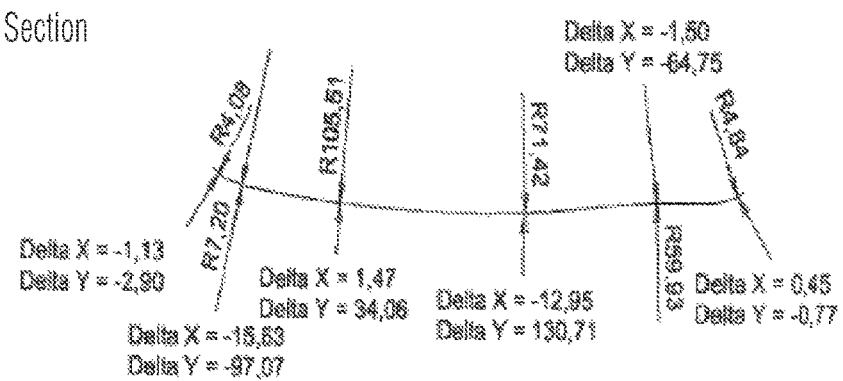
Figure 63:
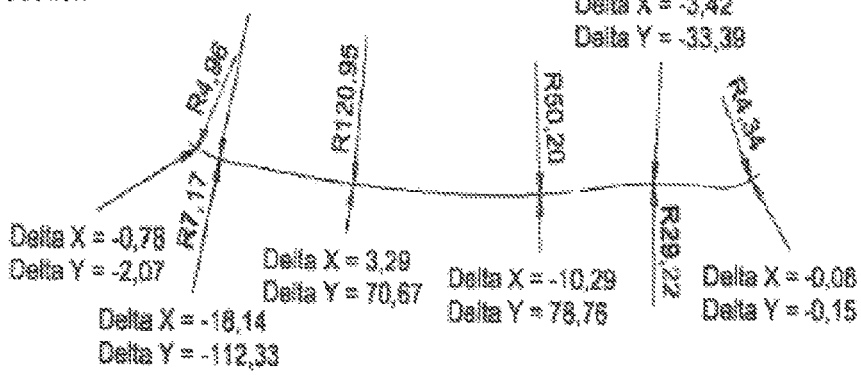
Figure 63:
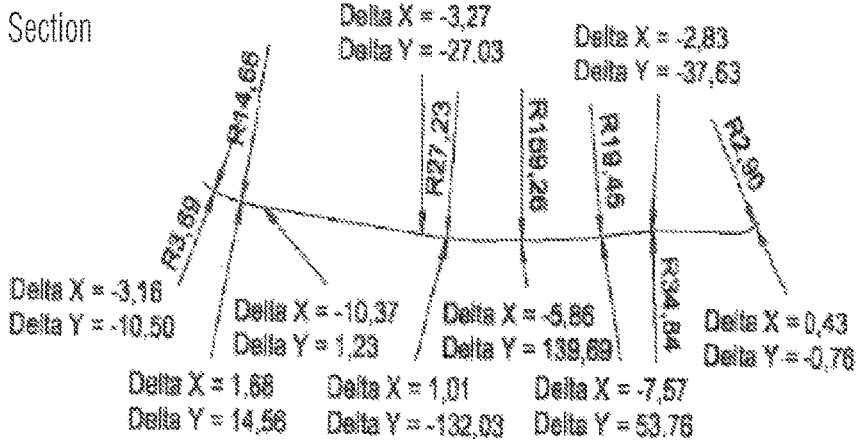
Figure 63:
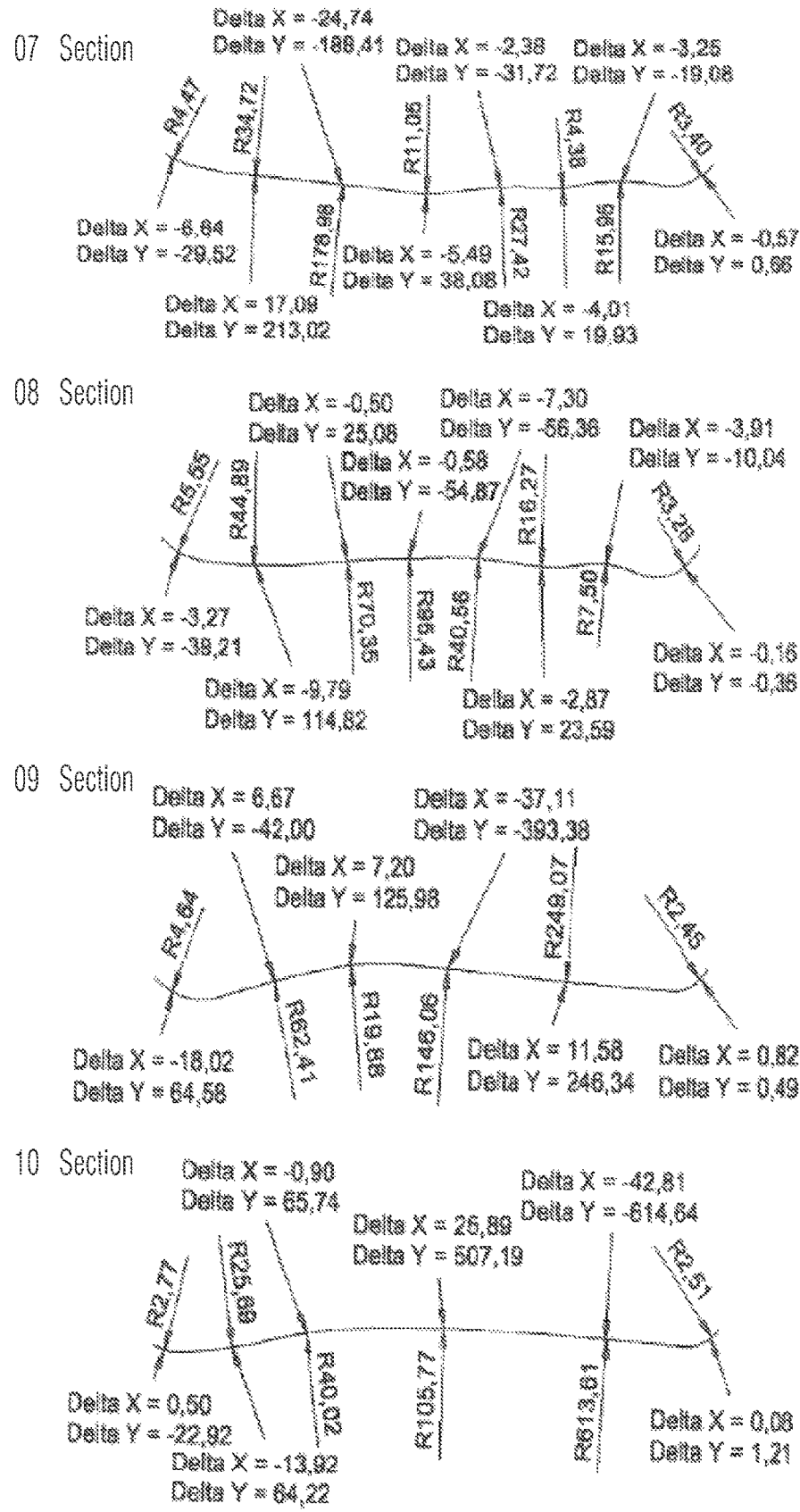
Figure 63A:
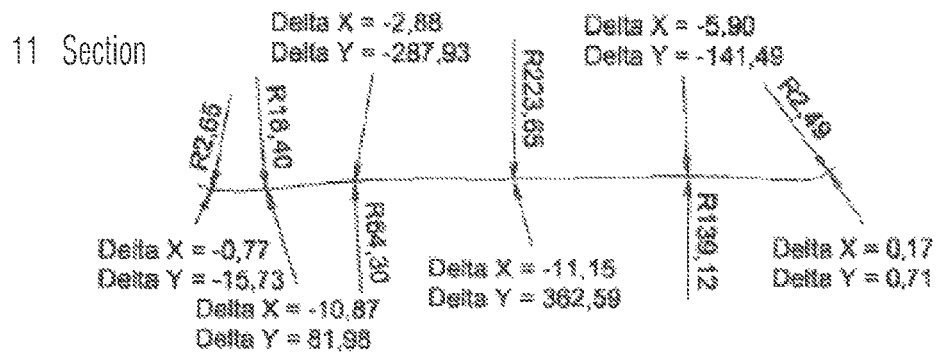
Figure 63A:
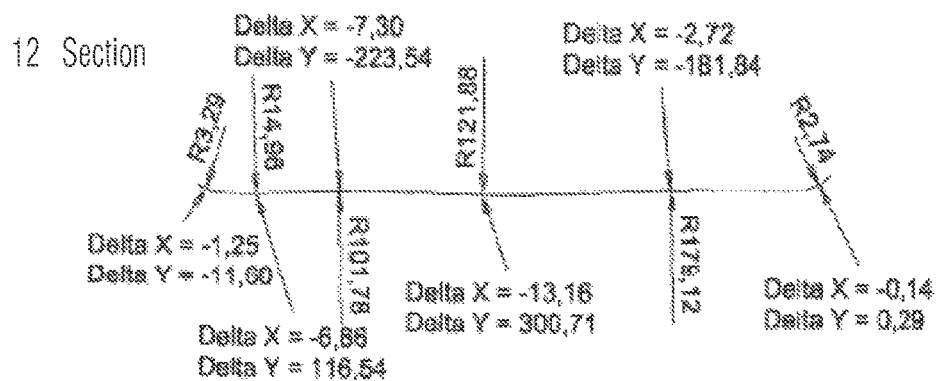

The sections 1 to 12 apparent from FIGS. 63 and 63*a* show a comparatively intensely structured partial dental arch having a correspondingly more distinct wavy structure.

Figure 64:
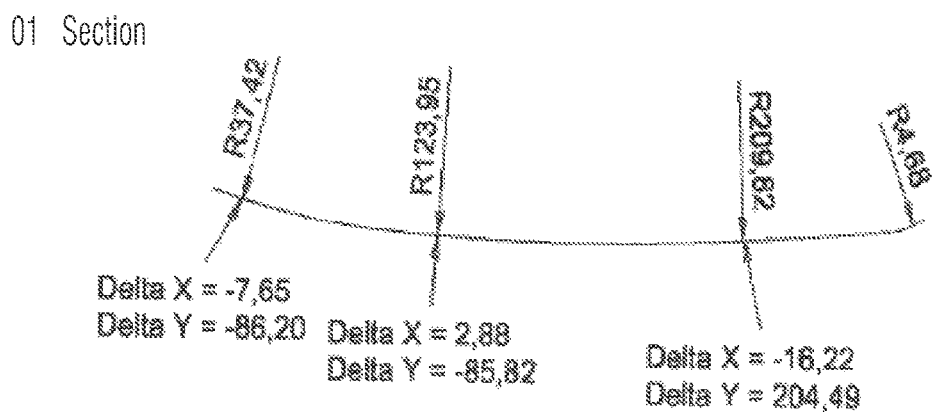
FIG. 64 shows a further embodiment of an inventive partial dental arch illustrating 12 sections, corresponding to the position according to FIG. 62B.
Figure 64:
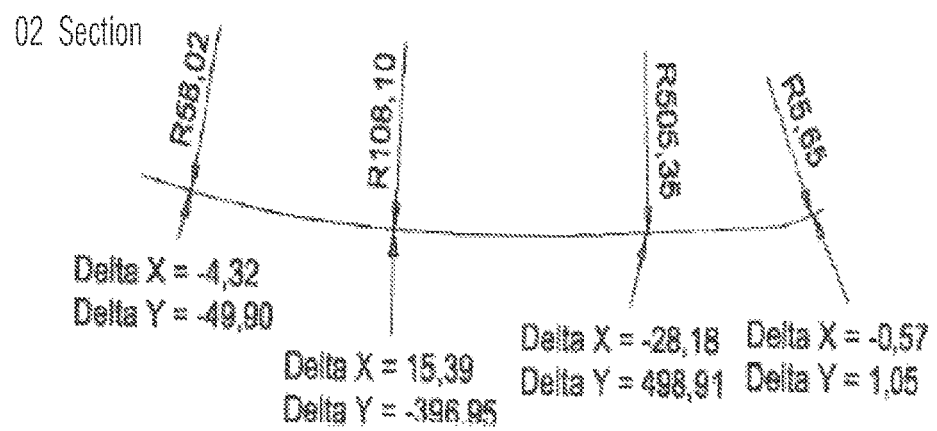
Figure 64:
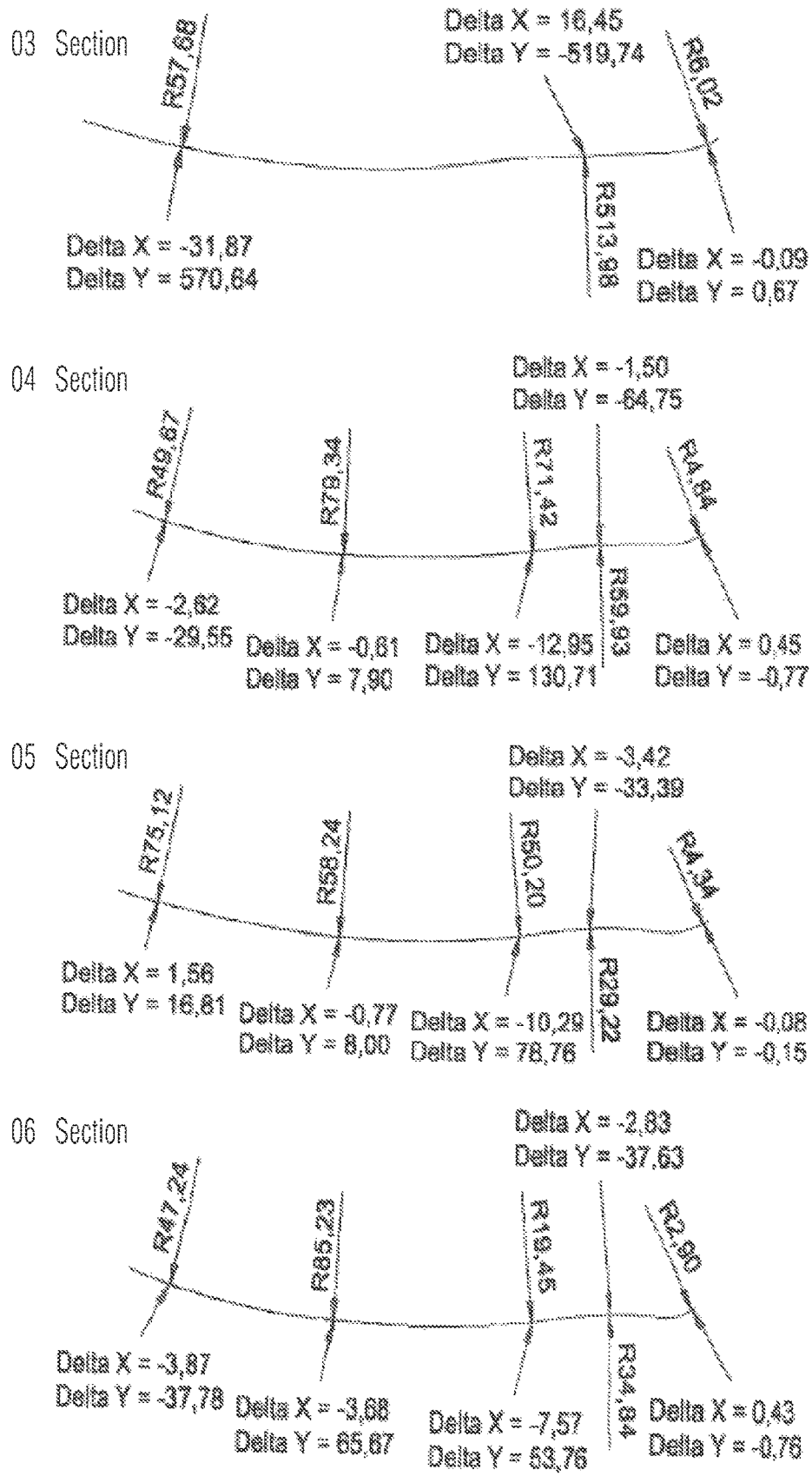
Figure 64:
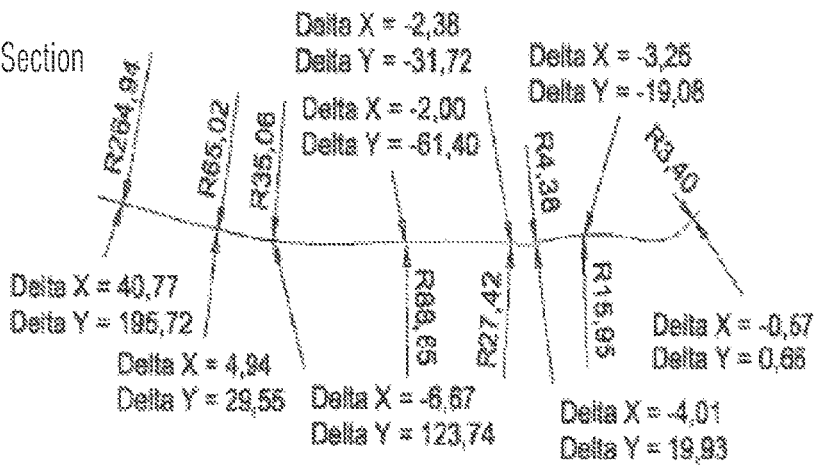
Figure 64:
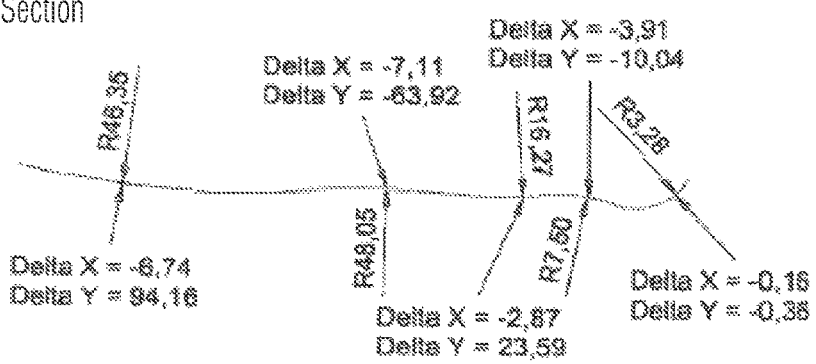
Figure 64:
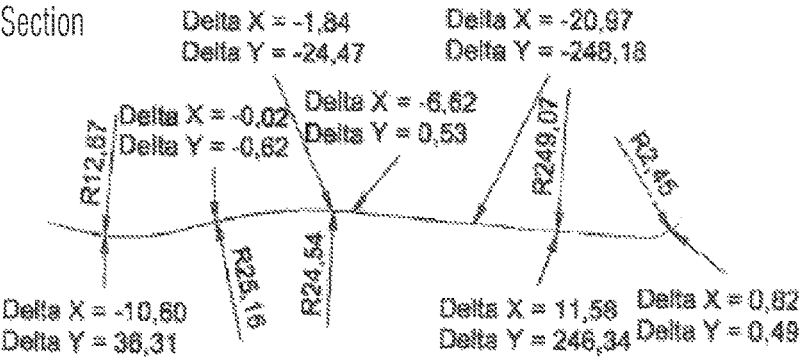
Figure 64:
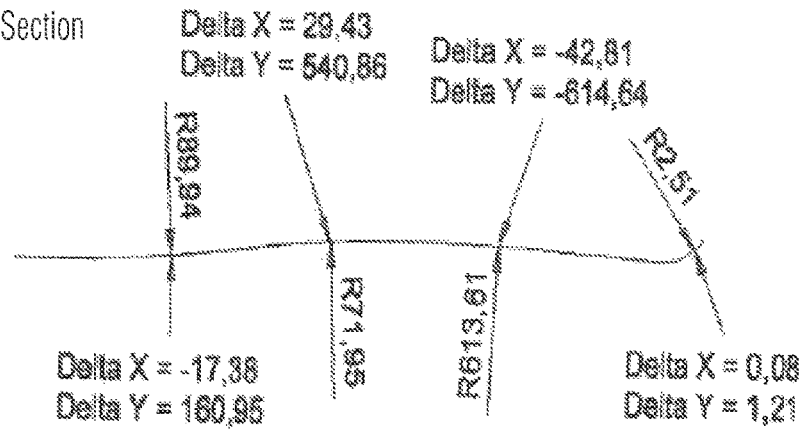
Figure 64:
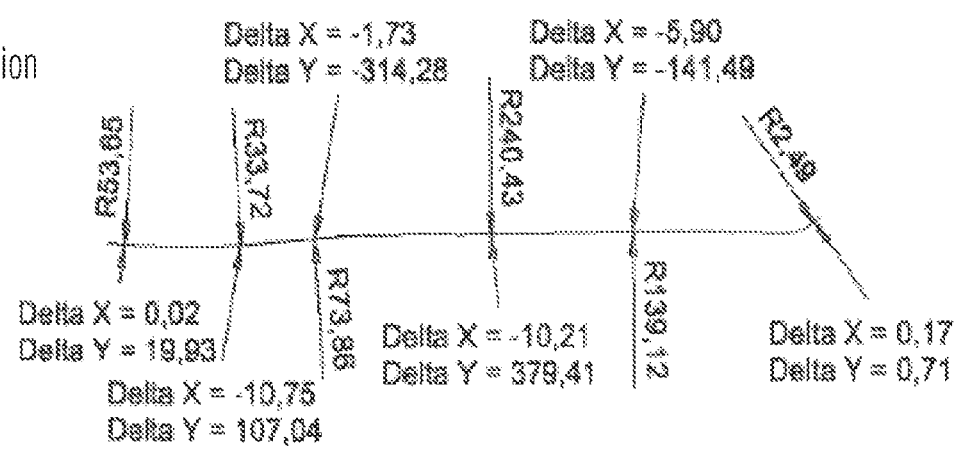
Figure 64:
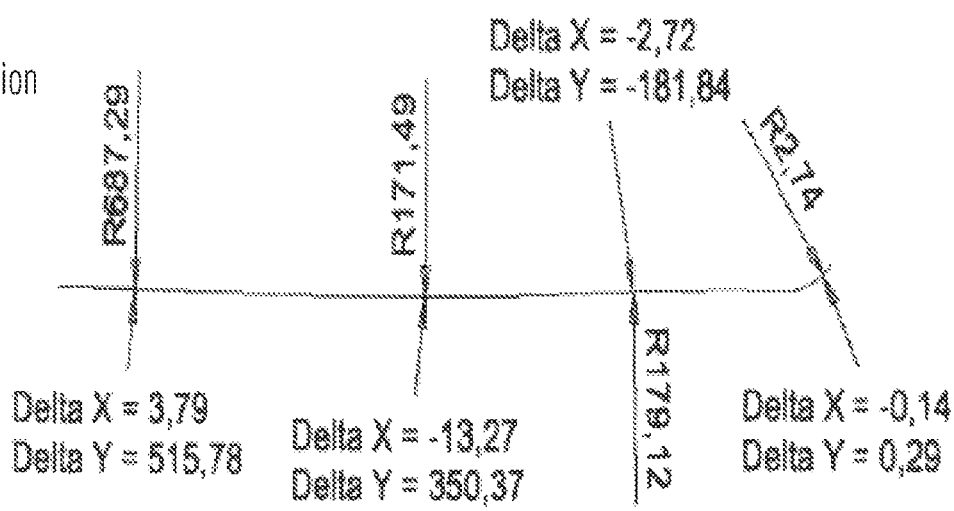

The sections 1 to 12 apparent from FIG. 64 show a comparatively less intensely structured partial dental arch having a correspondingly less distinct wavy structure which may be used as a milling blank in this respect.

Figure 65:
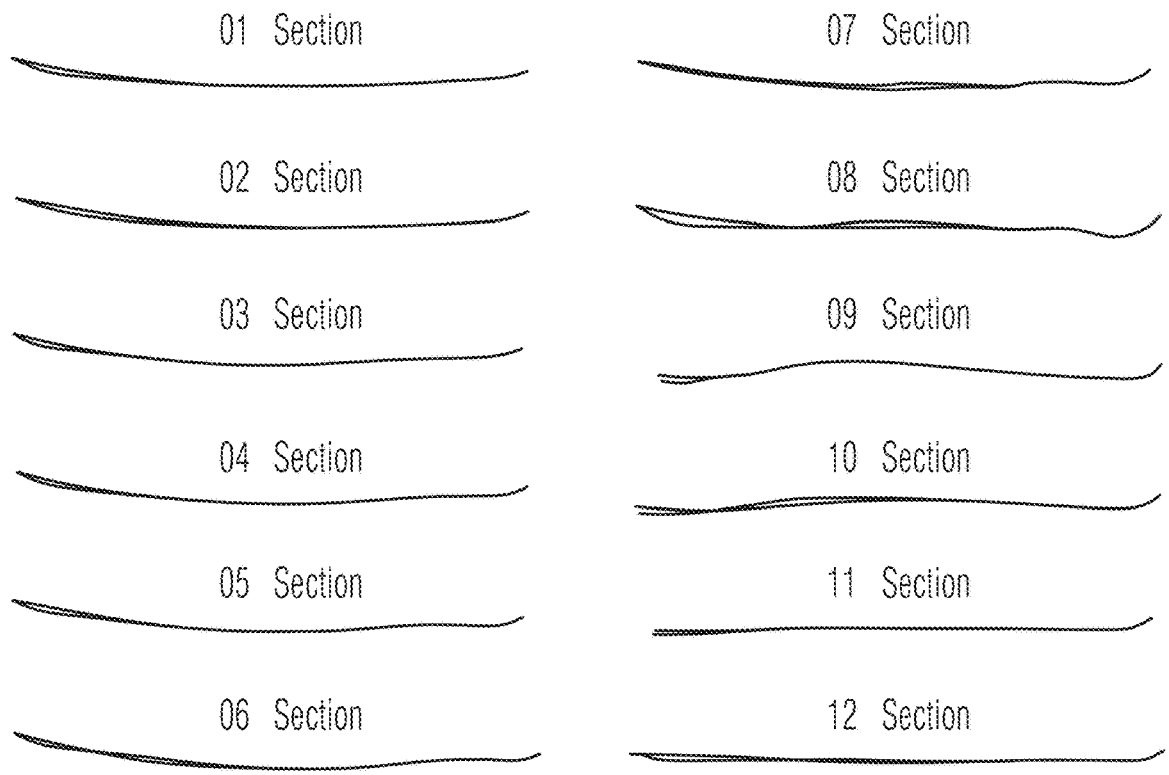
FIG. 65 shows a comparison of the sections from FIG. 63 and FIG. 64.

For clarification, the curves of the sections from the FIGS. 63 and 64 are entered one above the other in FIG. 65.

Figure 66A:
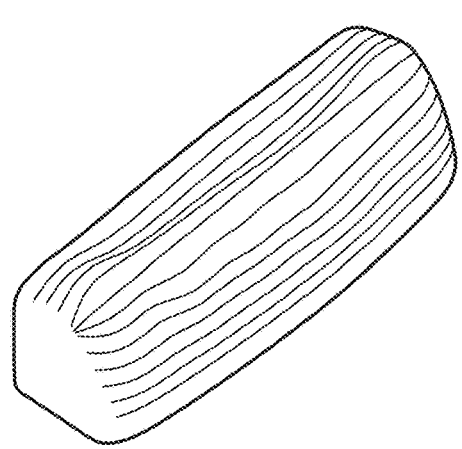
FIG. 66A shows an embodiment of the invention in an illustration according to FIG. 50A illustrating a partial dental arch for the teeth 3, 4, 5, 6 and 7 in the lower jaw.

FIG. 66*a* shows a partial dental arch for the teeth 3 to 7 in the lower jaw. The layer orientation, as is described in FIG. 67, is apparent from FIG. 66*b*.

Figure 67:
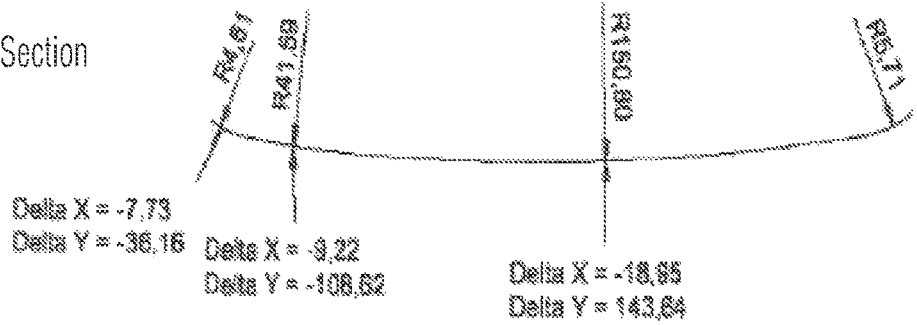
FIGS. 67 and 67A show curves of the sections 1 to 12 from FIG. 66B corresponding to the position according to FIG. 66B.
Figure 67:
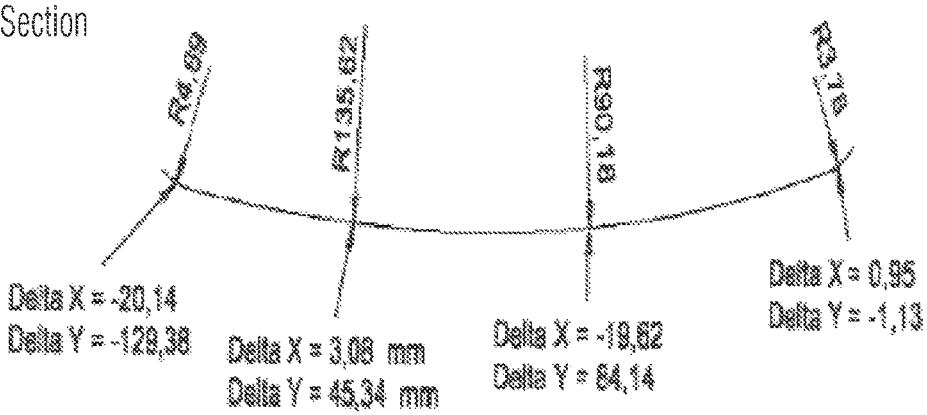
Figure 67:
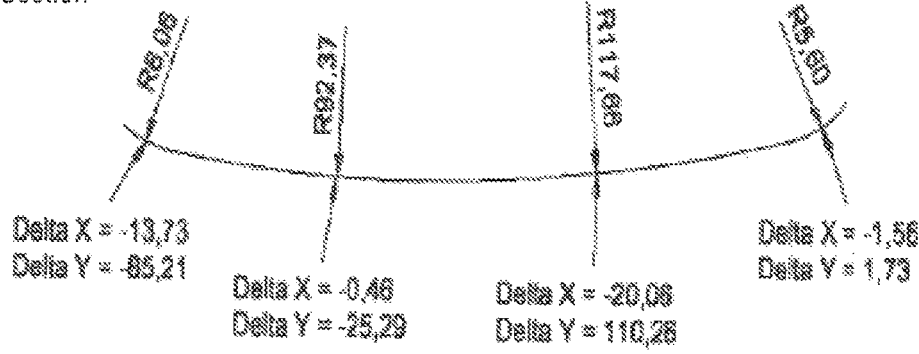
Figure 67:
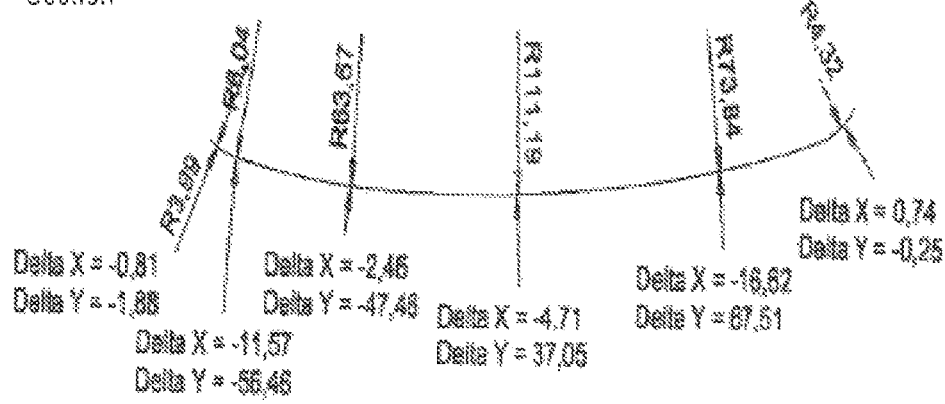
Figure 67:
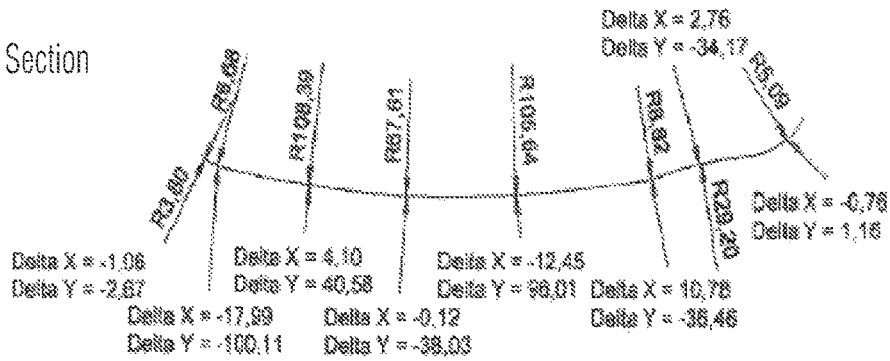
Figure 67:
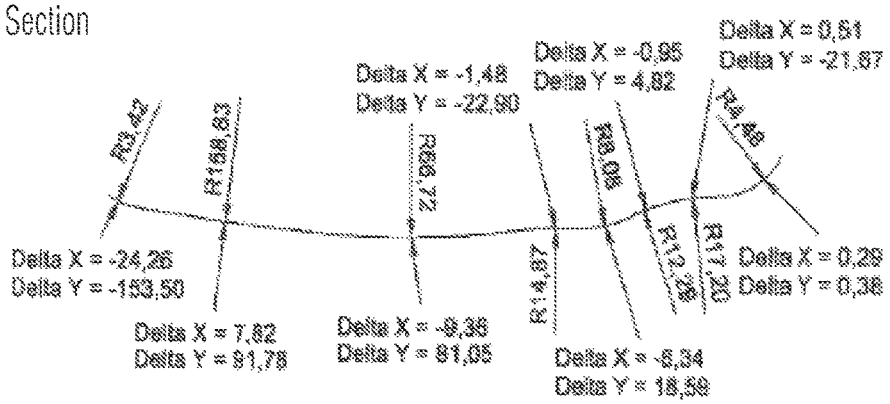
Figure 67:
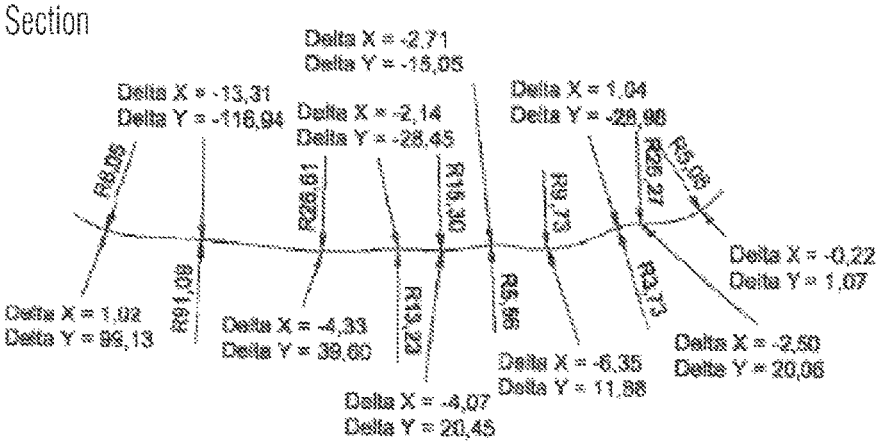
Figure 67:
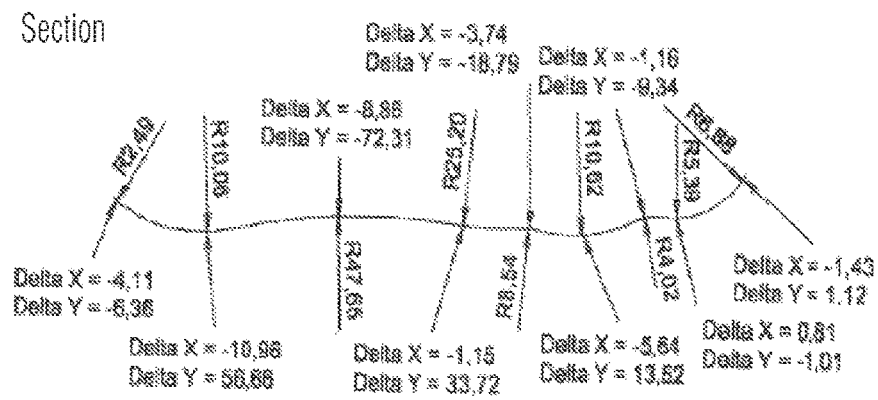
Figure 67A:
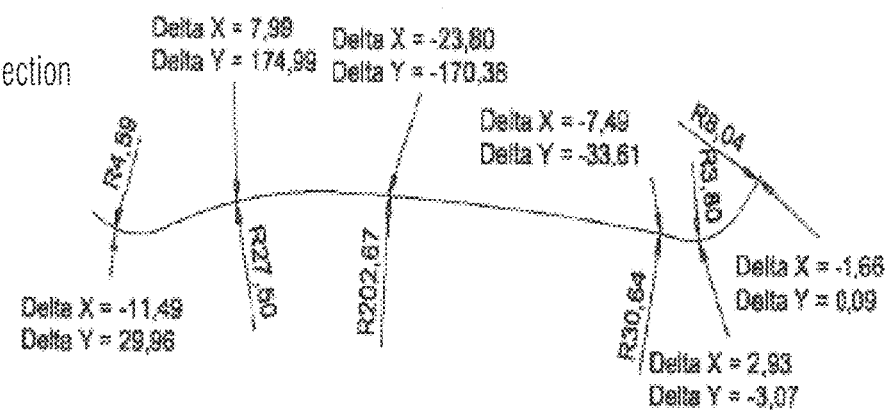
Figure 67A:
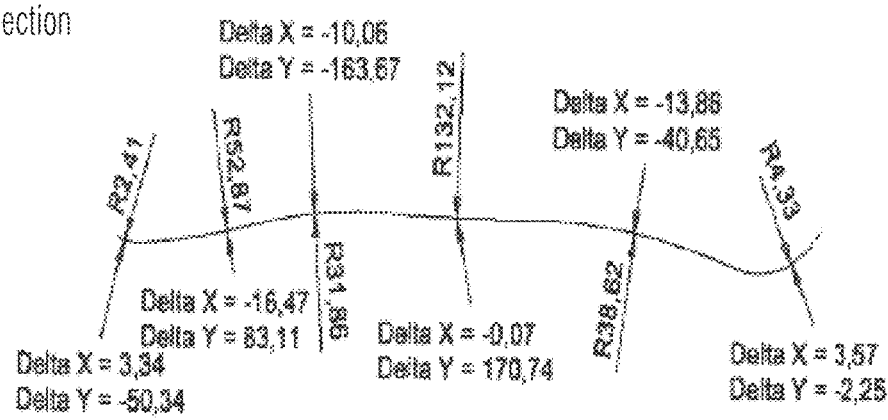
Figure 67A:
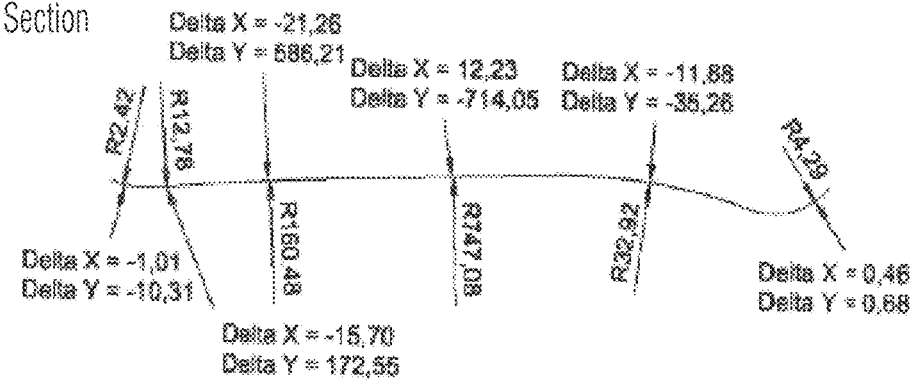
Figure 67A:
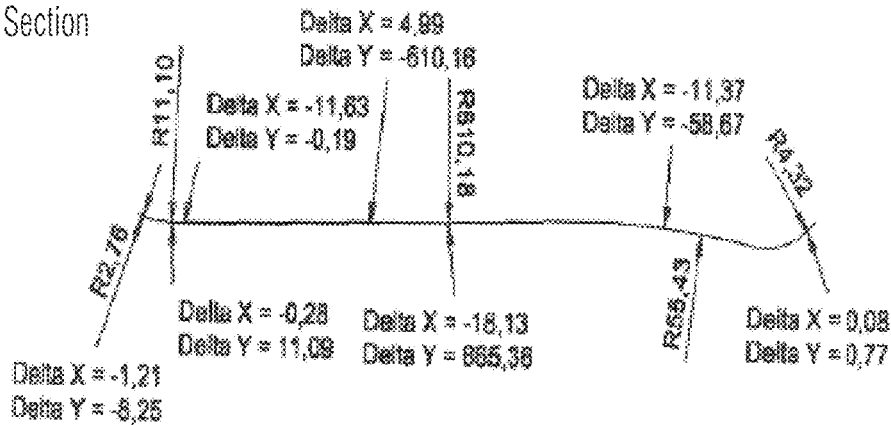

The sections 1 to 12 apparent from FIGS. 67 and 67*a* show a comparatively intensely structured partial dental arch having a correspondingly more distinct wavy structure.

Figure 68:
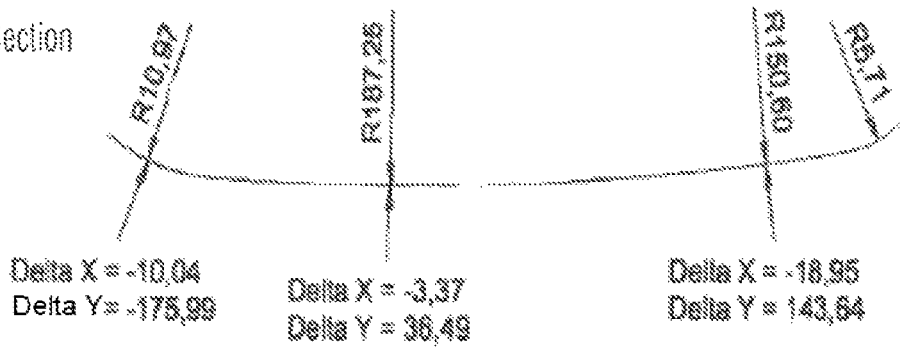
FIG. 68 shows a further embodiment of an inventive partial dental arch illustrating 12 sections, corresponding to the position according to FIG. 66B.
Figure 68:
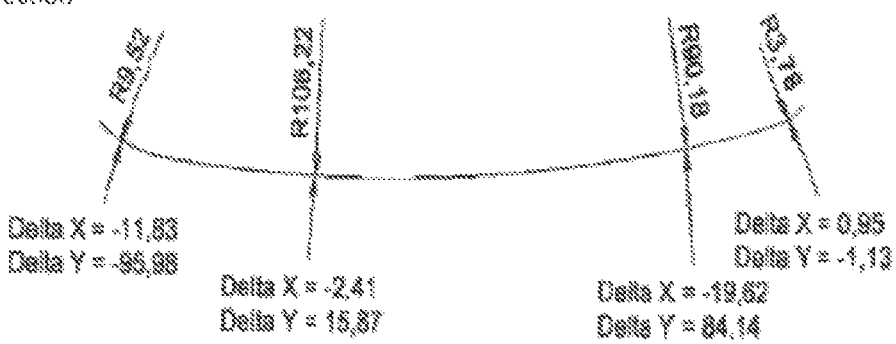
Figure 68:
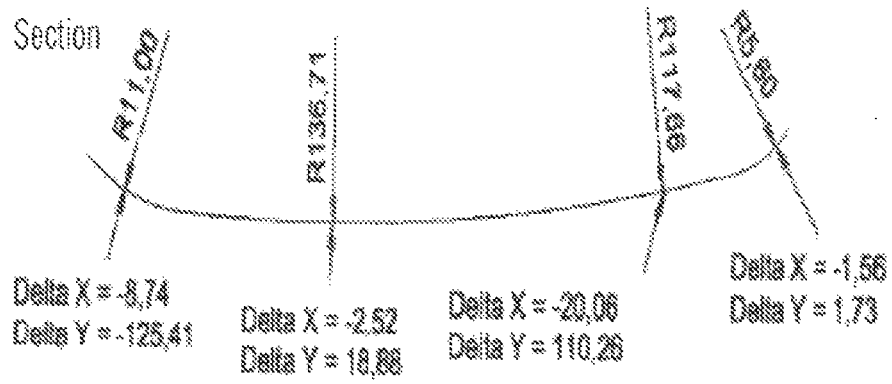
Figure 68:
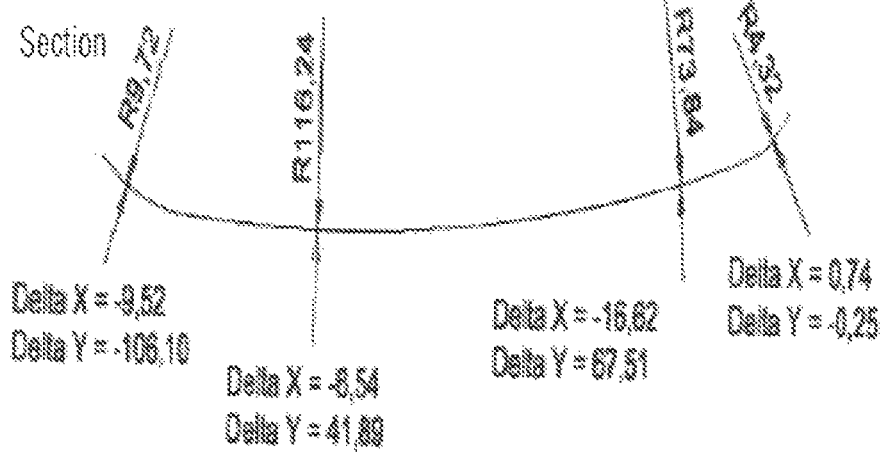
Figure 68:
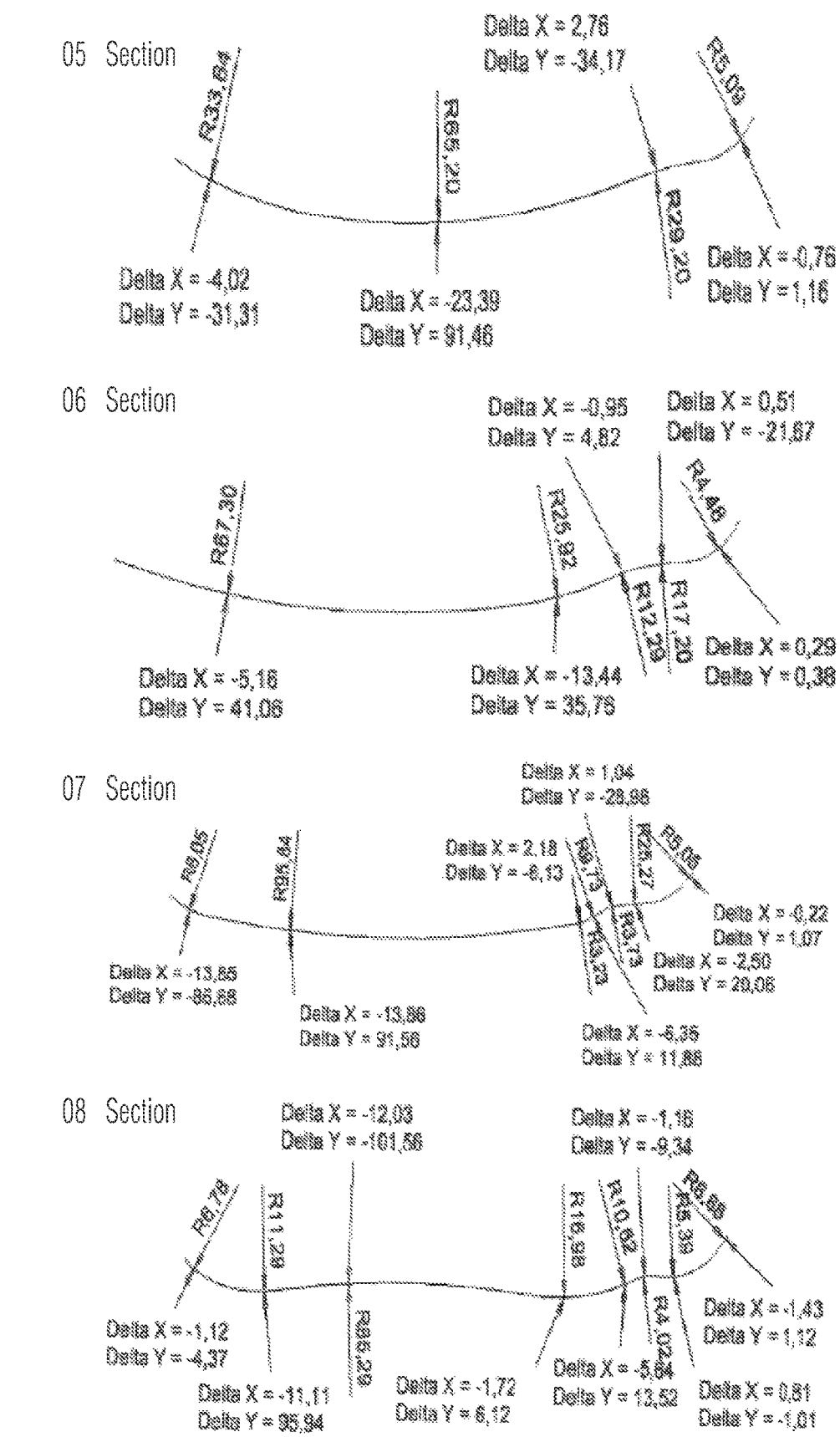
Figure 68:
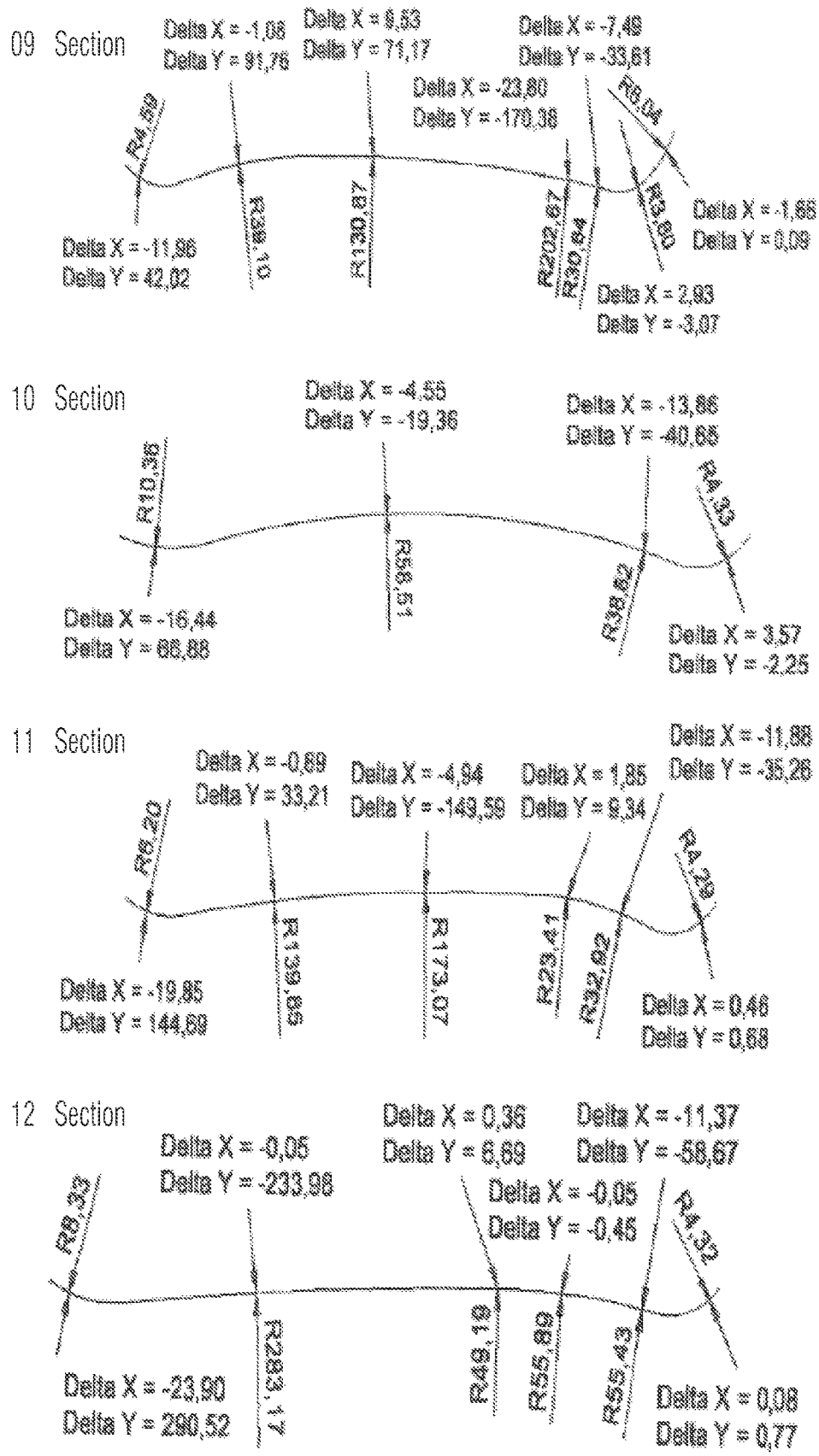

The sections 1 to 12 apparent from FIG. 68 show a comparatively less intensely structured partial dental arch having a correspondingly less distinct wavy structure which may be used as a milling blank alternatively in this respect.

Figure 69:
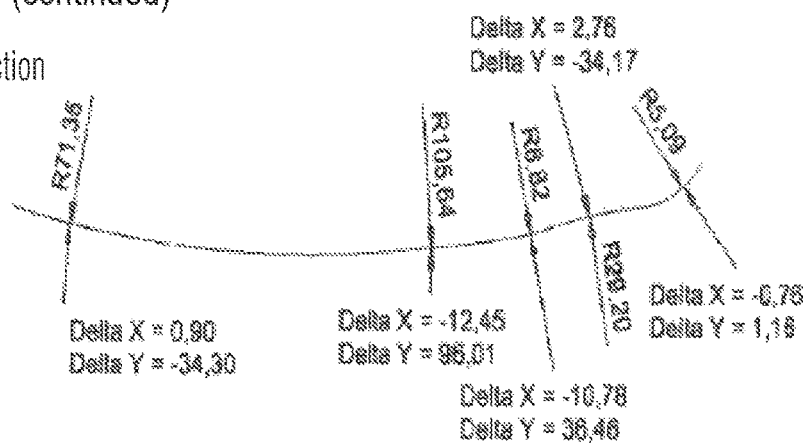
FIG. 69 shows a further embodiment of an inventive partial dental arch illustrating 12 sections, corresponding to the position according to FIG. 66B.
Figure 69:
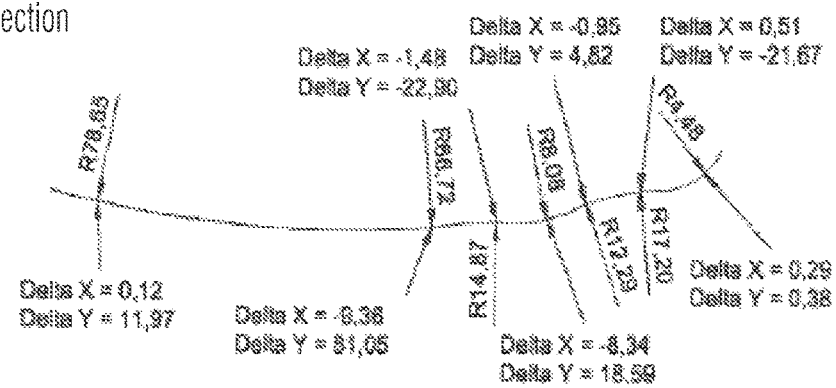
Figure 69:
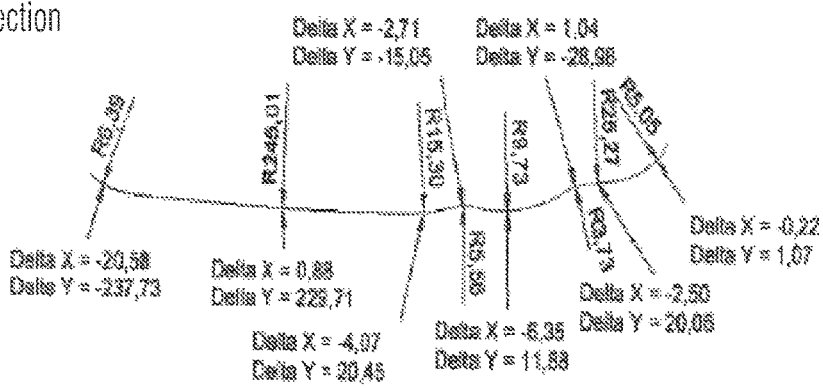
Figure 69:
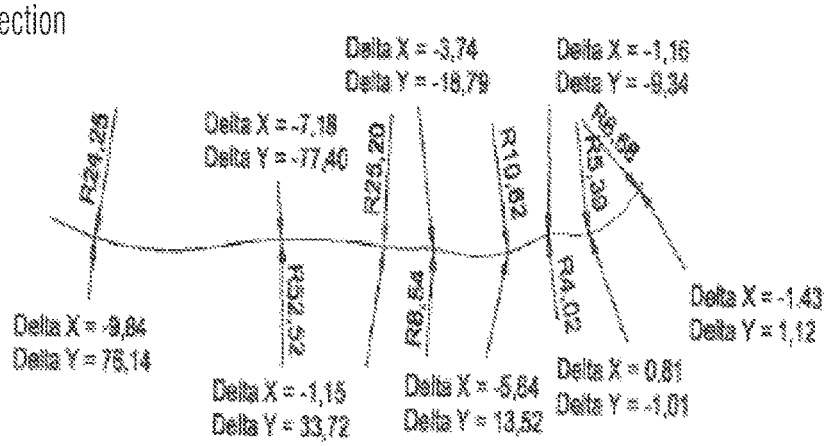
Figure 69:
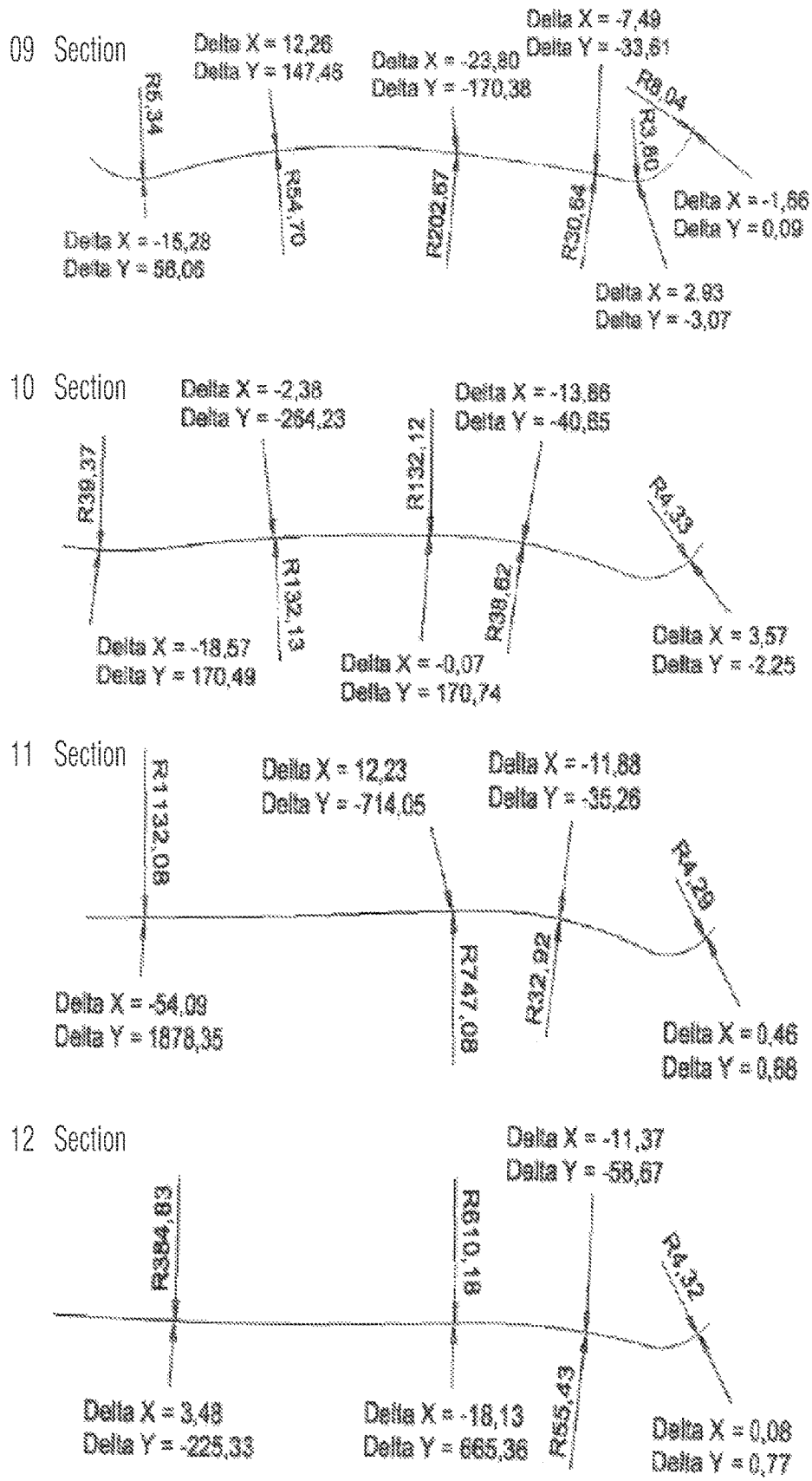

A partial dental arch which is modified compared thereto and even less wavy is apparent from FIG. 69.

Figure 70:
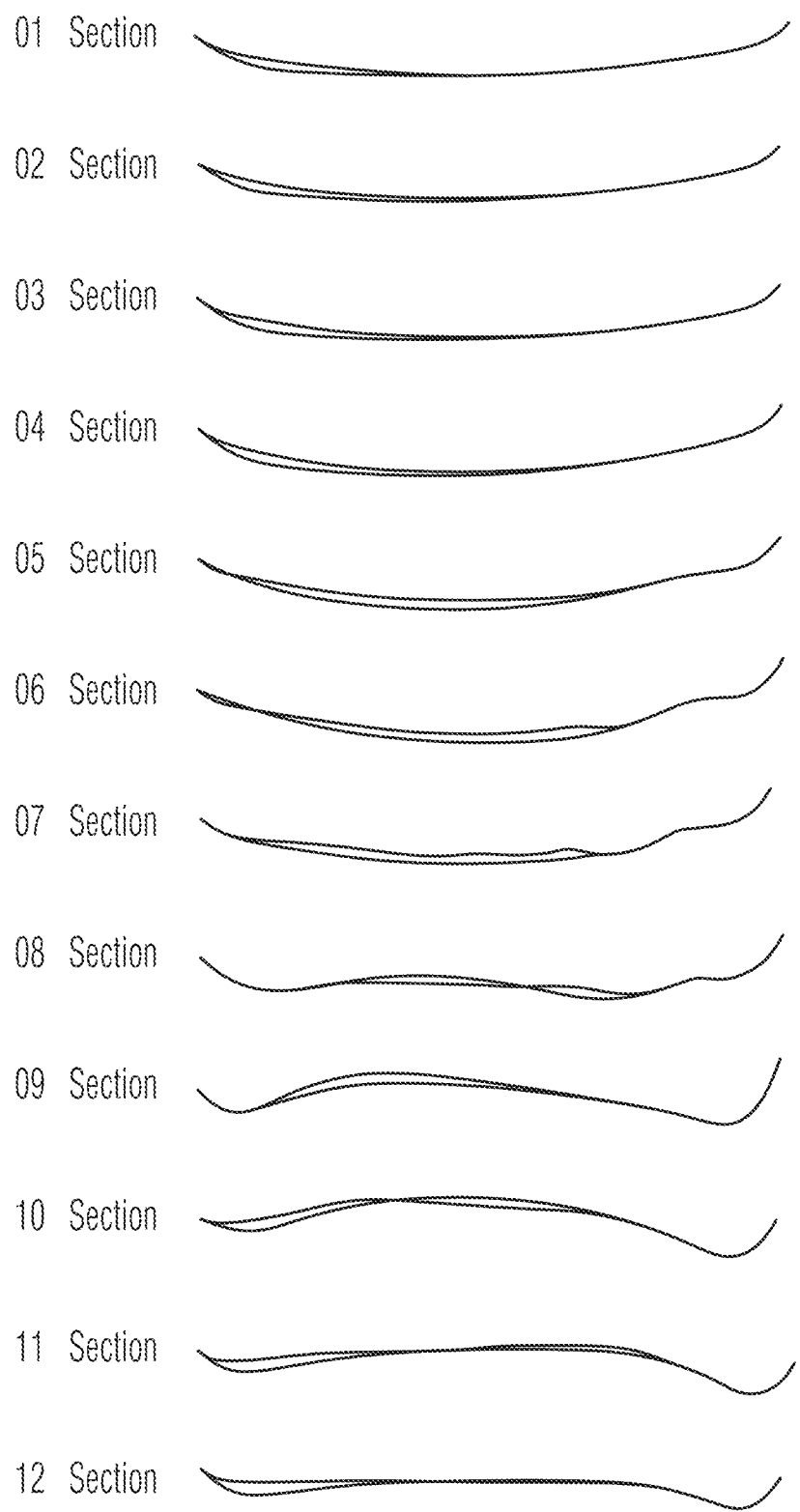
FIG. 70 shows a comparison of the sections from FIG. 67 and FIG. 68.
Figure 71:
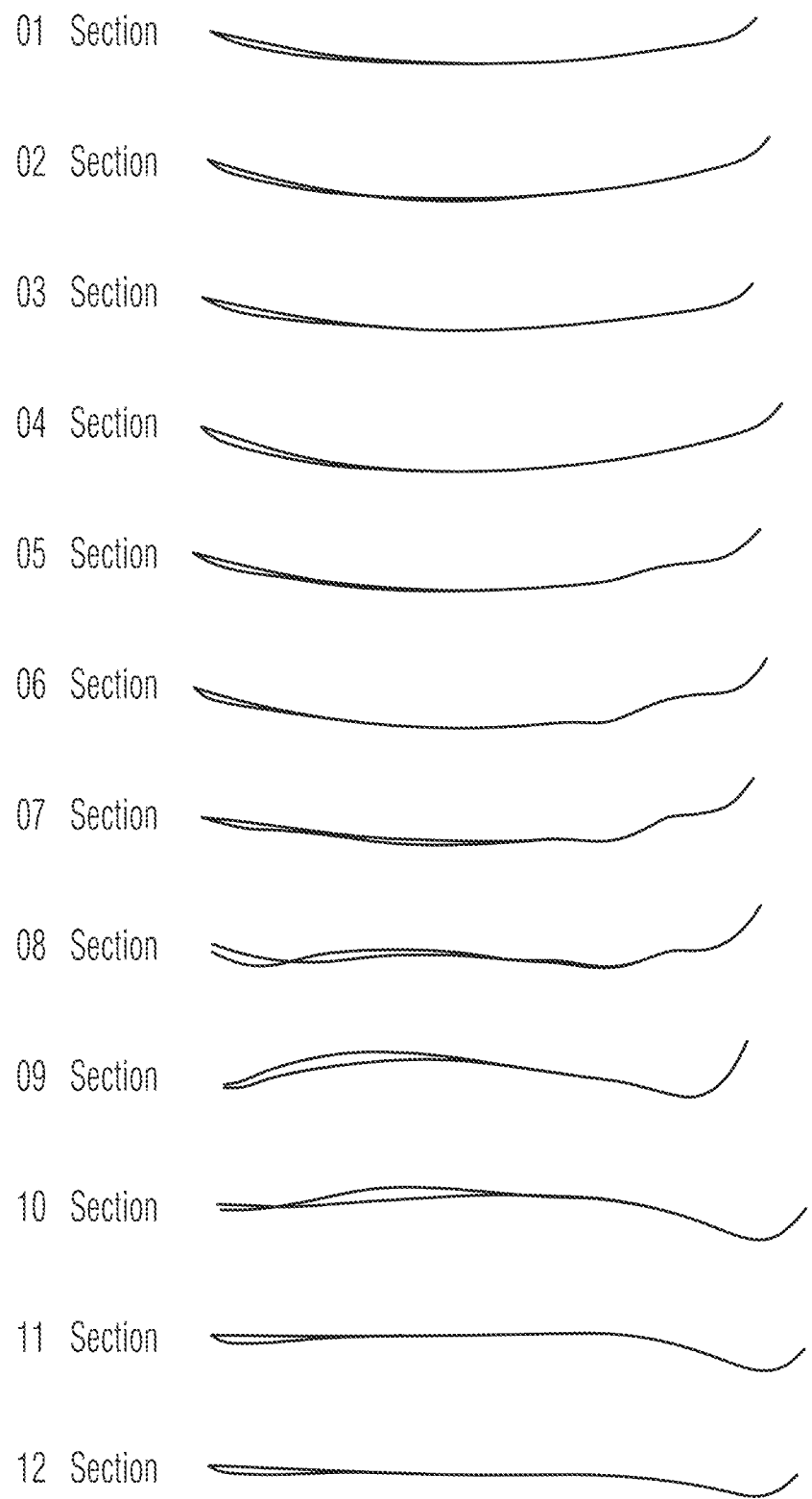
FIG. 71 shows a comparison of the sections from FIG. 67 and FIG. 69.

For clarification, the curves of the sections from the FIGS. 67 and 68 are entered one above the other in FIG. 70, and that from the FIGS. 67 and 69 in FIG. 71.

A further embodiment of the invention is apparent from the following table 1. It shows again a partial dental arch with the tooth positions 3-4-5-6-7 in the upper jaw, and the indicated values follow the above-described method, wherein additional values are indicated for the Z-axis in the Cartesian coordinate system, that is to say the axis extending in the vestibular-lingual direction. The rotary axis and its start is also entered by the indicated coordinates x,y and z. A "-" refers to a line instead of a radius.

In every case, there is a succession of partial circular arches, for instance in case of section 1 of 4 with the positions 1 to 4.

In case of section 1, the center of the circular arch is dimensioned as origin at position 1 (coordinate values 0,0,0) and here the partial circular radius amounts to 6.09. The second partial circular arch comprises a radius of 112.48 and its center is shifted compared to that of the first partial circular arch by −17.69 in the x-direction, by 104.91 in the y-direction and by 0 in the z-direction.

The same holds true for the further values.

Figure 56B:
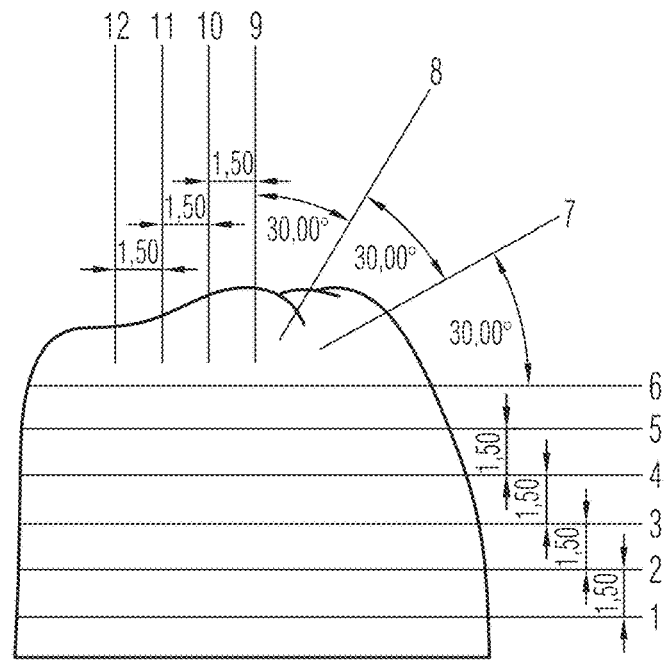
FIG. 56B shows a view of the partial dental arch in the embodiment according to FIG. 56A from the mesial view.

The positions of the sections 1 to 12 correspond to that in FIG. 56*b*.

A further embodiment of the invention is apparent from the following table 2. It shows again a partial dental arch with the tooth positions 4-5-6-7 in the lower jaw, and the indicated values follow the above-described method.

The positions of the sections 1 to 12 correspond to that in FIG. 62*b*.

A further embodiment of the invention is apparent from the following table 3. It shows again a partial dental arch with the tooth positions 3-4-5-6-7 in the lower jaw, and the indicated values follow the above-described method.

Figure 66B:
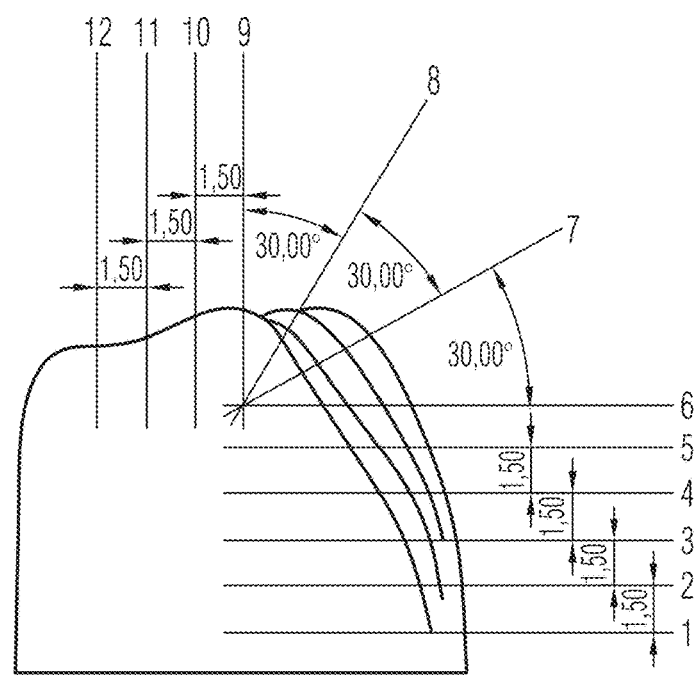
FIG. 66B shows a view of the partial dental arch in the embodiment according to FIG. 66A from the mesial view.

The positions of the sections 1 to 12 correspond to that in FIG. 66*b*.

TABLE 1

|  |  |  |  |  |  |  | Axis of rotation direction X |  |  | X 0 | Y 0.03 | Z 7.5 |
| --- | --- | --- | --- | --- | --- | --- | --- | --- | --- | --- | --- | --- |
| Section | 01 | 02 | 03 | 04 | 05 | 06 | 07 | 08 | 09 | 10 | 11 | 12 |
| Rotation | 0° | 0° | 0° | 0° | 0° | 0° | 30° | 60° | 90° | 90° | 90° | 90° |
| Position 1 | 6.09 | 4.65 | 5.71 | 0.58 | 5.38 | 4.87 | 5.81 | 5.75 | 5.52 | 5.35 | 5.18 | 4.89 |
| X | 0.00 | 0.52 | −0.92 | 0.10 | 0.20 | 0.17 | −0.38 | 0.01 | −0.23 | 0.51 | 0.36 | 0.11 |
| Y | 0.00 | 0.83 | 1.34 | −0.14 | 0.69 | 0.38 | 1.47 | 0.38 | −0.36 | −0.16 | 0.40 | 0.14 |
| Z | 0.00 | 1.50 | 1.50 | 1.50 | 1.50 | 1.50 | 1.13 | 1.72 | 1.68 | 1.50 | 1.50 | 1.50 |

TABLE 1-continued

| | 01 | 02 | 03 | 04 | 05 | 06 | Axis of rotation direction X 07 | 08 | 09 | X 0 10 | Y 0.03 11 | Z 7.5 12 |
|---|---|---|---|---|---|---|---|---|---|---|---|---|
| Position 2 | 112.48 | 103.44 | 123.16 | — | 19.50 | 18.15 | 9.86 | 104.22 | 41.51 | 22.61 | 15.89 | 53.07 |
| X | −17.69 | −19.55 | −21.27 | 0.91 | −2.11 | −3.96 | −3.19 | −15.96 | 3.65 | −12.02 | −9.00 | −10.01 |
| Y | 104.91 | 96.83 | 115.50 | −5.50 | −24.79 | −22.67 | −15.33 | −108.80 | 35.81 | −25.25 | −19.04 | −57.08 |
| Z | 0.00 | 0.00 | 0.00 | 0.00 | 6.00 | 0.00 | 0.00 | 0.00 | 0.00 | 0.00 | 0.00 | 0.00 |
| Position 3 | 107.50 | 101.30 | 87.86 | — | 5.39 | 5.32 | 3.39 | 3.71 | 8.00 | 7.24 | 40.98 | 196.44 |
| X | −0.29 | −0.10 | −0.54 | −7.63 | −1.13 | −0.14 | −4.76 | 11.94 | −8.71 | 4.03 | −9.74 | −6.84 |
| Y | −4.97 | −2.13 | −35.29 | −1.25 | 13.52 | 12.82 | 12.35 | 99.79 | −48.73 | 14.83 | 56.02 | 249.41 |
| Z | 0.00 | 0.00 | 0.00 | 0.00 | 6.00 | 0.00 | 0.00 | 0.00 | 0.00 | 0.00 | 0.00 | 0.00 |
| Position 4 | 5.67 | 5.62 | 6.45 | 53.76 | 12.16 | 6.01 | 4.18 | 7.56 | 93.04 | 113.14 | — | 134.69 |
| X | −16.81 | −15.60 | −12.06 | −8.59 | −6.23 | −4.95 | −1.89 | −4.21 | −3.90 | −8.26 | −2.85 | −2.51 |
| Y | −100.43 | −94.40 | −80.51 | 53.07 | 16.98 | 10.19 | −7.32 | 10.45 | 100.96 | 120.09 | −40.88 | −61.70 |
| Z | 0.00 | 0.00 | 0.00 | 0.00 | 6.00 | 0.00 | 0.00 | 0.00 | 0.00 | 0.00 | 0.00 | 0.00 |
| Position 5 | | | | 97.35 | 5.28 | 2.32 | 3.29 | 2.02 | 175.27 | 367.24 | — | 28.61 |
| X | | | | −4.57 | −0.73 | −1.69 | −4.20 | −2.06 | 1.38 | 9.60 | −12.69 | −20.03 |
| Y | | | | 43.34 | −17.42 | −8.15 | 6.17 | −9.35 | 82.21 | 253.92 | 0.98 | −162.06 |
| Z | | | | 0.00 | 6.00 | 0.00 | 0.00 | 0.00 | 0.00 | 0.00 | 0.00 | 0.00 |
| Position 6 | | | | 97.48 | 15.19 | 7.01 | 14.62 | 5.71 | 296.45 | 117.95 | 14.97 | 7.13 |
| X | | | | 0.00 | −6.50 | −5.04 | −1.24 | −3.69 | −31.34 | −13.96 | −1.28 | 2.68 |
| Y | | | | 0.13 | 19.40 | 7.84 | −17.87 | 6.78 | −470.67 | −248.89 | −14.91 | 35.64 |
| Z | | | | 0.00 | 6.00 | 0.00 | 0.00 | 0.00 | 0.00 | 0.00 | 0.00 | 0.00 |
| Position 7 | | | | — | 42.70 | 6.73 | 7.31 | 5.59 | 32.23 | 9.97 | 8.77 | |
| X | | | | −3.78 | 0.87 | −0.06 | −6.28 | −2.95 | 12.19 | −13.98 | −1.30 | |
| Y | | | | −97.40 | −57.88 | −13.72 | 21.00 | −10.89 | 328.45 | −127.15 | 23.70 | |
| Z | | | | 0.00 | 6.00 | 0.00 | 0.00 | 0.00 | 0.00 | 0.00 | 0.00 | |
| Position 8 | | | | — | 29.74 | 21.93 | 296.06 | 27.63 | 34.94 | 10.52 | | |
| X | | | | −5.63 | −7.17 | −6.15 | −28.64 | −6.46 | −11.32 | −2.51 | | |
| Y | | | | 0.24 | 72.08 | 27.99 | −302.01 | 32.58 | −66.20 | 20.33 | | |
| Z | | | | 0.00 | 6.00 | 0.00 | 0.00 | 0.00 | 0.00 | 0.00 | | |
| Position 9 | | | | 63.76 | 21.30 | 22.38 | 11.14 | 16.34 | 3.19 | | | |
| X | | | | 3.03 | −7.25 | −8.22 | 18.04 | −3.01 | 0.95 | | | |
| Y | | | | 63.68 | −50.52 | −43.53 | 306.67 | −10.88 | 38.11 | | | |
| Z | | | | 0.00 | 6.00 | 0.00 | 0.00 | 0.00 | 0.00 | | | |
| Position 10 | | | | 3.78 | 6.86 | 5.63 | 5.49 | 11.02 | | | | |
| X | | | | −9.41 | −3.84 | −3.95 | −1.90 | −10.64 | | | | |
| Y | | | | −59.23 | 27.90 | 27.45 | −5.31 | −25.20 | | | | |
| Z | | | | 0.00 | 6.00 | 0.00 | 0.00 | 0.00 | | | | |
| Position 11 | | | | | | | | 3.21 | | | | |
| X | | | | | | | | 0.18 | | | | |
| Y | | | | | | | | 14.23 | | | | |
| Z | | | | | | | | 0.00 | | | | |

TABLE 2

| | | | | | | | Axis of rotation direction X | | | X 0 | Y 0.03 | Z 7.5 |
|---|---|---|---|---|---|---|---|---|---|---|---|---|
| Section | 01 | 02 | 03 | 04 | 05 | 06 | 07 | 08 | 09 | 10 | 11 | 12 |
| Rotation | 0° | 0° | 0° | 0° | 0° | 0° | 30° | 60° | 90° | 90° | 90° | 90° |
| Position 1 | 4.68 | 5.65 | 6.02 | 4.84 | 4.34 | 2.90 | 3.40 | 3.28 | 2.45 | 2.51 | 2.49 | 2.74 |
| X | 0.00 | −0.57 | −0.09 | 0.45 | −0.08 | 0.43 | −0.57 | −0.16 | 0.82 | 0.08 | 0.17 | −0.14 |
| Y | 0.00 | 1.05 | 0.67 | −0.77 | −0.15 | −0.76 | 0.66 | −0.36 | 1.21 | 0.71 | 0.29 | |
| Z | 0.00 | 1.50 | 1.50 | 1.50 | 1.50 | 1.50 | 1.02 | −0.55 | −0.65 | 1.50 | 1.50 | 1.50 |
| Position 2 | 209.82 | 505.35 | 513.98 | 59.93 | 29.22 | 34.84 | 15.95 | 7.50 | 249.07 | 613.61 | 139.12 | 179.12 |
| X | −16.22 | −28.18 | 16.45 | −1.50 | −3.42 | −2.83 | −3.25 | −3.91 | 11.58 | −42.81 | −5.90 | −2.72 |
| Y | 204.49 | 498.91 | −519.74 | −64.75 | −33.39 | −37.63 | −19.08 | −10.04 | 246.34 | −614.64 | −141.49 | −181.84 |
| Z | 0.00 | 0.00 | 0.00 | 0.00 | 0.00 | 0.00 | 0.00 | 0.00 | 0.00 | 0.00 | 0.00 | 0.00 |
| Position 3 | 115.59 | 76.05 | 35.39 | 71.42 | 50.20 | 19.45 | 4.38 | 16.27 | 146.06 | 105.77 | 223.65 | 121.88 |
| X | 1.52 | 13.14 | −31.72 | −12.95 | −10.29 | −7.57 | −4.01 | −2.87 | −37.11 | 25.89 | −11.15 | −13.16 |
| Y | −94.22 | −429.09 | 548.45 | 130.71 | 78.76 | 53.76 | 19.93 | 23.59 | −393.38 | 507.19 | 362.59 | 300.71 |
| Z | 0.00 | 0.00 | 0.00 | 0.00 | 0.00 | 0.00 | 0.00 | 0.00 | 0.00 | 0.00 | 0.00 | 0.00 |
| Position 4 | 7.42 | 100.16 | 189.64 | 105.51 | 120.95 | 159.26 | 27.42 | 40.56 | 19.88 | 40.02 | 64.30 | 101.78 |
| X | −13.51 | 1.65 | 11.37 | 1.47 | 3.29 | −5.86 | −2.38 | −7.30 | 7.20 | −0.90 | −2.88 | −7.30 |
| Y | −107.32 | 24.05 | 153.83 | 34.06 | 70.67 | 139.69 | −31.72 | −56.36 | 125.98 | 65.74 | −287.93 | −223.54 |
| Z | 0.00 | 0.00 | 0.00 | 0.00 | 0.00 | 0.00 | 0.00 | 0.00 | 0.00 | 0.00 | 0.00 | 0.00 |
| Position 5 | | 11.11 | 11.04 | 7.20 | 7.17 | 27.23 | 11.05 | 95.43 | 62.41 | 25.69 | 18.40 | 14.96 |
| X | | −13.76 | −23.26 | −15.63 | −18.14 | 1.01 | −5.49 | −0.58 | 6.67 | −13.92 | −10.87 | −6.86 |
| Y | | −87.98 | −177.08 | −97.07 | −112.33 | −132.03 | 38.08 | −54.87 | −42.00 | 64.22 | 81.98 | 116.54 |
| Z | | 0.00 | 0.00 | 0.00 | 0.00 | 0.00 | 0.00 | 0.00 | 0.00 | 0.00 | 0.00 | 0.00 |
| Position 6 | | 4.08 | 3.85 | 4.08 | 4.96 | 0.00 | 178.98 | 70.35 | 4.64 | 2.77 | 2.65 | 3.29 |
| X | | −2.31 | −2.29 | −1.13 | −0.78 | −3.27 | −24.74 | −0.50 | −18.02 | 0.50 | −0.77 | −1.25 |
| Y | | −6.64 | −6.82 | −2.90 | −2.07 | −27.03 | −188.41 | 25.08 | 64.58 | −22.92 | −15.73 | −11.60 |
| Z | | 0.00 | 0.00 | 0.00 | 0.00 | 0.00 | 0.00 | 0.00 | 0.00 | 0.00 | 0.00 | 0.00 |

TABLE 2-continued

| | | Axis of rotation direction X | | | X 0 | Y 0.03 | Z 7.5 |
|---|---|---|---|---|---|---|---|
| Position 7 | | 0.00 | 34.72 | 44.89 | | | |
| X | | −10.37 | 17.09 | −9.79 | | | |
| Y | | 1.23 | 213.02 | 114.82 | | | |
| Z | | 0.00 | 0.00 | 0.00 | | | |
| Position 8 | | 14.66 | 4.47 | 5.55 | | | |
| X | | 1.68 | −6.64 | −3.27 | | | |
| Y | | 14.56 | −29.52 | −39.21 | | | |
| Z | | 0.00 | 0.00 | 0.00 | | | |
| Position 9 | | 3.69 | | | | | |
| X | | −3.16 | | | | | |
| Y | | −10.50 | | | | | |
| Z | | 0.00 | | | | | |
| Position 10 | | | | | | | |
| X | | | | | | | |
| Y | | | | | | | |
| Z | | | | | | | |
| Position 11 | | | | | | | |
| X | | | | | | | |
| Y | | | | | | | |

TABLE 3

| | | | | | | | Axis of rotation direction X | | | | X 0 | Y 0.03 | Z 7.5 |
|---|---|---|---|---|---|---|---|---|---|---|---|---|---|
| Section | 01 | 02 | 03 | 04 | 05 | 06 | 07 | 08 | 09 | 10 | 11 | 12 |
| Rotation | 0° | 0° | 0° | 0° | 0° | 0° | 30° | 60° | 90° | 90° | 90° | 90° |
| Position 1 | 5.71 | 3.78 | 5.60 | 4.32 | 5.09 | 4.48 | 5.05 | 6.68 | 8.04 | 4.33 | 4.29 | 4.32 |
| X | 0.00 | 0.95 | −1.56 | 0.74 | −0.76 | 0.29 | −0.22 | −1.43 | −1.66 | 3.57 | 0.46 | 0.08 |
| Y | 0.00 | −1.13 | 1.73 | −0.25 | 1.16 | 0.38 | 1.07 | 1.12 | 0.09 | −2.25 | 0.68 | 0.77 |
| Z | 0.00 | 1.50 | 1.50 | 1.50 | 1.50 | 1.50 | 0.81 | 1.23 | 1.63 | 1.50 | 1.50 | 1.50 |
| Position 2 | 150.60 | 90.18 | 117.66 | 73.84 | 29.20 | 17.20 | 25.27 | 5.39 | 3.80 | 38.62 | 32.92 | 55.43 |
| X | −18.95 | −19.62 | −20.06 | −16.62 | 2.76 | 0.51 | −2.50 | 0.81 | 2.93 | −13.86 | −11.88 | −11.37 |
| Y | 143.64 | 84.14 | 110.26 | 67.51 | −34.17 | −21.67 | 20.06 | −1.01 | −3.07 | −40.65 | −35.26 | −58.67 |
| Z | 0.00 | 0.00 | 0.00 | 0.00 | 0.00 | 0.00 | 0.00 | 0.00 | 0.00 | 0.00 | 0.00 | 0.00 |
| Position 3 | 64.99 | 83.92 | 74.05 | 111.19 | 8.82 | 12.29 | 3.73 | 4.02 | 30.64 | 132.12 | 747.08 | 640.18 |
| X | −2.57 | −0.09 | 0.61 | −4.71 | −10.78 | −0.95 | 1.04 | −1.16 | −7.49 | −0.07 | 12.23 | −18.13 |
| Y | −85.88 | −6.27 | −43.55 | 37.05 | 36.46 | 4.82 | −28.98 | −9.34 | −33.61 | 170.74 | −714.05 | 665.36 |
| Z | 0.00 | 0.00 | 0.00 | 0.00 | 0.00 | 0.00 | 0.00 | 0.00 | 0.00 | 0.00 | 0.00 | 0.00 |
| Position 4 | | | | 65.30 | 105.64 | 8.08 | 9.73 | 10.62 | 202.67 | 132.13 | 1132.08 | 384.83 |
| X | | | | 0.05 | −12.45 | −8.34 | −6.35 | −5.64 | −23.80 | −2.38 | −54.09 | 3.48 |
| Y | | | | −46.00 | 96.01 | 18.59 | 11.88 | 13.52 | −170.38 | −264.23 | 1878.35 | −225.33 |
| Z | | | | 0.00 | 0.00 | 0.00 | 0.00 | 0.00 | 0.00 | 0.00 | 0.00 | 0.00 |
| Position 5 | | | | | 71.35 | 14.87 | 5.56 | 8.54 | 54.70 | 39.37 | | |
| X | | | | | 0.90 | −1.48 | −2.71 | −3.74 | 12.26 | −18.57 | | |
| Y | | | | | −34.30 | −22.90 | −15.05 | −18.79 | 147.46 | 170.49 | | |
| Z | | | | | 0.00 | 0.00 | 0.00 | 0.00 | 0.00 | 0.00 | | |
| Position 6 | | | | | | 66.72 | 15.30 | 25.20 | 5.34 | | | |
| X | | | | | | −9.36 | −4.07 | −1.15 | −15.28 | | | |
| Y | | | | | | 81.05 | 20.45 | 33.72 | 58.06 | | | |
| Z | | | | | | 0.00 | 0.00 | 0.00 | 0.00 | | | |
| Position 7 | | | | | | 78.65 | 245.01 | 52.52 | | | | |
| X | | | | | | 0.12 | 0.88 | −7.18 | | | | |
| Y | | | | | | 11.97 | 229.71 | −77.40 | | | | |
| Z | | | | | | 0.00 | 0.00 | 0.00 | | | | |
| Position 8 | | | | | | | 6.39 | 24.25 | | | | |
| X | | | | | | | −20.58 | −9.84 | | | | |
| Y | | | | | | | −237.73 | 76.14 | | | | |
| Z | | | | | | | 0.00 | 0.00 | | | | |
| Position 9 | | | | | | | | | | | | |
| X | | | | | | | | | | | | |
| Y | | | | | | | | | | | | |
| Z | | | | | | | | | | | | |
| Positon 10 | | | | | | | | | | | | |
| X | | | | | | | | | | | | |
| Y | | | | | | | | | | | | |
| Z | | | | | | | | | | | | |
| Postion 11 | | | | | | | | | | | | |
| X | | | | | | | | | | | | |
| Y | | | | | | | | | | | | |
| Z | | | | | | | | | | | | |

The invention claimed is:

1. A partial dental arch blank for producing a finished partial dental arch final prosthesis having individual teeth produced by milling said dental arch blank, comprising
a primary-position tooth region and additional tooth regions which are arranged more distally, the primary-position tooth region and additional tooth regions corresponding to individual teeth in the final prosthesis,
wherein the partial dental arch blank is fabricated of a dentin material and an enamel material,
wherein the dentin material has a boundary surface in contact with the enamel material,
wherein the boundary surface comprises a wavy structure having a physical amplitude, when viewed in the distal direction, which distal direction is parallel to an X-axis in a Cartesian coordinate system, decreases in at least one section along the X-axis in a mesial-distal direction and/or along a direction parallel to a Y-axis in an occlusal-gingival extension,
wherein the dentin material (30) comprises a lingual/palatal dentin material ridge and a vestibular dentin material ridge both which along the X-axis exhibit a waviness, and
wherein the waviness of the vestibular dentin material ridge is at least 10 times larger than the waviness of the lingual/palatal dentin material ridge,
wherein the dentin material (30) is configured integrally with indentations at tooth transitions, the wavy structure of the boundary surface comprises a plurality of wave crests at the tooth regions and a plurality of wave troughs at the tooth transitions.

2. The partial dental arch blank as claimed in claim 1,
wherein a size of an indentation between the primary-position tooth region and a secondary-position tooth region, when viewed from the occlusal direction, is larger than a size of an indentation at subsequent tooth transitions, and
wherein the size of the indentation of the dentin material has a depth 10 to 30 percent of a depth of tooth regions on either side of the indentations when viewed along a direction parallel to a Z-axis in a lingual/palatal-vestibular direction.

3. The partial dental arch blank as claimed in claim 1,
wherein a fossa is an occlusal surface that extends between a vestibular dentin material ridge and a lingual/palatal dentin material ridge, said fossa being confined by the primary-position tooth region and
wherein said fossa has a physical width that increases when viewed in the distal direction along the X-axis and a physical depth that decreases when viewed in the distal direction along the X-axis.

4. The partial dental arch blank as claimed in claim 1,
wherein the primary-position tooth region of the dentin material (30) is convex in a mesial part of the primary-position tooth region to achieve a layer of the enamel material (32).

5. The partial dental arch blank as claimed in claim 2,
wherein the enamel material (32) comprises a thickness of up to 1 millimeter above the boundary surface at the tooth transitions and is smaller in thickness (32) at the tooth regions in comparison to the tooth transitions.

6. The partial dental arch blank as claimed in claim 2,
wherein the boundary surface of the dentin material (30) is wavy when viewed in the vestibular direction at a vestibular side flank of a dentin material ridge,
wherein wave troughs at the indentations alternate with wave crests at the tooth regions and a depth of the wave troughs and a height of the wave crests decrease when viewed in the distal direction along the X-axis.

7. The partial dental arch blank as claimed in claim 1,
wherein a surface close to an occlusion side of the dentin material spanned by ridges of the dentin material (30) is tilted with respect to the plane parallel to the x-axis, such that the occlusion side extends a distance to a curve of Wilson or Monson to provide accurate curvature relative to a jaw bone curvature.

8. The partial dental arch blank as claimed in claim 1,
wherein the partial dental arch blank is capable of being fabricated into the finished partial dental arch final prosthesis, said finished partial dental arch final prosthesis comprising
a milled partial dental arch milled from the partial dental arch blank having milled enamel material (32) which covers the dentin material (30) and covers every tooth region with a layer, and
wherein the milled enamel material has a layer thickness gradient which corresponds to a decrease of layer thickness in the gingival direction of between 20 and 80 percent of the milled partial dental arch blank.

9. The partial dental arch blank as claimed in claim 8,
wherein the milled partial dental arch is configured into an upper jaw partial dental arch and/or a lower jaw partial dental arch, a dentin material shape is used for the upper or lower jaw partial arch and said upper or lower jaw partial arch is vertically mirrored to provide an opposing partial arch.

10. The partial dental arch blank as claimed in claim 1,
wherein translucency of the dentin material (30) differs from translucency of the enamel material (32) by between 30 and 50 percent.

11. The partial dental arch blank as claimed in claim 1,
wherein brightness at the boundary surface in contact with the enamel material differs from brightness of the enamel material (32) by between 10 and 30 percent.

12. The partial dental arch blank as claimed in claim 1, is fabricated from a dentin material blank and an enamel material blank,
wherein the dentin material blank is selected from a blank having a block size configured for between 2 and 14 teeth,
and
wherein gingival sides of the dentin material (30) blank are free from recesses.

13. The partial dental arch blank as claimed in claim 1,
wherein the dentin material (30) of the partial dental arch blank comprises a bent or curved shape when viewed from the occlusal direction.

14. A partial dental arch blank for producing a finished partial dental arch final prosthesis having individual teeth produced by milling said dental arch blank, comprising
a primary-position tooth region and additional tooth regions which are arranged more distally, the primary-position tooth region and additional tooth regions corresponding to individual teeth in the final prosthesis,
wherein the partial dental arch blank is fabricated of a dentin material and an enamel material,
wherein the partial dental arch blank comprises a translucent intermediate layer formed between a boundary surface of the dentin material and the enamel material layer,
wherein the boundary surface comprises a wavy structure having a physical amplitude, when viewed in the distal direction, which distal direction is parallel to an X-axis in a Cartesian coordinate system, decreases in at least one section along the X-axis in a mesial-distal direction and/or along a direction parallel to a Y-axis in an occlusal-gingival extension, wherein the dentin material (30) comprises a lingual/palatal dentin material ridge and a vestibular dentin material ridge both which along the X-axis exhibit a waviness, and wherein the waviness of the vestibular dentin material ridge is at least 10 times larger than the waviness of the lingual/palatal dentin material ridge, wherein the dentin material (30) is configured integrally with indentations at tooth transitions, the wavy structure of the boundary surface comprises a plurality of wave crests at the tooth regions and a plurality of wave troughs at the tooth transitions.

\* \* \* \* \*